(12) United States Patent
Duffy et al.

(10) Patent No.: US 12,544,588 B2
(45) Date of Patent: Feb. 10, 2026

(54) PREDICTING SUCCESSFUL GENERATION AND INHIBITION OF SEIZURE-LIKE AFTERDISCHARGES AND MAPPING THEIR SEIZURE NETWORKS USING FMRI

(71) Applicant: The Board of Trustees of the Leland Stanford Junior University, Stanford, CA (US)

(72) Inventors: Ben A. Duffy, Palo Alto, CA (US); ManKin Choy, Redwood City, CA (US); Jin Hyung Lee, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 729 days.

(21) Appl. No.: 17/904,679

(22) PCT Filed: Feb. 23, 2021

(86) PCT No.: PCT/US2021/019258
§ 371 (c)(1),
(2) Date: Aug. 19, 2022

(87) PCT Pub. No.: WO2021/173564
PCT Pub. Date: Sep. 2, 2021

(65) Prior Publication Data
US 2023/0079137 A1    Mar. 16, 2023

Related U.S. Application Data

(60) Provisional application No. 62/980,964, filed on Feb. 24, 2020.

(51) Int. Cl.
*A61B 5/05* (2021.01)
*A61B 5/00* (2006.01)
(Continued)

(52) U.S. Cl.
CPC ........... *A61N 5/0622* (2013.01); *A61B 5/055* (2013.01); *A61B 5/4094* (2013.01); *G01R 33/4806* (2013.01); *G16H 50/50* (2018.01)

(58) Field of Classification Search
CPC ...... A61N 5/0622; G16H 50/50; A61B 5/055; A61B 5/4094
See application file for complete search history.

(56) References Cited

U.S. PATENT DOCUMENTS

| 8,696,722 B2 | 4/2014 | Deisseroth et al. |
| 2012/0083708 A1* | 4/2012 | Rajdev ............ G16H 50/30 600/544 |

(Continued)

FOREIGN PATENT DOCUMENTS

| WO | WO/2017/015395 | 1/2017 |
| WO | WO/2017/100058 | 6/2017 |

(Continued)

OTHER PUBLICATIONS

CVB weighted fMRI (Year: 2005).*
(Continued)

*Primary Examiner* — Joel F Brutus
(74) *Attorney, Agent, or Firm* — Andrew R. Guzman; Pamela J. Sherwood; Bozicevic, Field & Francis LLP

(57) ABSTRACT

Success in generating or curtailing seizures is related to their onset time, with inhibition proving less effective on earlier-onset afterdischarges. To identify targets for intervention, fMRI or simultaneous fMRI-LFP is used to map the seizure network of afterdischarges initiated from the dorsal and ventral hippocampus.

18 Claims, 24 Drawing Sheets

(51) Int. Cl.
    *A61B 5/055*     (2006.01)
    *A61N 5/06*     (2006.01)
    *G01R 33/48*     (2006.01)
    *G16H 50/50*     (2018.01)

(56) References Cited

U.S. PATENT DOCUMENTS

| | | | |
|---|---|---|---|
| 2013/0019325 A1* | 1/2013 | Deisseroth | A61N 5/0601 |
| | | | 435/325 |
| 2015/0366482 A1* | 12/2015 | Lee | A61N 1/36053 |
| | | | 600/411 |
| 2016/0270723 A1 | 9/2016 | Deisseroth et al. | |
| 2018/0199850 A1* | 7/2018 | Lee | A61B 5/4041 |
| 2018/0360343 A1 | 12/2018 | Lee et al. | |

FOREIGN PATENT DOCUMENTS

| | | |
|---|---|---|
| WO | WO2017189506 | 11/2017 |
| WO | WO/2021/113804 | 6/2021 |

OTHER PUBLICATIONS

Duffy et at. (2020) "Predicting Successful Generation and Inhibition of Seizure-like After Discharges and Mapping Their Seizure Networks Using fMRI," Cell Reports, vol. 30, No. 8, pp. 2540-2554.
Giorgi et at. (2017) "Brain-Wide Mapping of Endogenous Serotonergic Transmission via Chemogenetic fMRI," Cell Reports, vol. 21, No. 4, pp. 910-918.

* cited by examiner

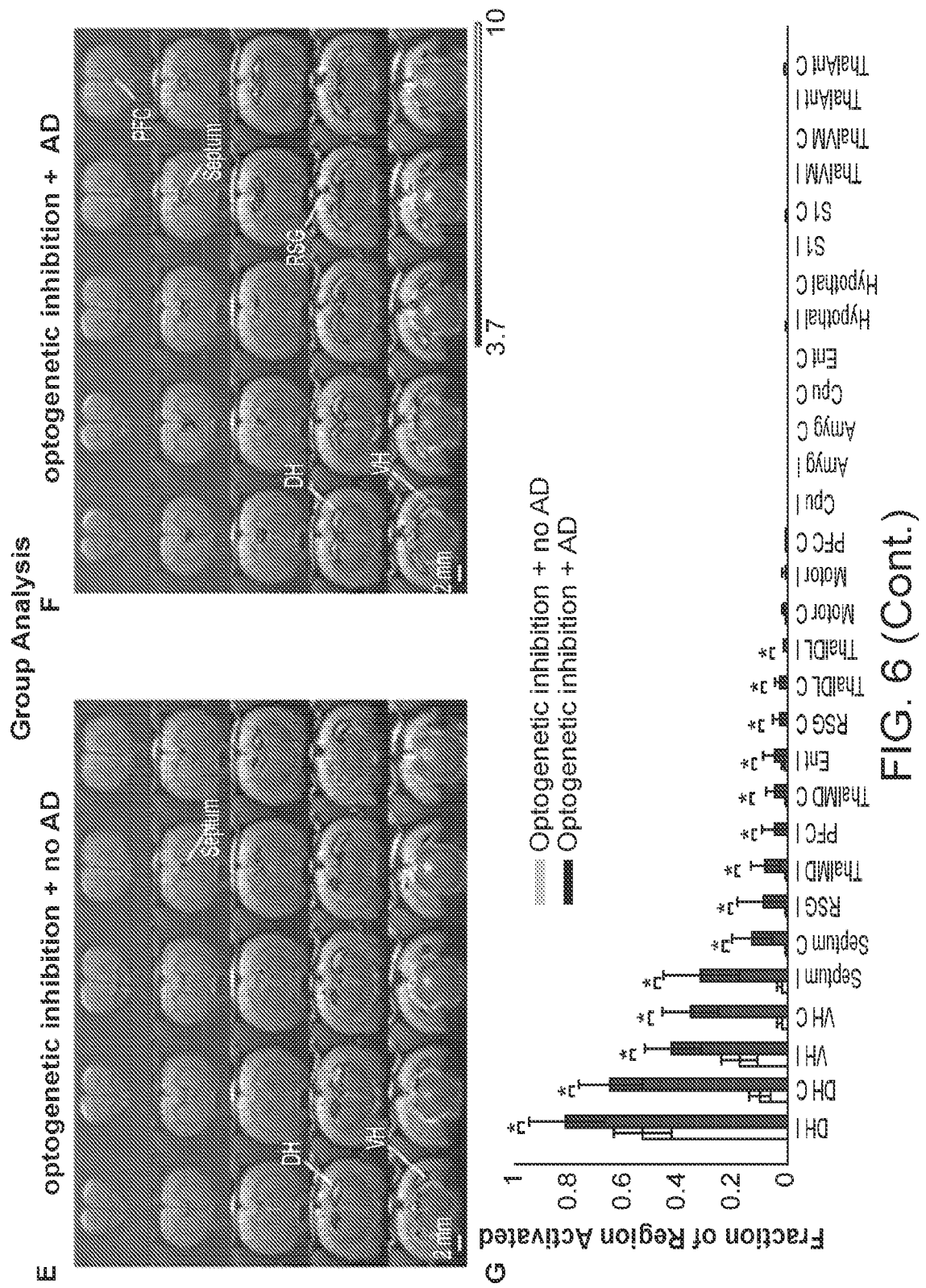

A Dorsal Hippocampus
ChR2　　　　　　NpHR3.0　　　　　ChR2/NpHR3.0

B Ventral Hippocampus
ChR2　　　　　　NpHR3.0　　　　　ChR2/NpHR3.0

C ChR2　　　NpHR　　　GAD67　　ChR2/NpHR/GAD67

■ChR2/NpHR
■NpHR/GAD67

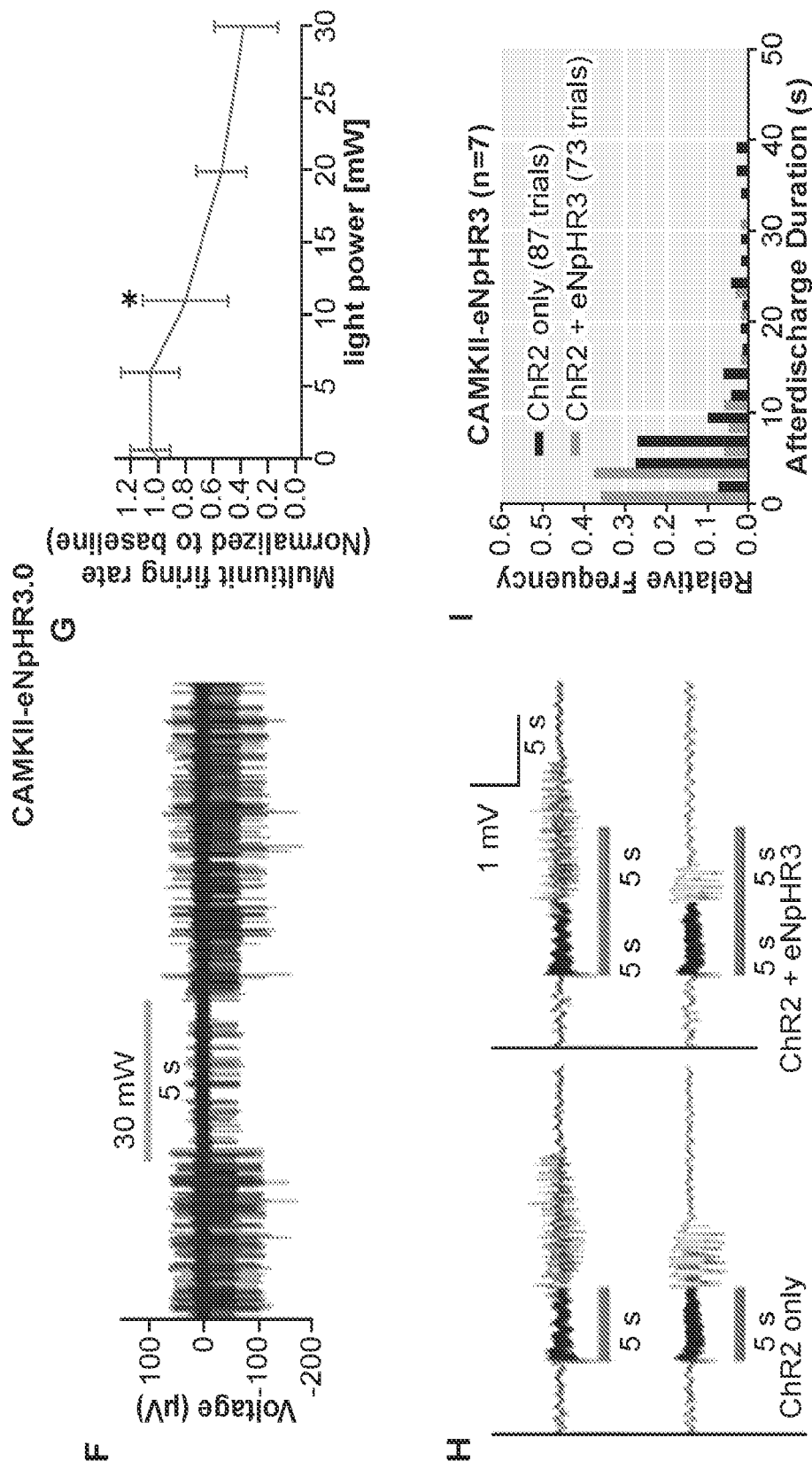
FIG. 10 (Cont. 1)

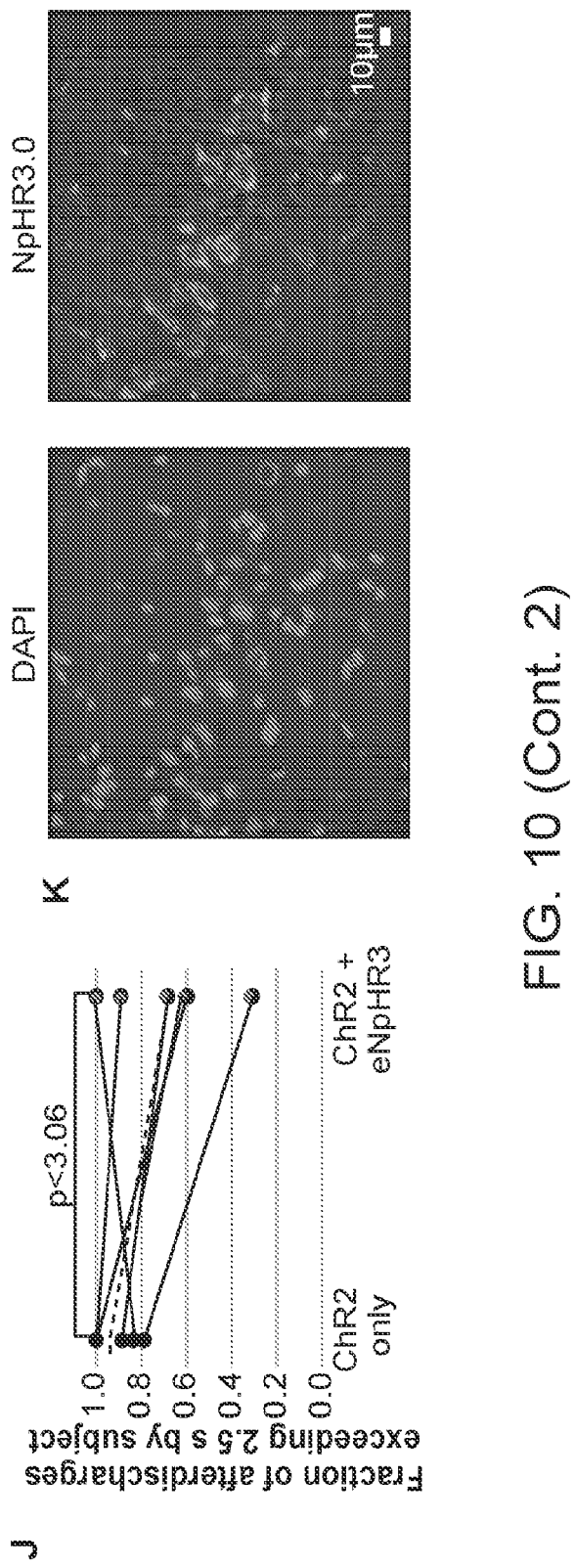
FIG. 10 (Cont. 2)

Dorsal Hippocampus
ChR2 only

ChR2 + eNpHR3.0

Ventral Hippocampus
ChR2 only

ChR2 + eNpHR3.0

0　　　　　　80
Voxel wise AD duration at
inflection point (S)

PREDICTING SUCCESSFUL GENERATION AND INHIBITION OF SEIZURE-LIKE AFTERDISCHARGES AND MAPPING THEIR SEIZURE NETWORKS USING FMRI

CROSS REFERENCE

This application claims priority to U.S. Provisional Application No. 62/980,964, filed Feb. 24, 2020, which is incorporated herein in its entirety for all purpose.

GOVERNMENT SUPPORT RESEARCH

This invention was made with Government support under contracts AG047666, MH114227, NS087159, and NS091461 awarded by the National Institutes of Health. The Government has certain rights in the invention.

INTRODUCTION

Targeted therapies such as deep brain stimulation (DBS) or more recently optogenetics promise to revolutionize the treatment of refractory epilepsy by interfering with specific neuronal circuits involved in the generation and propagation of seizures. However, while considered a goal of many experimental epilepsy therapies, it is unknown whether local inhibition at the seizure origin is sufficient to curtail seizure activity or whether rapid seizure propagation across a wider network necessitates a multi-site approach. Furthermore, because of our poor understanding of seizure networks in animal models, there has been limited development toward such approaches. A greater understanding of seizure propagation pathways is a necessary step toward enabling targeted therapies for treating refractory patients.

Optogenetics employs genetic targeting, which can be used to disentangle the roles of different cell types and networks in seizure maintenance. Most investigations into using optogenetics for seizure control have focused on spontaneous seizure models, which on the one hand afford an opportunity to study ictogenesis and how different brain states relate to intervention efficacy. On the other hand, without temporal control of seizure onset, it is challenging to define the exact origin of the seizures or employ advanced imaging methods such as optogenetic functional MRI (of MRI) or calcium imaging.

Development of methods to inhibit seizures and to map seizure networks are of great clinical interest. The present disclosure addresses this issue.

SUMMARY

Methods are provided herein for mapping and reducing seizures. In some embodiments seizures are inhibited locally, for example with local optogenetic inhibition. In some embodiments the seizures result from optogenetically induced afterdischarges (AD). Methods are also provided for generating a seizure network map, which can find use in identification of targets for intervention. ADs that can be suppressed locally show similar but less widespread seizure networks compared with those that could not be inhibited. It is shown that success in generating or curtailing seizures is related to their onset time, with inhibition proving less effective on earlier-onset afterdischarges. To identify downstream targets for intervention, simultaneous fMRI and LFP can be used to map the seizure network of afterdischarges initiated from the dorsal and ventral hippocampus.

A seizure induction and inhibition model is provided that can be analyzed with simultaneous electrophysiology, including local field potential (LFP) and functional MRI (fMRI). In some embodiments, specific neurons or overlapping sets of neurons comprise both an inhibitory and excitatory light-reactive polypeptides. The model provides a means mapping seizure induction and inhibition. For example, whole-brain fMRI imaging can be used to determine which regions are involved in ADs that could not be curtailed using local inhibition. Imaging of induced seizures events can be analyzed in fine detail. For example, distinct networks were identified for ADs originating from the VH compared with those generated from the DH. Models include an animal brain, e.g. a live animal, which may be a mammal, e.g. a rodent such as a rat, mouse, etc., non-human primate, and the like. In some embodiments, to image induced seizures with simultaneous LFP-fMRI in an animal model, the animal may be sedated and treated with a short-acting neuromuscular blocker to abolish motion during imaging of seizures, exemplary agents for this purpose include, without limitation, dexmedetomidine sedation and vecuronium.

In some embodiments, a seizure is generated by depolarizing neurons of interest in an individual. Neurons that find use in the invention, include but is not limited to, neurons in the ventral hippocampus, dorsal hippocampus, medial prefrontal cortex, medial temporal lobe, etc. including, for example, CaMKII-positive excitatory neurons in the dorsal and ventral hippocampus. Neurons may be depolarized using a variety of methods, which include but are not limited to, optogenetic stimulation, chemical treatment, electrical stimulation, etc. When optogenetic stimulation is used to induce seizure networks, a number of light-reactive polypeptides may be used. The light-activated polypeptide for stimulation may be, for example, a channelrhodopsin, including without limitation ChR2, ChR1, VChR1, etc. The light-reactive polypeptide may be operably linked to a promoter expressed in excitatory hippocampal neurons. Promoters that find use in this method, include without limitation, a hSyn promoter, CAMKII promoter, a thy1 promoter, etc.

In some embodiments, a second light-reactive polypeptide is used to hyperpolarize neurons of interest after they have been depolarized, in order inhibit seizures, i.e. inhibit ADs. In some embodiments, optogenetics is used to hyperpolarize neurons. When optogenetics is used to hyperpolarize (inhibit) neurons of interest, a number of light-reactive proteins may be used. Light-reactive polypeptides of interest include but are not limited to, NpHr, eNpHr2.0, eNpHr3.0, eNpHr3.1, GtR3, etc. The second light-reactive polypeptide may be operably linked to a promoter expressed in excitatory hippocampal neurons. Promoters that find use in this method, include without limitation, a hSyn promoter, CaMKII promoter, a thy1 promoter, etc. In some embodiments, the first light-reactive polynucleotide is operably linked to a promoter that is different from the second light-reactive polynucleotide.

In some embodiments both excitatory light-reactive polypeptides and inhibitory light-reactive polypeptides are co-expressed in cells, or in overlapping cell populations. For example, ChR2 and eNpHR3.0 can be expressed in a cell from the same or different promoters. In some embodiments the promoter is hSyn.

In some embodiments, inhibiting ADs generated by optogenetic stimulation requires a minimum light intensity. For instance, a minimum of 10 mW may be required in order to inhibit ADs generated by optogenetic stimulation. In some embodiments, the light intensity may be, including without limitation, 1000-1500 mW/mm$^2$, 1500-2000 mW/mm$^2$, 2000-2500 mW/mm$^2$, 2500-3000 mW/mm$^2$, or greater than 3000 mW/mm$^2$.

When using optogenetics for stimulation and/or inhibition, light is applied to neurons in an individual. Any suitable method may be used to deliver light to a region of interest, including without limitation, transdermally, through an implanted device, etc.

Early spiking is demonstrated to be predictive of successful inhibition of seizures. Onset time is predictive in seizures from both the dorsal and the ventral hippocampus. Short dorsal and ventral seizures are bilateral and unilateral, respectively fMRI networks are similar but broader when optogenetic inhibition is ineffective.

The data provided herein demonstrate that more progressed ADs with earlier ictal onset time are more likely to be sustained. Local optogenetic inhibition could curtail seizure-like ADs, although more progressed ADs cannot be interrupted using optogenetic inhibition. Voxel-wise activation time maps can be generated, comparing the spread of seizure activity between ADs originating in the dorsal and ventral hippocampus. fMRI activation maps for ADs originating from the ventral hippocampus indicate that ADs that did not progress were limited to the hypothalamus, amygdala, and prefrontal cortex. fMRI activation maps with dorsal hippocampus stimulation and inhibition show that ADs did not progress and were limited to the anterior dorsal hippocampus. Optogenetic inhibition applied during optogenetic stimulation dramatically attenuates the fMRI response, while applied by itself, optogenetic inhibition does not alter the cbv-weighted fMRI signal.

During after discharge induction using optogenetics, LFP recordings show that stimulations with earlier ictal onset times are more likely to result in afterdischarges and are more difficult to curtail with optogenetic inhibition. These results are generalizable across two initiation sites, the dorsal and ventral hippocampus. fMRI shows that afterdischarges initiated from the dorsal or ventral hippocampus exhibit distinct networks. Short-duration seizures initiated in the dorsal and ventral hippocampus are unilateral and bilateral, respectively, while longer-duration afterdischarges recruit broader, bilateral networks. When optogenetic inhibition is ineffective at stopping seizures, the network activity spreads more extensively but largely overlaps with the network activity associated with seizures that could be curtailed. These results provide insights into how seizures can be inhibited, which has implications for targeted seizure interventions.

These results reveal how local inhibition of neuronal populations using optogenetics can reduce the probability of evoked ADs originating in the DH or VH but often fails to curtail ADs. Results suggested that onset time predicted both the generation of ADs and the success and failure of optogenetic inhibition to curtail ADs, indicating that more progressed ADs could not be curtailed using local inhibition. Simultaneous LFP fMRI was used to map the seizure networks responsible for sustaining seizure activity in the presence of local inhibition. Distinct networks were identified for ADs originating from the VH compared with those generated from the DH. Interestingly, these networks were largely similar for ADs that could be curtailed compared with those that could not be curtailed, while activity spread more extensively in those that could not be curtailed.

The effectiveness of local optogenetic inhibition to curtail ADs is related to their progression, with earlier-onset ADs being less sensitive to local inhibition. Focal seizures elicited from the DH that were interrupted locally reliably involved both hippocampi. Where ADs could not be curtailed, they did not necessarily involve extrahippocampal regions but rather spread farther toward the temporal pole. ADs elicited from the VH that could be optogenetically disrupted frequently involved limited ipsilateral activation of the septum, amygdala, PFC, and hypothalamus. Short-duration ADs that were not curtailed using local optogenetic inhibition spread extensively throughout these regions, as well as to the thalamus. The network activity involved in ADs that could and could not be curtailed was therefore largely similar but different in extent, while ADs initiated from the DH were dramatically different from those initiated from the VH.

Using CBV-weighted fMRI proved to be highly advantageous compared with blood-oxygen-level-dependent (BOLD) fMRI in that activation was readily detected in single trials without the need for averaging. Furthermore, using CBV-weighted fMRI typically improves detection sensitivity and the contrast-to-noise ratio by at least a factor of 2 over BOLD fMRI and confers more confidence that the activation maps are representative of the true extent of ictal activity. Another advantage of our protocol was the use of short-duration (5 s) optogenetic stimulation to drive relatively short-duration ADs (median=10.1 s), which were therefore typically shorter than ADs or spontaneous seizures in SE models, which last around Q11 a minute. There were two reasons this was advantageous. First, shorter ADs are likely to induce less of a kindling effect. Evidence for this pertains to the fact that we did not observe motor seizures even after a single animal had experienced multiple ADs, and this made it possible to study ADs repeatedly and reproducibly in the same animal, even when ADs originated from the VH, which is known to be kindled relatively rapidly. Second, using relatively mild, short-duration ADs resulted in seizure activity that was limited to a few regions beyond the initiation site, making it possible to map the regions involved early in the course of ictal activity using fMRI, which otherwise lacks the time resolution necessary for investigating the rapid spread of seizure activity.

DESCRIPTION OF THE EMBODIMENTS

Figure 1:
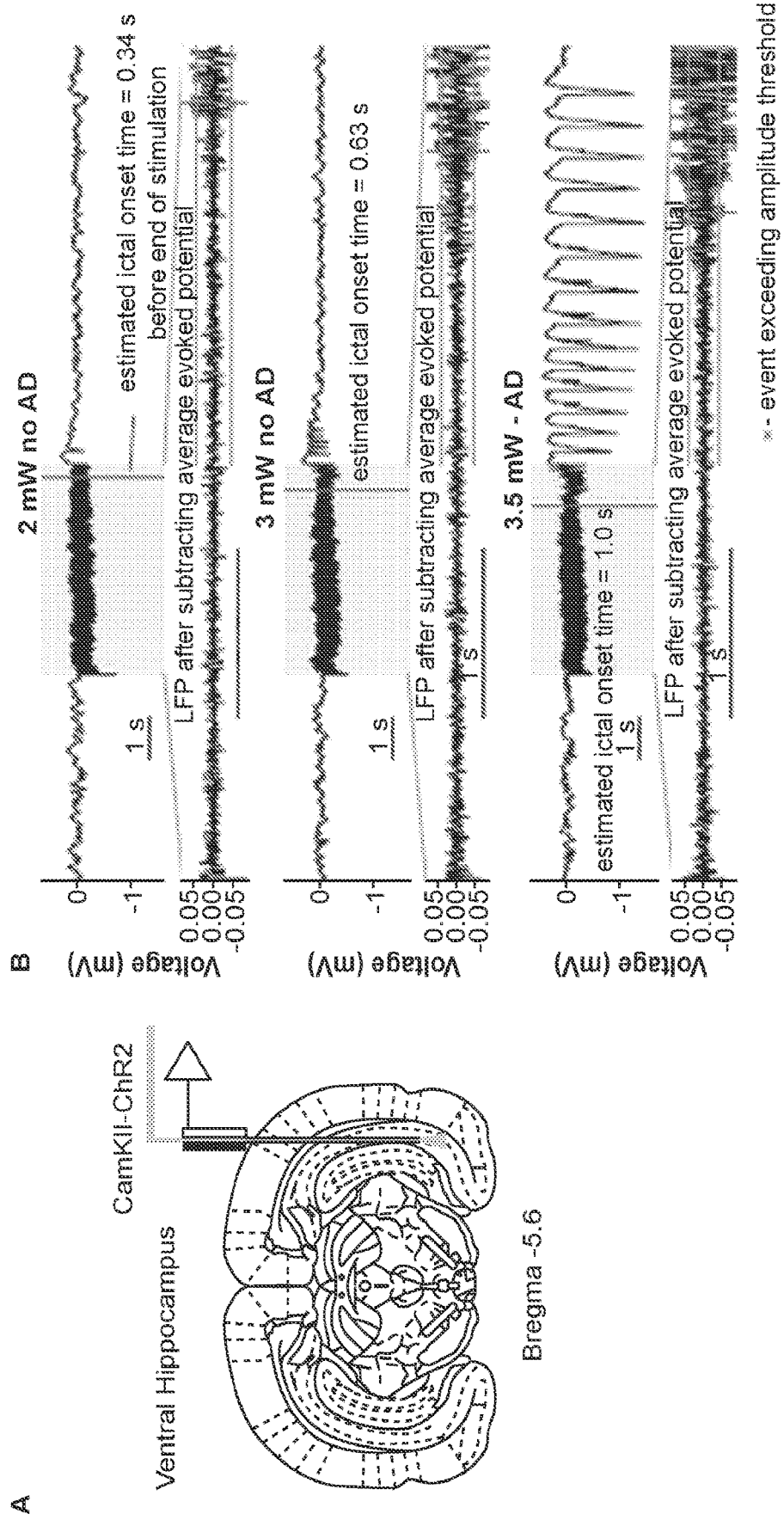
FIG. 1. More Progressed ADs with Earlier Ictal Onset Time Are More Likely to Be Sustained (A) Optrodes were implanted into the VH for electrophysiology and optogenetic excitation. (B) Example LFP traces from a single subject and session, illustrating that ADs are not induced at lower light intensities, e.g., 2 and 3 mW (top and middle panels, respectively) but stimulating ChR2-positive neurons with more intense light, e.g., 3.5 mW can induce ADs (bottom panel). The AD that was sustained had an earlier estimated ictal onset time. The bottom sub-panels illustrate how onset time is calculated by subtracting the sliding window evoked potential. (C) AD probability versus ictal onset time as modeled using a hierarchical Bayesian logistic regression model, in which intercepts were allowed to vary across subjects, excluding trials from sessions in which the seizure threshold was already known (i.e., fMRI sessions, n=13; AD, 206 trials; no AD, 192 trials). The solid line and shaded region indicate the mean±95% quantile credible intervals of the posterior predictive distribution, and the individual points show the observed data. (D) Left panel: forest plot of estimated parameter distributions showing the interquartile range and 5th and 95th percentiles for 2 independently run Monte Carlo chains. Ictal onset time was determined to be a significant predictor of ADs, because the 95% HPD parameter distribution did not contain zero. Right panel: Gelman-Rubin convergence statistic (r-hat) indicating convergence of Monte Carlo chains. Values here were less than 1.1, indicating good convergence. (E) 10-fold cross-validation demonstrating good predictive performance of the hierarchical model compared with the pooled model.
Figure 1:
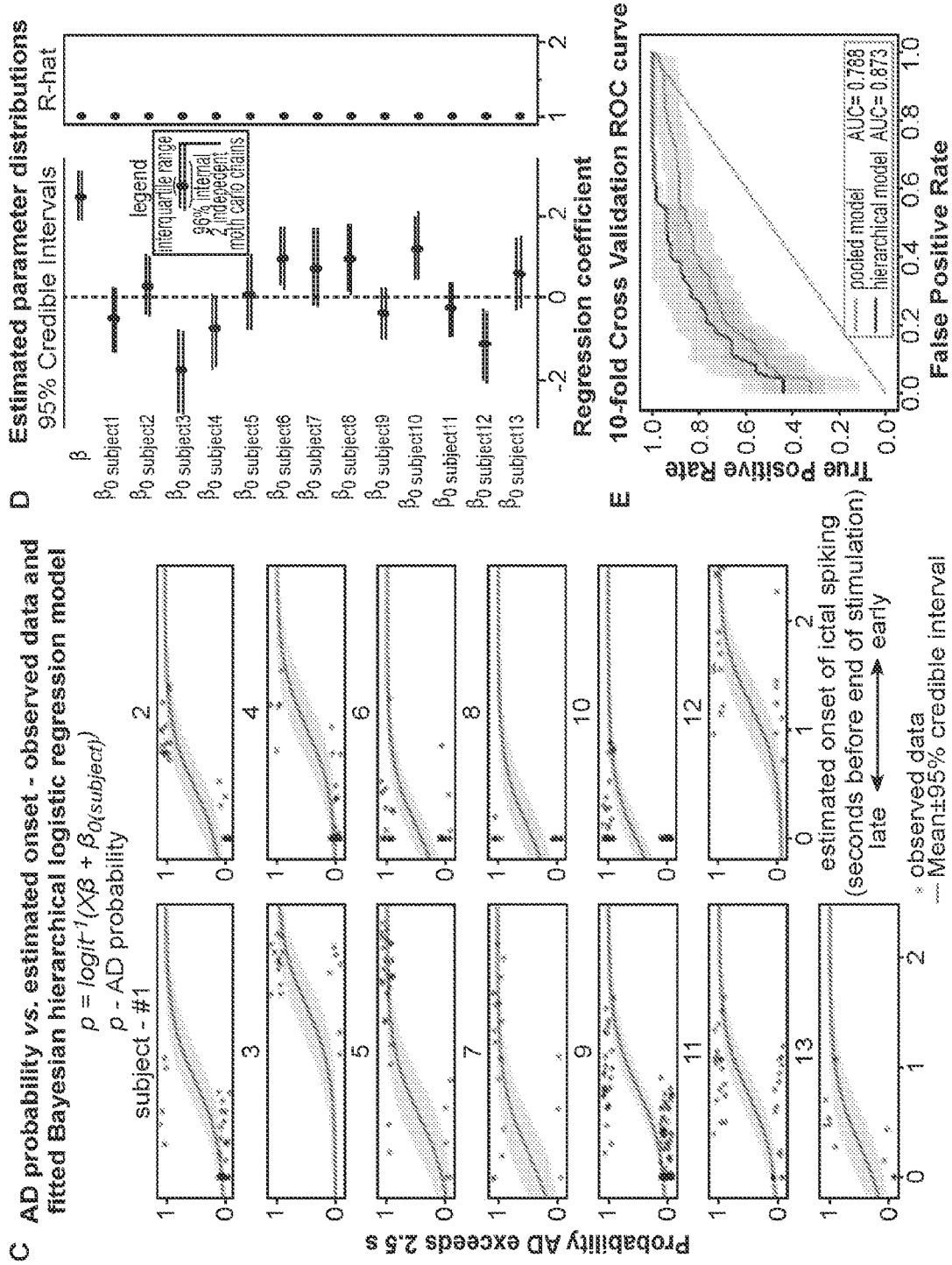

Before the present invention is further described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a," "an," and "the" include plural referents unless the context clearly dictates otherwise. Thus, for example, reference to "an opsin" includes a plurality of such opsins and reference to "the carbon fiber" includes reference to one or more carbon fibers and equivalents thereof known to those skilled in the art, and so forth. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. All combinations of the embodiments pertaining to the invention are specifically embraced by the present invention and are disclosed herein just as if each and every combination was individually and explicitly disclosed. In addition, all sub-combinations of the various embodiments and elements thereof are also specifically embraced by the present invention and are disclosed herein just as if each and every such sub-combination was individually and explicitly disclosed herein.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

As used herein, the phrases "for example," "for instance," "such as," or "including" are meant to introduce examples that further clarify more general subject matter. These examples are provided only as an aid for understanding the disclosure, and are not meant to be limiting in any fashion.

The terms "active agent", "antagonist", "inhibitor", "drug" and "pharmacologically active agent" are used interchangeably herein to refer to a chemical material or compound which, when administered to an organism (human or animal) induces a desired pharmacologic and/or physiologic effect by local and/or systemic action.

As used herein, the terms "treatment," "treating," and the like, refer to obtaining a desired pharmacologic and/or physiologic effect. The effect may be prophylactic in terms of completely or partially preventing a disease or symptom thereof and/or may be therapeutic in terms of a partial or complete cure for a disease and/or adverse effect attributable to the disease. "Treatment," as used herein, covers any treatment of a disease in a mammal, particularly in a human, and includes: (a) preventing the disease or a symptom of a disease from occurring in a subject which may be predisposed to the disease but has not yet been diagnosed as having it (e.g., including diseases that may be associated with or caused by a primary disease; (b) inhibiting the disease, i.e., arresting its development; and (c) relieving the disease, i.e., causing regression of the disease.

A "therapeutically effective amount" or "efficacious amount" means the amount of a compound that, when administered to a mammal or other subject for treating a disease, condition, or disorder, is sufficient to effect such treatment for the disease, condition, or disorder. The "therapeutically effective amount" will vary depending on the compound, the disease and its severity and the age, weight, etc., of the subject to be treated.

The term "unit dosage form," as used herein, refers to physically discrete units suitable as unitary dosages for human and animal subjects, each unit containing a predetermined quantity of a compound calculated in an amount sufficient to produce the desired effect in association with a pharmaceutically acceptable diluent, carrier or vehicle. The specifications for unit dosage forms depend on the particular compound employed and the effect to be achieved, and the pharmacodynamics associated with each compound in the host.

A "pharmaceutically acceptable excipient," "pharmaceutically acceptable diluent," "pharmaceutically acceptable carrier," and "pharmaceutically acceptable adjuvant" means an excipient, diluent, carrier, and adjuvant that are useful in preparing a pharmaceutical composition that are generally safe, non-toxic and neither biologically nor otherwise undesirable, and include an excipient, diluent, carrier, and adjuvant that are acceptable for veterinary use as well as human pharmaceutical use. "A pharmaceutically acceptable excipient, diluent, carrier and adjuvant" as used in the specification and claims includes both one and more than one such excipient, diluent, carrier, and adjuvant.

As used herein, a "pharmaceutical composition" is meant to encompass a composition suitable for administration to a subject, such as a mammal, especially a human. In general a "pharmaceutical composition" is sterile, and preferably free of contaminants that are capable of eliciting an undesirable response within the subject (e.g., the compound(s) in the pharmaceutical composition is pharmaceutical grade). Pharmaceutical compositions can be designed for administration to subjects or patients in need thereof via a number of different routes of administration including oral, buccal, rectal, parenteral, intraperitoneal, intradermal, intracheal, intramuscular, subcutaneous, and the like.

The terms "individual," "host," "subject," and "patient" are used interchangeably herein, and refer to an animal, including, but not limited to, human and non-human primates, including simians and humans; rodents, including rats and mice; bovines; equines; ovines; felines; canines; avians, and the like. "Mammal" means a member or members of any mammalian species, and includes, by way of example, canines; felines; equines; bovines; ovines; rodentia, etc. and primates, e.g., non-human primates, and humans. Non-human animal models, e.g., mammals, e.g. non-human primates, murines, lagomorpha, etc. may be used for experimental investigations. Suitable animal models include particularly rodents, e.g. rats and mice.

As used herein, the terms "determining," "measuring," "assessing," and "assaying" are used interchangeably and include both quantitative and qualitative determinations.

Aspects of the present disclosure include the use of functional magnetic resonance imaging (fMRI) of a subject, including simultaneous fMRI-LFP analysis. In certain embodiments, the method is a compressed sensing (CS) high-resolution fMRI method. Compressed sensing refers to a signal processing method where an image can be reconstructed from a series of sampling measurements obtained with a sampling rate below the Nyquist sampling rate. In general, the method may include obtaining one or more fMRI images of a target area in a subject. For instance, in general, the method may include applying with an MRI system (e.g., a permanent magnet or electromagnet of the MRI system) a magnetic field to a target area in a subject. In some instances, the method also includes applying with the MRI system (e.g., an RF coil of the MRI system) an excitation waveform (e.g., an RF excitation waveform) to the target area in the subject to produce detectable image data (e.g., magnetic resonance (MR) signals) of the target area in the subject. One or more additional fields may also be applied by the MRI system, such as, but not limited to, one or more shim fields using one or more shim coils, one or more gradient fields using one or more gradient coils, and the like. In addition, the method includes acquiring the image data (e.g., with a receiver of the MRI system) and producing an image of the target area in the subject based on the acquired image data.

The acquired image data may be saved in a computer-readable memory and analyzed at a subsequent time (also referred to herein as "offline" processing or "offline" MRI). In other cases, the acquired image data may be analyzed in real-time to produce the image of the target area in the subject. By "real-time" is meant that the acquired signals are analyzed by the MRI system (e.g., by a processor in the MRI system) immediately after signal acquisition and/or during signal acquisition.

In certain embodiments of offline fMRI, to produce the MR image data, the method may include applying an excitation waveform to the target area in the subject. In certain embodiments, the method includes applying a pulse sequence to the target area in the subject. The pulse sequence may be a balanced steady state free precession (b-SSFP) sequence that is applied to the target area in the subject. In some instances of offline MRI, the method includes acquiring image data (MR signals) of the target area in the subject. In certain cases, the method includes using a sampling trajectory. The sampling trajectory may be a randomized sampling trajectory. For instance, the method may include acquiring image data of the target area in the subject using a randomly undersampled trajectory, such as a randomly undersampled variable density spiral (VDS) trajectory.

In certain embodiments of offline MRI, the method includes producing an image of the target area in the subject based on the acquired image data. For example, the method may include analyzing (also referred to herein as processing) the image data to produce the image of the target area. As such, in some instances, the method includes reconstructing an image from the acquired image data. In certain cases, the method includes reconstructing the image using a cost function, such as an L1 regularized cost function.

Local Field Potential (LFP) is the electric potential recorded in the extracellular space in brain tissue, typically using micro-electrodes (metal, silicon or glass micropipettes). LFPs are recorded in depth, from within the cortical tissue (or other deep brain structures). The LFP signal in the mammalian cortex reflects the activity of thousands of neurons and is commonly used to study the network dynamics underlying e.g., sensory processing, motor planning, attention, memory, and perception. The LFP signal has further increased in importance in recent decades because of the development of high-density silicon-based microelectrodes, allowing simultaneous recording of the LFP at thousands of positions spanning entire brain regions. LFP can be used for steering neuroprosthetic devices as it is easier and more stably recorded in chronic settings than single-unit spiking activity.

Magnetic resonance imaging (MRI) is used to analyze neurophysical events. In particular, MRI can be used to analyze functionally correlated regions of the brain (anatomical neural networks) in relation to neurophysical events. The correlation patterns can denote a temporal and/or spatial correlation of neurophysical events. An MRI technique of interest is functional MRI (fMRI). With fMRI, temporal changes in image contrast are displayed by suitable MR imaging scanning sequences. Functional MRI (fMRI) measures signal changes in the brain that are due to changing neural activity. The brain is scanned at low resolution but at a rapid rate (typically once every 2-3 seconds). Increases in neural activity cause changes in the MR signal via $T^*_2$ changes. This mechanism is referred to as the blood-oxygen-level dependent (BOLD) effect. Increased neural activity causes an increased demand for oxygen, and the vascular system actually overcompensates for this, increasing the amount of oxygenated hemoglobin relative to deoxygenated hemoglobin. Because deoxygenated hemoglobin attenuates the MR signal, the vascular response leads to a signal increase that is related to the neural activity. The BOLD effect also allows for the generation of high resolution 3D maps of the venous vasculature within neural tissue.

While a BOLD signal is the most common method employed for neuroscience studies in human subjects, the flexible nature of MR imaging provides means to sensitize the signal to other aspects of the blood supply. Alternative techniques employ arterial spin labeling (ASL) or weight the MRI signal by cerebral blood flow (CBF) and cerebral blood volume (CBV). The CBV method requires injection of a class of MRI contrast agents that are now in human clinical trials. Because this method has been shown to be far more sensitive than the BOLD technique in preclinical studies, it may potentially expand the role of fMRI in clinical applications. The CBF method provides more quantitative information than the BOLD signal, albeit at a significant loss of detection sensitivity.

Epilepsy. Epilepsy is a brain disorder characterized by repeated seizures over time. Types of epilepsy can include, but are not limited to generalized epilepsy, e.g., childhood absence epilepsy, juvenile myoclonic epilepsy, epilepsy with grand-mal seizures on awakening, West syndrome, Lennox-Gastaut syndrome, partial epilepsy, e.g., temporal lobe epilepsy, frontal lobe epilepsy, benign focal epilepsy of childhood.

Status Epilepticus (SE). Status epilepticus (SE) can include, e.g., convulsive status epilepticus, e.g., early status epilepticus, established status epilepticus, refractory status epilepticus, super-refractory status epilepticus; non-convulsive status epilepticus, e.g., generalized status epilepticus, complex partial status epilepticus; generalized periodic epileptiform discharges; and periodic lateralized epileptiform discharges. Convulsive status epilepticus is characterized by the presence of convulsive status epileptic seizures, and can include early status epilepticus, established status epilepticus, refractory status epilepticus, super-refractory status epilepticus. Early status epilepticus is treated with a first line therapy. Established status epilepticus is characterized by status epileptic seizures which persist despite treatment with a first line therapy, and a second line therapy is administered. Refractory status epilepticus is characterized by status epileptic seizures which persist despite treatment with a first line and a second line therapy, and a general anesthetic is generally administered. Super refractory status epilepticus is characterized by status epileptic seizures which persist despite treatment with a first line therapy, a second line therapy, and a general anesthetic for 24 hours or more.

Non-convulsive status epilepticus can include, e.g., focal non-convulsive status epilepticus, e.g., complex partial non-convulsive status epilepticus, simple partial non-convulsive status epilepticus, subtle non-convulsive status epilepticus; generalized non-convulsive status epilepticus, e.g., late onset absence non-convulsive status epilepticus, atypical absence non-convulsive status epilepticus, or typical absence non-convulsive status epilepticus.

Seizure. A seizure is the physical findings or changes in behavior that occur after an episode of abnormal electrical activity in the brain. The term "seizure" is often used interchangeably with "convulsion." Convulsions are when a person's body shakes rapidly and uncontrollably. During convulsions, the person's muscles contract and relax repeatedly. Based on the type of behavior and brain activity, seizures are divided into two broad categories: generalized and partial (also called local or focal). Classifying the type of seizure helps doctors diagnose whether or not a patient has epilepsy.

Generalized seizures are produced by electrical impulses from throughout the entire brain, whereas partial seizures are produced (at least initially) by electrical impulses in a relatively small part of the brain. The part of the brain generating the seizures is sometimes called the focus.

There are a number of types of generalized seizures. The most common and dramatic, and therefore the most well known, is the generalized convulsion, also called the grand-mal seizure. In this type of seizure, the patient loses consciousness and usually collapses. The loss of consciousness is followed by generalized body stiffening (called the "tonic" phase of the seizure) for 30 to 60 seconds, then by violent jerking (the "clonic" phase) for 30 to 60 seconds, after which the patient goes into a deep sleep (the "postictal" or after-seizure phase). During grand-mal seizures, injuries and accidents may occur, such as tongue biting and urinary incontinence.

Absence seizures cause a short loss of consciousness (just a few seconds) with few or no symptoms. The patient, most often a child, typically interrupts an activity and stares blankly. These seizures begin and end abruptly and may occur several times a day. Patients are usually not aware that they are having a seizure, except that they may be aware of "losing time."

Myoclonic seizures consist of sporadic jerks, usually on both sides of the body. Patients sometimes describe the jerks as brief electrical shocks. When violent, these seizures may result in dropping or involuntarily throwing objects.

Clonic seizures are repetitive, rhythmic jerks that involve both sides of the body at the same time.

Tonic seizures are characterized by stiffening of the muscles.

Atonic seizures consist of a sudden and general loss of muscle tone, particularly in the arms and legs, which often results in a fall.

Focal to bilateral tonic-clonic (FBTC) seizures start in one area of the brain, then spreads to both sides of the brain as a tonic-clonic seizure.

When assessing seizure severity, a scale is often used to categorize seizure-related behaviors. The Racine scale has been the scale most widely used to describe these behaviors. The Racine scale comprises 5 stages and each stage is categorized as follows: Stage 1: mouth and facial clonus; Stage 2: Stage 1+head nodding; Stage 3: Stage 2+forelimb clonus; Stage 4: Stage 3+rearing; Stage 5: Stage 4+repeated rearing and falling.

Mapping

In certain embodiments of the present disclosure, the method is a method for functional MRI (fMRI) to generate a seizure map in an individual. For example, in general, the present disclosure provides a method for monitoring seizure activity and response in an individual (also referred to as "a subject" herein). In some instances, the target organ or tissue is an excitable organ or tissue in the subject. "Excitable," as used herein, refers to electrically excitable cells in an organ or tissue, such as neurons and muscle cells. Excitable cells typically use changes in their membrane potential to transmit signals within the cell. Thus, an excitable cell may be characterized in having a resting state, where the membrane potential is at the resting membrane potential, and an excited state, where rapid depolarization of the membrane potential is transmitted across the cell as an action potential. The "cellular electrical activity" of an excitable cell may refer to the changes in the membrane potential or may refer to any indirect measure of the changes in membrane potential, such as the changes in intracellular calcium concentration or any other biochemical changes that is a functional measure of the change in the membrane potential.

In certain embodiments, the method includes surgically implanting a device of the present disclosure into or adjacent to an organ or tissue of an individual, and monitoring the activity of the organ or tissue using fMRI. In some cases, surgically implanting the device includes opening an access in the subject and inserting at least a portion of the device through the access. The access may be an access through the skin, bone, muscle, and/or other tissues of the subject. For instance, an access may include an access through bone (e.g., skull) of the subject to allow placement of at least a portion of a device (e.g., an optrode) adjacent to target neurons in the subject.

In some instances, monitoring the activity of the organ or tissue includes conducting functional magnetic resonance imaging (fMR) on the organ or tissue. In some cases, the organ or tissue includes excitable cells (e.g., cells that express one or more light-responsive polypeptides). The terms "light-activated" and "light-responsive" in reference to a polypeptide or protein that is light-responsive, are used interchangeably and include light-responsive ion channels or opsins, and ion pumps as described herein. Such light-responsive proteins may have a depolarizing or hyperpolarizing effect on the cell on whose plasma membrane the protein is expressed depending on the ion permeability of the activated protein, and the electrochemical gradients present across the plasma membrane.

In one embodiment a specific region of a brain of an individual is stimulated, in conjunction with combined electrophysiology, e.g. local field potentials (LFP) and functional magnetic resonance imaging (fMR) scanning of different regions of the brain to determine functional connections between the seizure propagation zone and other regions of the brain and to image movement of a seizure. Suitable protocols for analysis include electrophysiology; light-induced modulation of neural activity; electroencephalography (EEG) recordings; functional imaging and behavioral analysis. Electrophysiology may include single electrode, multi electrode, and/or field potential recordings. Light-induced modulation of neural activity may include any suitable optogenetic method, as described further herein. Functional imaging may include fMRI, and any functional imaging protocols using genetically encoded indicators (e.g., calcium indicators, voltage indicators, etc.). Behavioral analysis may include any suitable behavioral assays, such as behavioral assays for arousal, memory (such as a water maze assay), conditioning (such as fear conditioning), sensory responses (responses to e.g., visual, somatosensory, auditory, gustatory, and/or olfactory cues).

Some protocols, such as fMRI, provide a non-invasive, brain-wide measure representative of neural activity. Some protocols, such as electrophysiology, provide cellular resolution and rapid measures of neural activity as well as cellular resolution and rapid control of neural activity. Some protocols, such as optogenetics, provide spatially-targeted and temporally-defined control of action potential firing in defined groups of neurons.

In some cases, the one or more light-responsive polypeptides include a hyperpolarizing light-responsive polypeptide. In some cases, the one or more light-responsive polypeptides include a depolarizing light-responsive polypeptide. As such, in some cases the method includes producing an image of the target organ or tissue using fMRI. In some cases, fMRI may be used to image the organ or tissue prior to delivering light to the target organ or tissue using the optrode. In some cases, fMRI may be used to image the organ or tissue during delivery of light to the target organ or tissue using the optrode. In some cases, fMRI may be used to image the organ or tissue after delivering light to the target organ or tissue using the optrode.

The method may further include detecting and/or recording a detectable parameter of the organ or tissue using the device (e.g., optrode). The optrode may be configured to detect electrical signals, such as local field potentials produced by changes in the membrane potential of the excitable cells. Thus, in some cases, the method includes detecting and/or recording a detectable parameter of the organ or tissue using a carbon fiber electrode of the optrode.

The device (e.g., optrode) may include a light source. In these embodiments, the method includes delivering light to the target organ or tissue using the light source. For instance, the method may include stimulating the excitable cells in the target organ or tissue with light from the light source. In some cases, the light source includes an optical fiber as described herein. As such, in these embodiments, the method includes delivering light to the target organ or tissue using the optical fiber (e.g., stimulating the excitable cells with light delivered by the optical fiber). In some cases, the light source includes a laser. As such, in some embodiments, the method includes delivering light to the target organ or tissue using the laser. For example, the method may include generating light using the laser and directing the light from the laser to the target organ or tissue using the optical fiber (e.g., for stimulating the excitable cells in the target organ or tissue with light from the laser). In some cases, the light source includes a light-emitting diode (LED). As such, in some embodiments, the method includes delivering light to the target organ or tissue using the LED. For instance, the method may include generating light using the LED and directing the light from the LED to the target organ or tissue using the optical fiber (e.g., for stimulating the excitable cells in the target organ or tissue with light from the LED).

In certain embodiments, the detectable parameter of the target organ or tissue includes local field potentials, e.g., local field potentials produced by changes in the membrane potential of the excitable cells. The local field potentials may be produced by stimulating the excitable cells with light from the light source. In some instances, the detectable parameter is a single-unit activity, e.g., detectable activity from a single target area (i.e., a uniplex assay). In some cases, the detectable parameter is a multi-unit activity, e.g., detectable activity from two or more target areas (i.e., a multiplex assay).

In some instances, monitoring the activity of the organ or tissue is performed once. In other cases, monitoring the activity of the organ or tissue is performed two or more times. In some cases, monitoring the activity of the organ or tissue is performed several times over a period of time, e.g., the method includes chronically monitoring the activity of the organ or tissue. In some cases, monitoring the activity of the organ or tissue may be performed over an extended period of time, such as 1 day or more, 2 days or more, 3 days or more, 4 days or more, 5 days or more, 6 days or more, 7 days or more, 8 days or more, 9 days or more, 10 days or more, such as, for example, 1 week or more, 2 weeks or more, 3 weeks or more, 1 month or more, 2 months or more, 3 months or more, 4 months or more, 5 months or more, 6 months or more, 7 months or more, 8 months or more, 9 months or more, 10 months or more, 11 months or more, 1 year or more, or ever longer periods of time.

In some cases, the individual is a human. In some cases, the individual is a non-human primate. In some cases, the individual is a rodent (e.g., a rat, a mouse, etc.). The tissue or organ (e.g., "target tissue" or "target organ") may be an in vivo neuronal tissue, a tissue slice preparation, a nerve fiber bundle, a neuromuscular junction, etc. The in vivo neuronal tissue may be neuronal tissue of an animal that is anesthetized or non-anesthetized, and is restrained or non-restrained. The target tissue of interest includes, but is not limited to, the neocortex, the hypothalamus, entorhinal and hippocampal formation cortex, mammillary bodies, septum, bed nucleus of stria terminalis, dorsal and ventral striatum, thalamus, amygdala, accumbens, brainstem, subcortical structures in general, muscle, spinal cord, cardiac tissue, etc.

In some embodiments, the excitable cells (e.g., neurons) in a target tissue or organ are genetically modified to express a light-responsive polypeptide that, when stimulated by an appropriate light stimulus, hyperpolarizes or depolarizes the stimulated excitable cell. The term "genetic modification" refers to a permanent or transient genetic change induced in a cell following introduction into the cell of a heterologous nucleic acid (i.e., nucleic acid exogenous to the cell). Genetic change ("modification") can be accomplished by incorporation of the heterologous nucleic acid into the genome of the host cell, or by transient or stable maintenance of the heterologous nucleic acid as an extrachromosomal element. Where the cell is a eukaryotic cell, a permanent genetic change can be achieved by introduction of the nucleic acid into the genome of the cell. Suitable methods of genetic modification include viral infection, transfection, conjugation, protoplast fusion, electroporation, particle gun technology, calcium phosphate precipitation, direct microinjection, and the like.

Light-Responsive Polypeptides

In some instances, a subject polypeptide comprises an amino acid sequence that encodes a light-reactive polypeptide. In some cases, a light-reactive polypeptide is a light-reactive cation channel. In some cases, a target cell that expresses a light-reactive polypeptide can be activated or inhibited upon exposure to light of varying wavelengths. In some cases, a target cell that expresses a light-reactive polypeptide is a neuronal cell that expresses a light-reactive polypeptide, and upon exposure to light of varying wavelengths, results in depolarization or polarization of the neuron.

In some instances, the light-responsive polypeptide is a light-activated ion channel polypeptide. The light-activated ion channel polypeptides are adapted to allow one or more ions to pass through the plasma membrane of a target cell when the polypeptide is illuminated with light of an activating wavelength. Light-activated proteins may be characterized as ion pump proteins, which facilitate the passage of a small number of ions through the plasma membrane per photon of light, or as ion channel proteins, which allow a stream of ions to freely flow through the plasma membrane when the channel is open. In some embodiments, the light-responsive polypeptide depolarizes the excitable cell when activated by light of an activating wavelength. In some embodiments, the light-responsive polypeptide hyperpolarizes the excitable cell when activated by light of an activating wavelength.

In some cases, a light-responsive polypeptide mediates a hyperpolarizing current in the target cell it is expressed in when the cell is illuminated with light. Non-limiting examples of light-reactive polypeptides capable of mediating a hyperpolarizing current can be found, e.g., in International Patent Application No. PCT/US2011/028893; U.S. Pat. No. 9,175,095. Non-limiting examples of hyperpolarizing light-reactive polypeptides include NpHr, eNpHr2.0, eNpHr3.0, eNpHr3.1 or GtR3. In some cases, a light-reactive polypeptide mediates a depolarizing current in the target cell it is expressed in when the cell is illuminated with light. Non-limiting examples of depolarizing light-reactive polypeptides include "C1V1", ChR1, VChR1, ChR2. Additional information regarding other light-activated cation channels, anion pumps, and proton pumps can be found in U.S. Patent Application Publication Nos: 2009/0093403; and International Patent Application No: PCT/US2011/028893.

In one embodiment, the light-reactive polypeptide can be activated by light having a wavelength of about 560 nm. In one embodiment, the light-reactive polypeptide can be activated by red light. In another embodiment, the light-reactive polypeptide can be activated by light having a wavelength of about 630 nm. In other embodiments, the light-reactive polypeptide can be activated by violet light. In one embodiment, light-reactive polypeptide can be activated by light having a wavelength of about 405 nm. In other embodiments, the light-reactive polypeptide can be activated by green light. A person of skill in the art would recognize that each light-reactive polypeptide will have its own range of activating wavelengths.

In some embodiments, the light-responsive polypeptides are activated by blue light. In some embodiments, the light-responsive polypeptides are activated by green light. In some embodiments, the light-responsive polypeptides are activated by yellow light. In some embodiments, the light-responsive polypeptides are activated by orange light. In some embodiments, the light-responsive polypeptides are activated by red light.

In some cases the regions of the brain with neurons containing a light-responsive peptide is illuminated using one or more optical fibers. The optical fiber may be configured in any suitable manner to direct a light emitted from suitable source of light, e.g., a laser or light-emitting diode (LED) light source, to the region of the brain. The optical fiber may be any suitable optical fiber. In some cases, the optical fiber is a multimode optical fiber. The optical fiber may include a core defining a core diameter, where light from the light source passes through the core. The optical fiber may have any suitable core diameter. In some cases, the core diameter of the optical fiber is 10 mm or more, e.g., 20 mm or more, 30 mm or more, 40 mm or more, 50 mm or more, 60 mm or more, including 80 mm or more, and is 1,000 mm or less, e.g., 500 mm or less, 200 mm or less, 100 mm or less, including 70 mm or less. In some embodiments, the core diameter of the optical fiber is in the range of 10 to 1,000 mm, e.g., 20 to 500 mm, 30 to 200 mm, including 40 to 100 mm.

The optical fiber end that is implanted into the target region of the brain may have any suitable configuration suitable for illuminating a region of the brain with a light stimulus delivered through the optical fiber. In some cases, the optical fiber includes an attachment device at or near the distal end of the optical fiber, where the distal end of the optical fiber corresponds to the end inserted into the subject. In some cases, the attachment device is configured to connect to the optical fiber and facilitate attachment of the optical fiber to the subject, such as to the skull of the subject. Any suitable attachment device may be used. In some cases, the attachment device includes a ferrule, e.g., a metal, ceramic or plastic ferrule. The ferrule may have any suitable dimensions for holding and attaching the optical fiber.

In certain embodiments, methods of the present disclosure may be performed using any suitable electronic components to control and/or coordinate the various optical components used to illuminate the regions of the brain. The optical components (e.g., light source, optical fiber, lens, objective, mirror, and the like) may be controlled by a controller, e.g., to coordinate the light source illuminating the regions of the brain with light pulses. The controller may include a driver for the light source that controls one or more parameters associated with the light pulses, such as, but not limited to the frequency, pulse width, duty cycle, wavelength, intensity, etc. of the light pulses. The controllers may be in communication with components of the light source (e.g., collimators, shutters, filter wheels, moveable mirrors, lenses, etc.).

In some embodiments, the light-reactive polypeptides are activated by light pulses that can have a duration for any of about 1 millisecond (ms), about 2 ms, about 3, ms, about 4, ms, about 5 ms, about 6 ms, about 7 ms, about 8 ms, about 9 ms, about 10 ms, about 15 ms, about 20 ms, about 25 ms, about 30 ms, about 35 ms, about 40 ms, about 45 ms, about 50 ms, about 60 ms, about 70 ms, about 80 ms, about 90 ms, about 100 ms, about 200 ms, about 300 ms, about 400 ms, about 500 ms, about 600 ms, about 700 ms, about 800 ms, about 900 ms, about 1 sec, about 1.25 sec, about 1.5 sec, or about 2 sec, inclusive, including any times in between these numbers. In some embodiments, the light-reactive polypeptides are activated by light pulses that can have a light power density of any of about 0.05 $mW/mm^2$, about 0.1 $mW/mm^2$, about 0.25 $mW/mm^2$, about 0.5 $mW/mm^2$, about 0.75 $mW/mm^2$, about 1 $mW/mm^2$, about 2 $mW/mm^2$, about 3 $mW/mm^2$, about 4 $mW/mm^2$, about 5 $mW/mm^2$, about 6 $mW/mm^2$, about 7 $mW/mm^2$, about 8 $mW/mm^2$, about 9 $mW/mm^2$, about 10 $mW/mm^2$, about 20 $mW/mm^2$, about 50 $mW/mm^2$, about 100 $mW/mm^2$, about 250 $mW/mm^2$, about 500 $mW/mm^2$, about 750 $mW/mm^2$, about 1000 $mW/mm^2$, about 1100 $mW/mm^2$, about 1200 $mW/mm^2$, about 1300 $mW/mm^2$, about 1400 $mW/mm^2$, about 1500 $mW/mm^2$, about 1600 $mW/mm^2$, about 1700 $mW/mm^2$, about 1800 $mW/mm^2$, about 1900 $mW/mm^2$, about 2000 $mW/mm^2$, about 2100 $mW/mm^2$, about 2200 $mW/mm^2$, about 2300 $mW/mm^2$, about 2400 $mW/mm^2$, about 2500 $mW/mm^2$, about 2600 $mW/mm^2$, about 2700 $mW/mm^2$, about 2800 $mW/mm^2$, about 2900 $mW/mm^2$, about 3000 $mW/mm^2$, about 3100 $mW/mm^2$, about 3100 $mW/mm^2$, about 3300 $mW/mm^2$, about 3400 $mW/mm^2$, or about 3500 $mW/mm^2$, inclusive, including any values between these numbers.

The light stimulus used to activate the light-responsive polypeptide may include light pulses characterized by, e.g., frequency, pulse width, duty cycle, wavelength, intensity, etc. In some cases, the light stimulus includes two or more different sets of light pulses, where each set of light pulses is characterized by different temporal patterns of light pulses. The temporal pattern may be characterized by any suitable parameter, including, but not limited to, frequency, period (i.e., total duration of the light stimulus), pulse width, duty cycle, etc.

The light pulses may have any suitable frequency. In some cases, the set of light pulses contains a single pulse of light that is sustained throughout the duration of the light stimulus. In some cases, the light pulses of a set have a frequency of 0.1 Hz or more, e.g., 0.5 Hz or more, 1 Hz or more, 5 Hz or more, 10 Hz or more, 20 Hz or more, 30 Hz or more, 40 H or more, including 50 Hz or more, or 60 Hz or more, or 70 Hz or more, or 80 Hz or more, or 90 Hz or more, or 100 Hz or more, and have a frequency of 100,000 Hz or less, e.g., 10,000 Hz or less, 1,000 Hz or less, 500 Hz or less, 400 Hz or less, 300 Hz or less, 200 Hz or less, including 100 Hz or less. In some embodiments, the light pulses have a frequency in the range of 0.1 to 100,000 Hz, e.g., 1 to 10,000 Hz, 1 to 1,000 Hz, including 5 to 500 Hz, or 10 to 100 Hz.

In some cases, the two sets of light pulses are characterized by having different parameter values, such as different pulse widths, e.g. short or long. The light pulses may have any suitable pulse width. In some cases, the pulse width is 0.1 ms or longer, e.g., 0.5 ms or longer, 1 ms or longer, 3 ms or longer, 5 ms or longer, 7.5 ms or longer, 10 ms or longer, including 15 ms or longer, or 20 ms or longer, or 25 ms or longer, or 30 ms or longer, or 35 ms or longer, or 40 ms or longer, or 45 ms or longer, or 50 ms or longer, and is 500 ms or shorter, e.g., 100 ms or shorter, 90 ms or shorter, 80 ms or shorter, 70 ms or shorter, 60 ms or shorter, 50 ms or shorter, 45 ms or shorter, 40 ms or shorter, 35 ms or shorter, 30 ms or shorter, 25 ms or shorter, including 20 ms or shorter. In some embodiments, the pulse width is in the range of 0.1 to 500 ms, e.g., 0.5 to 100 ms, 1 to 80 ms, including 1 to 60 ms, or 1 to 50 ms, or 1 to 30 ms.

The average power of the light pulse, measured at the tip of an optical fiber delivering the light pulse to regions of the brain, may be any suitable power. In some cases, the power is 0.1 mW or more, e.g., 0.5 mW or more, 1 mW or more, 1.5 mW or more, including 2 mW or more, or 2.5 mW or more, or 3 mW or more, or 3.5 mW or more, or 4 mW or more, or 4.5 mW or more, or 5 mW or more, and may be 1,000 mW or less, e.g., 500 mW or less, 250 mW or less, 100 mW or less, 50 mW or less, 40 mW or less, 30 mW or less, 20 mW or less, 15 mW or less, including 10 mW or less, or 5 mW or less. In some embodiments, the power is in the range of 0.1 to 1,000 mW, e.g., 0.5 to 100 mW, 0.5 to 50 mW, 1 to 20 mW, including 1 to 10 mW, or 1 to 5 mW.

The wavelength and intensity of the light pulses may vary and may depend on the activation wavelength of the light-responsive polypeptide, optical transparency of the region of the brain, the desired volume of the brain to be illuminated, etc.

The volume of a brain region illuminated by the light pulses may be any suitable volume. In some cases, the illuminated volume is 0.001 mm$^3$ or more, e.g., 0.005 mm$^3$ or more, 0.001 mm$^3$ or more, 0.005 mm$^3$ or more, 0.01 mm$^3$ or more, 0.05 mm$^3$ or more, including 0.1 mm$^3$ or more, and is 100 mm$^3$ or less, e.g., 50 mm$^3$ or less, 20 mm$^3$ or less, 10 mm$^3$ or less, 5 mm$^3$ or less, 1 mm$^3$ or less, including 0.1 mm$^3$ or less. In certain cases, the illuminated volume is in the range of 0.001 to 100 mm$^3$, e.g., 0.005 to 20 mm$^3$, 0.01 to 10 mm$^3$, 0.01 to 5 mm$^3$, including 0.05 to 1 mm$^3$.

In some embodiments, the light-responsive polypeptide expressed in a cell can be fused to one or more amino acid sequence motifs selected from the group consisting of a signal peptide, an endoplasmic reticulum (ER) export signal, a membrane trafficking signal, and/or an N-terminal golgi export signal. The one or more amino acid sequence motifs which enhance light-responsive protein transport to the plasma membranes of mammalian cells can be fused to the N-terminus, the C-terminus, or to both the N- and C-terminal ends of the light-responsive polypeptide. In some cases, the one or more amino acid sequence motifs which enhance light-responsive polypeptide transport to the plasma membranes of mammalian cells is fused internally within a light-responsive polypeptide. Optionally, the light-responsive polypeptide and the one or more amino acid sequence motifs may be separated by a linker. In some embodiments, the light-responsive polypeptide can be modified by the addition of a trafficking signal (ts) which enhances transport of the protein to the cell plasma membrane. In some embodiments, the trafficking signal can be derived from the amino acid sequence of the human inward rectifier potassium channel Kir2.1. In some embodiments, the signal peptide sequence in the protein can be deleted or substituted with a signal peptide sequence from a different protein.

Exemplary light-responsive polypeptides and amino acid sequence motifs that find use in the present system and method are disclosed in, e.g., PCT App. Nos. PCT/US2011/028893 and PCT/US2015/23087.

Light-responsive polypeptides of interest include, for example, a step function opsin (SFO)6 protein or a stabilized step function opsin (SSFO) protein that can have specific amino acid substitutions at key positions in the retinal binding pocket of the protein. See, for example, WO 2010/056970, the disclosure of which is hereby incorporated by reference in its entirety. The polypeptide may be a cation channel derived from Volvox carteri (VChR1), optionally comprising one or more amino acid substitutions, e.g. C123A; C123S; D151A, etc. A light-responsive cation channel protein can be a C1V1 chimeric protein derived from the VChR1 protein of Volvox carteri and the ChR1 protein from *Chlamydomonas reinhardti*, wherein the protein comprises the amino acid sequence of VChR1 having at least the first and second transmembrane helices replaced by the first and second transmembrane helices of ChR1, optionally having an amino acid substitution at amino acid residue E122 or E162. In other embodiments, the light-responsive cation channel protein is a C1C2 chimeric protein derived from the ChR1 and the ChR2 proteins from *Chlamydomonas reinhardti*, wherein the protein is responsive to light and is capable of mediating a depolarizing current in the cell when the cell is illuminated with light. In some embodiments, a depolarizing light-responsive polypeptide is a red shifted variant of a depolarizing light-responsive polypeptide derived from *Chlamydomonas reinhardtii*; referred to as a "ReaChR polypeptide" or "ReaChR protein" or "ReaChR." In some embodiments, a depolarizing light-responsive polypeptide is a SdChR polypeptide derived from *Scherffelia dubia*, wherein the SdChR polypeptide is capable of transporting cations across a cell membrane when the cell is illuminated with light. In some embodiments, a depolarizing light-responsive polypeptide is CnChR1, derived from *Chlamydomonas noctigama*, wherein the CnChR1 polypeptide is capable of transporting cations across a cell membrane when the cell is illuminated with light. In some embodiments, the light-responsive cation channel protein is a CsChrimson chimeric protein derived from a CsChR protein of *Chloromonas subdivisa* and CnChR1 protein from *Chlamydomonas noctigama*, wherein the N terminus of the protein comprises the amino acid sequence of residues 1-73 of CsChR followed by residues 79-350 of the amino acid sequence of CnChR1; is responsive to light; and is capable of mediating a depolarizing current in the cell when the cell is illuminated with light. In some embodiments, a depolarizing light-responsive polypeptide can be, e.g. ShChR1, derived from *Stigeoclonium helveticum*, wherein the ShChR1 polypeptide is capable of transporting cations across a cell membrane when the cell is illuminated with light.

In some embodiments, a depolarizing light-responsive polypeptide is derived from *Chlamydomonas reinhardtii* (CHR1, and particularly CHR2) wherein the polypeptide is capable of transporting cations across a cell membrane when the cell is illuminated with light; and is capable of mediating a depolarizing current in the cell when the cell is illuminated with light. In some embodiments CaMKIIa-driven, humanized channelrhodopsin CHR2 H134R mutant fused to EYFP is used for optogenetic activation. The light used to activate the light-responsive cation channel protein derived from *Chlamydomonas reinhardtii* can have a wavelength between about 460 and about 495 nm or can have a wavelength of about 480 nm. The light-responsive cation channel protein can additionally comprise substitutions, deletions, and/or insertions introduced into a native amino acid sequence to increase or decrease sensitivity to light, increase or decrease sensitivity to particular wavelengths of light, and/or increase or decrease the ability of the light-responsive cation channel protein to regulate the polarization state of the plasma membrane of the cell. Additionally, the light-responsive cation channel protein can comprise one or more conservative amino acid substitutions and/or one or more non-conservative amino acid substitutions. The light-responsive proton pump protein containing substitutions, deletions, and/or insertions introduced into the native amino acid sequence suitably retains the ability to transport cations across a cell membrane. The protein may comprise various amino acid substitutions, e.g. one or more of H134R; T159C; L132C; E123A; etc. The protein may further comprise a fluorescent protein, for example, but not limited to, a yellow fluorescent protein, a red fluorescent protein, a green fluorescent protein, or a cyan fluorescent protein.

The individual may be any suitable individual for analyzing the individual's brain functional activity data. In some cases, the individual is a human individual. In some cases the human is a healthy human, or a human having a neurological disorder. The neurological disorder may be any suitable neurological disorder. In some cases, the neurological disorder is caused by a disease, e.g., a neurological disease. The neurological disease may be any suitable disease associated with pathological activity of a network of neurons. Suitable neurological diseases include, without limitation, Parkinson's disease, Alzheimer's disease, dementia, epilepsy, autism, bipolar disorder, schizophrenia, Tourette's syndrome, obsessive compulsive disorder, attention deficit hyperactivity disorder, Huntington's disease, multiple sclerosis, or migraine. In some embodiments, the neurological disorder is an age-related disorder of brain function.

In certain embodiments, the methods may be used to treat a disease or condition (e.g., a neurological disorder) in the subject that is amenable to treatment using the subject methods. As used herein, the terms "treat," "treatment," "treating," and the like, refer to obtaining a desired pharmacologic and/or physiologic effect. The effect may be prophylactic in terms of completely or partially preventing a disease or symptom thereof and/or may be therapeutic in terms of a partial or complete cure for a disease and/or adverse effect attributable to the disease. "Treatment," as used herein, covers any treatment of a disease in a mammal, particularly in a human, and includes: (a) preventing the disease from occurring in a subject which may be predisposed to the disease but has not yet been diagnosed as having it; (b) inhibiting the disease, i.e., arresting its development; and (c) relieving the disease, e.g., causing regression of the disease, e.g., to completely or partially remove symptoms of the disease.

Selective activation of neurons in order to measure subtype-specific functional activity may be done using any suitable method. Suitable methods of selective neuron activation include, without limitation, optogenetic stimulation, single unit electrophysiology, etc. Where the neurons are selectively activated by optogenetic stimulation, the neurons may express one or more light-activated polypeptides configured to hyperpolarize or depolarize the neurons. Suitable light-activated polypeptides and methods used thereof are described further below.

A light-activated polypeptide for use in the present disclosure may be any suitable light-activated polypeptide for selectively activating neurons of a subtype by illuminating the neurons with an activating light stimulus. In some instances, the light-activated polypeptide is a light-activated ion channel polypeptide. The light-activated ion channel polypeptides are adapted to allow one or more ions to pass through the plasma membrane of a target cell when the polypeptide is illuminated with light of an activating wavelength. Light-activated proteins may be characterized as ion pump proteins, which facilitate the passage of a small number of ions through the plasma membrane per photon of light, or as ion channel proteins, which allow a stream of ions to freely flow through the plasma membrane when the channel is open. In some embodiments, the light-activated polypeptide depolarizes the cell when activated by light of an activating wavelength. In some embodiments, the light-activated polypeptide hyperpolarizes the cell when activated by light of an activating wavelength. Suitable hyperpolarizing and depolarizing polypeptides are known in the art and include, e.g., a channelrhodopsin (e.g., ChR2), variants of ChR2 (e.g., C128S, D156A, C128S+D156A, E123A, E123T), iC1C2, C1C2, GtACR2, NpHR, eNpHR3.0, C1V1, VChR1, VChR2, SwiChR, Arch, ArchT, KR2, ReaChR, ChiEF, Chronos, ChRGR, CsChrimson, and the like. In some cases, the light-activated polypeptide includes bReaCh-ES, as described herein and described further in, e.g., Rajasethupathy et al., Nature. 2015 Oct. 29; 526(7575): 653, which is incorporated by reference. Hyperpolarizing and depolarizing opsins have been described in various publications; see, e.g., Berndt and Deisseroth (2015) Science 349:590; Berndt et al. (2014) Science 344:420; and Guru et al. (Jul. 25, 2015) Intl. J. Neuropsychopharmacol. pp. 1-8 (PMID 26209858).

The light-activated polypeptide may be introduced into the neurons using any suitable method. In some cases, the neurons of a subtype of interest are genetically modified to express a light-activated polypeptide. In some cases, the neurons may be genetically modified using a viral vector, e.g., an adeno-associated viral vector, containing a nucleic acid having a nucleotide sequence that encodes the light-activated polypeptide. The viral vector may include any suitable control elements (e.g., promoters, enhancers, recombination sites, etc.) to control expression of the light-activated polypeptide according to neuronal subtype, timing, presence of an inducer, etc.

"Operably linked" refers to a juxtaposition wherein the components so described are in a relationship permitting them to function in their intended manner. For instance, a promoter is operably linked to a nucleotide sequence (e.g., a protein coding sequence, e.g., a sequence encoding an mRNA; a non-protein coding sequence, e.g., a sequence encoding a light-reactive protein; and the like) if the promoter affects its transcription and/or expression.

Neuron-specific promoters and other control elements (e.g., enhancers) are known in the art. Suitable neuron-specific control sequences include, but are not limited to, a neuron-specific enolase (NSE) promoter (see, e.g., EMBL HSENO2, X51956; see also, e.g., U.S. Pat. Nos. 6,649,811, 5,387,742); an aromatic amino acid decarboxylase (AADC) promoter; a neurofilament promoter (see, e.g., GenBank HUMNFL, L04147); a synapsin promoter (see, e.g., GenBank HUMSYNIB, M55301); a thy-1 promoter (see, e.g., Chen et al. (1987) Cell 51:7-19; and Llewellyn et al. (2010) Nat. Med. 16:1161); a serotonin receptor promoter (see, e.g., GenBank S62283); a tyrosine hydroxylase promoter (TH) (see, e.g., Nucl. Acids. Res. 15:2363-2384 (1987) and Neuron 6:583-594 (1991)); a GnRH promoter (see, e.g., Radovick et al., Proc. Natl. Acad. Sci. USA 88:3402-3406 (1991)); an L7 promoter (see, e.g., Oberdick et al., Science 248:223-226 (1990)); a DNMT promoter (see, e.g., Bartge et al., Proc. Natl. Acad. Sci. USA 85:3648-3652 (1988)); an enkephalin promoter (see, e.g., Comb et al., EMBO J. 17:3793-3805 (1988)); a myelin basic protein (MBP) promoter; a CMV enhancer/platelet-derived growth factor-.beta. promoter (see, e.g., Liu et al. (2620) Gene Therapy 11:52-60); a motor neuron-specific gene Hb9 promoter (see, e.g., U.S. Pat. No. 7,632,679; and Lee et al. (2620) Development 131:3295-3306); and an alpha subunit of $Ca^{2+}$-calmodulin-dependent protein kinase II (CaMKII) promoter (see, e.g., Mayford et al. (1996) Proc. Natl. Acad. Sci. USA 93:13250). Other suitable promoters include elongation factor (EF) 1 and dopamine transporter (DAT) promoters.

In some cases, neuronal subtype-specific expression of the light-activated polypeptide may be achieved by using recombination systems, e.g., Cre-Lox recombination, Flp-FRT recombination, etc. Cell type-specific expression of genes using recombination has been described in, e.g., Fenno et al., Nat Methods, 2014 July; 11(7):763; and Gompf et al., Front Behav Neurosci. 2015 Jul. 2; 9:152, which are incorporated by reference herein.

In some embodiments, the vector is a recombinant adeno-associated virus (AAV) vector. AAV vectors are DNA viruses of relatively small size that can integrate, in a stable and sitespecific manner, into the genome of the cells that they infect. They are able to infect a wide spectrum of cells without inducing any effects on cellular growth, morphology or differentiation, and they do not appear to be involved in human pathologies. The AAV genome has been cloned, sequenced and characterized. It encompasses approximately 4700 bases and contains an inverted terminal repeat (ITR) region of approximately 145 bases at each end, which serves as an origin of replication for the virus. The remainder of the genome is divided into two essential regions that carry the encapsidation functions: the left-hand part of the genome, that contains the rep gene involved in viral replication and expression of the viral genes; and the right-hand part of the genome, that contains the cap gene encoding the capsid proteins of the virus.

The application of AAV as a vector for gene therapy has been rapidly developed in recent years. Wild-type AAV could infect, with a comparatively high titer, dividing or non-dividing cells, or tissues of mammal, including human, and also can integrate into in human cells at specific site (on the long arm of chromosome 19) (Kotin et al, Proc. Natl. Acad. Sci. U.S.A., 1990. 87: 2211-2215; Samulski et al, EMBO J., 1991. 10: 3941-3950 the disclosures of which are hereby incorporated by reference herein in their entireties). AAV vector without the rep and cap genes loses specificity of site-specific integration, but may still mediate long-term stable expression of exogenous genes. AAV vector exists in cells in two forms, wherein one is episomic outside of the chromosome; another is integrated into the chromosome, with the former as the major form. Moreover, AAV has not hitherto been found to be associated with any human disease, nor any change of biological characteristics arising from the integration has been observed. There are sixteen serotypes of AAV reported in literature, respectively named AAV1, AAV2, AAV3, AAV4, AAV5, AAV6, AAV7, AAV8, AAV9, AAV10, AAV11, AAV12, AAV13, AAV14, AAV15, and AAV16, wherein AAV5 is originally isolated from humans (Bantel-Schaal, and H. zur Hausen. Virology, 1984. 134: 52-63), while AAV1-4 and AAV6 are all found in the study of adenovirus (Ursula Bantel-Schaal, Hajo Delius and Harald zur Hausen. J. Virol., 1999. 73: 939-947).

AAV vectors may be prepared using any convenient methods. Adeno-associated viruses of any serotype are suitable (See, e.g., Blacklow, pp. 165-174 of "Parvoviruses and Human Disease" J. R. Pattison, ed. (1988); Rose, Comprehensive Virology 3:1, 1974; P. Tattersall "The Evolution of Parvovirus Taxonomy" In Parvoviruses (J R Kerr, S F Cotmore. M E Bloom, R M Linden, C R Parrish, Eds.) p 5-14, Hudder Arnold, London, UK (2006); and D E Bowles, J E Rabinowitz, R J Samulski "The Genus Dependovirus" (J R Kerr, S F Cotmore. M E Bloom, R M Linden, C R Parrish, Eds.) p 15-23, Hudder Arnold, London, UK (2006), the disclosures of which are hereby incorporated by reference herein in their entireties). Methods for purifying for vectors may be found in, for example, U.S. Pat. Nos. 6,566,118, 6,989,264, and 6,995,006 and WO/1999/011764 titled "Methods for Generating High Titer Helper-free Preparation of Recombinant AAV Vectors", the disclosures of which are herein incorporated by reference in their entirety. Preparation of hybrid vectors is described in, for example, PCT Application No. PCT/US2005/027091, the disclosure of which is herein incorporated by reference in its entirety. The use of vectors derived from the AAVs for transferring genes in vitro and in vivo has been described (See e.g., International Patent Application Publication Nos: 91/18088 and WO 93/09239; U.S. Pat. Nos. 4,797,368, 6,596,535, and 5,139,941; and European Patent No: 0488528, all of which are herein incorporated by reference in their entirety). These publications describe various AAV-derived constructs in which the rep and/or cap genes are deleted and replaced by a gene of interest, and the use of these constructs for transferring the gene of interest in vitro (into cultured cells) or in vivo (directly into an organism). The replication defective recombinant AAVs according to the invention can be prepared by co-transfecting a plasmid containing the nucleic acid sequence of interest flanked by two AAV inverted terminal repeat (ITR) regions, and a plasmid carrying the AAV encapsidation genes (rep and cap genes), into a cell line that is infected with a human helper virus (for example an adenovirus). The AAV recombinants that are produced are then purified by standard techniques.

In some embodiments, the vector(s) for use in the methods of the invention are encapsidated into a virus particle (e.g. AAV virus particle including, but not limited to, AAV1, AAV2, AAV3, AAV4, AAV5, AAV6, AAV7, AAV8, AAV9, AAV10, AAV11, AAV12, AAV13, AAV14, AAV15, and AAV16). Accordingly, the invention includes a recombinant virus particle (recombinant because it contains a recombinant polynucleotide) comprising any of the vectors described herein. Methods of producing such particles are known in the art and are described in U.S. Pat. No. 6,596, 535.

For the animal cells described herein, it is understood that one or more vectors may be administered to neural cells, heart cells, or stem cells. If more than one vector is used, it is understood that they may be administered at the same or at different times to the animal cell.

Embodiments of the methods and systems described herein find use in a variety of MRI applications, such as MRI methods and systems where high-resolution MRI images are desired. In some cases, the subject methods and systems find use in producing high-resolution functional MRI (fMR) images of a target area in an individual. For instance, the subject methods and systems find use in fMRI techniques for measuring the brain activity of an individual, such as by detecting changes associated with blood flow in one or more target areas in the brain of the individual. In other cases, the subject methods and systems find use in producing high-resolution functional MRI (fMR) images of a target area in an individual, where the activity in excitable cells in a target organ or tissue in the individual is assessed. As described herein, the subject methods and systems may find use in detecting the activity of light-responsive polypeptides (e.g., light-activated ion channels) in excitable cells (e.g., neurons) in the individual. As such, the subject methods and systems find use in global and/or regional brain function studies, such as where the activity of one or more target regions of the brain is mapped in high-resolution.

In certain embodiments, the subject methods and systems find use in producing high-resolution fMRI images of a target area in an individual, including high-resolution fMRI images that are produced offline (i.e., where processing of the image data is performed at a time after the image data is acquired), and also high-resolution fMRI images that are produced in real-time (i.e., where processing of the image data occurs immediately following acquisition of the image data and/or during acquisition of the image data).

In some embodiments, the present methods and systems find use in screening in vitro and/or in vivo animal models of disease for neuronal circuit elements diagnostic of or causative for neuropsychiatric disease. For example, the present methods and systems find use in pre-surgical brain function diagnosis. Embodiments of the present methods and systems also find use in planning brain machine interface, such as by mapping the neuronal activity in areas of the brain to determine appropriate locations in the brain for brain machine interface.

In some embodiments, the present methods and systems find use in methods for identifying a treatment, e.g., a therapeutic treatment, with a desired activity on a group of neurons. If the desired outcome is known, then the present methods and systems may be used to screen for treatments, including, but not limited to, optogenetic treatment, pharmacological agents, nonchemical based therapeutic treatment; behavioral treatment; electrical, magnetic, or optical based neural-modulation treatment; etc., that will bring about the desired neuronal activity pattern. The screening may be performed in any suitable animal model, either normal, or a model for a neurological disorder, such as Alzheimer's and Parkinson's disease, mild cognitive impairment, other dementias, and Down's Syndrome, as well as schizophrenia, autism, mood, affective, anxiety, and personality/developmental disorders, or other disease models described herein.

In some embodiments, the present methods and systems find use in the treatment of a condition or disorder, such as a neurological or psychiatric condition using optogenetic control. As real-time activity of neurons is monitored using the present methods and systems, a controller or processor may be configured to modulate the activity of neurons in response to the imaged activity signals in such a way as to treat or reduce symptoms of the condition or disorder, at the behavioral and/or physiological levels.

Seizure Models

Provided herein are methods and models for analyzing in vivo the brain circuits and regional relationships involved in seizures, particularly by imaging of single seizures for fine discrimination of effects. Methods of the present disclosure may use any number of combinations of suitable neuronal stimulation and neuronal activity measurement protocols, as necessary, to image the effects of seizures. The methods and models may include, for example, one or more of analysis of single seizures, analysis of focal to bilateral tonic-clonic (FBTC) seizures, analysis of excitatory ventral hippocampal (VH) networks, and the like.

To image single seizures with simultaneous LFP-fMRI in an animal model, the animal may be sedated and treated with a short-acting neuromuscular blocker to abolish motion during imaging of seizures, exemplary agents for this purpose include, without limitation, dexmedetomidine sedation and vecuronium. Seizures may be induced with optogenetic stimulation, with electrical stimulation, e.g. electroshock whole-brain stimulation protocols, single-evoked epileptic afterdischarges; with chemoconvulsants, e.g. pilocarpine, tetanus toxin, PTZ, kainic acid, flurothyl, etc., fluid percussion injury, high-intensity acoustic stimulation. In some embodiments optogenetic stimulation is preferred.

In one embodiment a specific region of a brain of an individual is stimulated, in conjunction with combined electrophysiology, e.g. local field potentials (LFP) and functional magnetic resonance imaging (fMRI) scanning of different regions of the brain to determine functional connections between the seizure propagation zone and other regions of the brain and to image movement of a seizure. Suitable protocols for analysis include electrophysiology; light-induced modulation of neural activity; electroencephalography (EEG) recordings; functional imaging and behavioral analysis. Electrophysiology may include single electrode, multi electrode, and/or field potential recordings. Light-induced modulation of neural activity may include any suitable optogenetic method, as described further herein. Functional imaging may include fMRI, and any functional imaging protocols using genetically encoded indicators (e.g., calcium indicators, voltage indicators, etc.). Behavioral analysis may include any suitable behavioral assays, such as behavioral assays for arousal, memory (such as a water maze assay), conditioning (such as fear conditioning), sensory responses (responses to e.g., visual, somatosensory, auditory, gustatory, and/or olfactory cues).

Some protocols, such as fMRI, provide a non-invasive, brain-wide measure representative of neural activity. Some protocols, such as electrophysiology, provide cellular resolution and rapid measures of neural activity as well as cellular resolution and rapid control of neural activity. Some protocols, such as optogenetics, provide spatially-targeted and temporally-defined control of action potential firing in defined groups of neurons.

In some embodiments an optogenetic model for seizures is provided, wherein electrographic seizures are induced in an animal model by cell-type specific, optogenetic stimulations. Simultaneous electrophysiology and fMRI can be used to determine the effect of inhibition of targeted neurons. The animal model is useful in the design and testing of therapeutic interventions, e.g. surgery, pharmacologic therapy, and the like, where the effect of a therapeutic intervention on seizure propagation can be determined.

In some embodiments, an agent is determined to be effective for targeted intervention of seizures if the duration or severity of seizure is reduced. In some embodiments, the severity of a seizure is determined using the Racine scale. In some embodiments, an agent is determined to be effective for targeted intervention if seizure severity is reduced by at least 1 stage on the Racine scale. For example, reducing seizure severity from Racine stage 5 to stage 4. In some embodiments, seizure severity is reduced by 2 stages, 3 stages, 4 stages or seizures are stopped all together.

Drug Design

Methods are provided for optimizing therapy, by analyzing the effects of seizures across brain regions, and based on that information, selecting appropriate drug candidates and therapeutic modalities that are optimal for addressing seizure induction and propagation, while minimizing undesirable toxicity. The treatment is optimized by selection for a treatment that minimizes undesirable toxicity, while providing for effective activity.

The models provided herein are useful in the design and testing of therapeutic interventions, e.g. surgery, pharmacologic therapy, and the like, where the effect of a therapeutic intervention on seizure induction and propagation can be determined.

Parameters are quantifiable characteristics of cells, tissues and organisms, particularly components that can be accurately measured. A parameter can be, for example, the site or sites, strength, duration, speed, etc. of an electrophysiological discharge, and can be imaged by fMRI, LFP, etc. Readouts may include a single determined value, or may include mean, median value or the variance, etc. Characteristically a range of parameter readout values will be obtained for a parameter from a multiplicity of measurements. Variability is expected and a range of values for each of the set of test parameters will be obtained using standard statistical methods with a common statistical method used to provide single values.

Candidate agents of interest are for drug design are biologically active agents that encompass numerous chemical classes, primarily organic molecules, which may include organometallic molecules, inorganic molecules, genetic sequences, etc. Also of interest are therapeutic interventions, such as surgery, deep brain stimulation, optogenetics, and the like. An important aspect of the invention is to evaluate candidate therapies with preferred biological response functions.

Included are pharmacologically active drugs, genetically active molecules, etc. Compounds of interest include chemotherapeutic agents, anti-inflammatory agents, hormones or hormone antagonists, ion channel modifiers, and neuroactive agents. Exemplary of pharmaceutical agents suitable for this invention are those described in, "The Pharmacological Basis of Therapeutics," Goodman and Gilman, McGraw-Hill, New York, N.Y., (1996), Ninth edition, under the sections: Drugs Acting at Synaptic and Neuroeffector Junctional Sites; Drugs Acting on the Central Nervous System; Autacoids: Drug Therapy of Inflammation; Water, Salts and Ions; etc.

Test compounds include all of the classes of molecules described above, and may further comprise samples of unknown content. Of interest are complex mixtures of naturally occurring compounds derived from natural sources such as plants. While many samples will comprise compounds in solution, solid samples that can be dissolved in a suitable solvent may also be assayed. Samples of interest include environmental samples, e.g. ground water, sea water, mining waste, etc.; biological samples, e.g. lysates prepared from crops, tissue samples, etc.; manufacturing samples, e.g. time course during preparation of pharmaceuticals; as well as libraries of compounds prepared for analysis; and the like. Samples of interest include compounds being assessed for potential therapeutic value, i.e. drug candidates.

The term samples also includes the fluids described above to which additional components have been added, for example components that affect the ionic strength, pH, total protein concentration, etc. In addition, the samples may be treated to achieve at least partial fractionation or concentration. Biological samples may be stored if care is taken to reduce degradation of the compound, e.g. under nitrogen, frozen, or a combination thereof. The volume of sample used is sufficient to allow for measurable detection, usually from about 0.1:1 to 1 ml of a biological sample is sufficient.

Compounds, including candidate agents, are obtained from a wide variety of sources including libraries of synthetic or natural compounds. For example, numerous means are available for random and directed synthesis of a wide variety of organic compounds, including biomolecules, including expression of randomized oligonucleotides and oligopeptides. Alternatively, libraries of natural compounds in the form of bacterial, fungal, plant and animal extracts are available or readily produced. Additionally, natural or synthetically produced libraries and compounds are readily modified through conventional chemical, physical and biochemical means, and may be used to produce combinatorial libraries. Known pharmacological agents may be subjected to directed or random chemical modifications, such as acylation, alkylation, esterification, amidification, etc. to produce structural analogs.

As used herein, the term "genetic agent" refers to polynucleotides and analogs thereof, which-agents are tested in the screening assays of the invention by addition of the genetic agent, to a cell. The introduction of the genetic agent results in an alteration of the total genetic composition of the cell. As employed herein, the genetic agent results in the expression of a protein and is being evaluated as to its effect on one or more target pathways. The genetic agents such as DNA result in an experimentally introduced change in the genome of a cell, generally through the integration of the sequence into a chromosome. Genetic changes can also be transient, where the exogenous sequence is not integrated but is maintained as an episomal agent. RNA viruses may be employed that comprise the gene of interest and are reverse transcribed and inserted into the genome of the host cell. Genetic agents (polypeptides or polynucleotides) can also be synthesized in vitro and delivered to cells by conjugation to a moiety (e.g antennapedia 16-amino acid "Penetratin-1 peptide, available from Qbiogene) that promotes transfer of the agent into a cell of interest. The effect of a genetic agent is to increase expression of a particular gene product in the cell with the potential for the increase and/or decrease of other products in the cell.

In some instances, chemical agents of known or unknown activity are administered to an animal and the effect on seizure induction, propagation and movement assessed. These chemical agents may serve to activate a pathway, inhibit a pathway, etc., where there is interest in having a pathway other than the pathway of interest modulated and rather than using a natural factor, a chemical agent may be more convenient. The chemical agents are conveniently added in solution, or readily soluble form, and may be administered to the animal in various ways, e.g. oral, subcutaneous, by cannula, etc. as known in the art. Preferred chemical agent formulations consist essentially of a biologically active compound and a physiologically acceptable carrier, e.g. water, normal saline, etc.

In one embodiment a specific region of a brain of an individual is stimulated, in conjunction with combined electrophysiology, e.g. local field potentials (LFP) and functional magnetic resonance imaging (fMR) scanning with respect to induction and inhibition of AD. The animal may be sedated, e.g. with dexmedetomidine; and treated with a short-acting neuromuscular blocker, e.g. vecuronium, to abolish motion during imaging of seizures with simultaneous LFP-fMRI.

Suitable protocols for analysis include electrophysiology; light-induced modulation of neural activity; electroencephalography (EEG) recordings; functional imaging and behavioral analysis. Electrophysiology may include single electrode, multi electrode, and/or field potential recordings. Light-induced modulation of neural activity may include any suitable optogenetic method, as described further herein. Functional imaging may include fMRI, and any functional imaging protocols using genetically encoded indicators (e.g., calcium indicators, voltage indicators, etc.). Behavioral analysis may include any suitable behavioral assays, such as behavioral assays for arousal, memory (such as a water maze assay), conditioning (such as fear conditioning), sensory responses (responses to e.g., visual, somatosensory, auditory, gustatory, and/or olfactory cues).

The models provided herein are useful in the design and testing of therapeutic interventions, e.g. surgery, pharmacologic intervention (drug therapy), and the like, where the effect of a therapeutic intervention on seizure induction and propagation can be determined. Comparisons can be made to known antiepileptic drugs, for example gabapentin, topiramate, lamotrigine, levetiracetam, stiripentol, and rufinamide, oxcarbazepine, lacosamide, perampanel, etc.

The comparison of measurements obtained from a test agent, and a reference agent can be accomplished by the use of suitable deduction protocols, AI systems, statistical comparisons, etc. The data is compared with a database of reference results. A database of reference results can be compiled. For every reference and test pattern, typically a data matrix is generated, where each point of the data matrix corresponds to a readout from a parameter, where data for each parameter may come from replicate determinations, e.g. multiple individual seizures of the same type, etc. A data point may be quantitative, semi-quantitative, or qualitative, depending on the nature of the parameter. The readout may be a mean, average, median or the variance or other statistically or mathematically derived value associated with the measurement. The parameter readout information may be further refined by direct comparison with the corresponding reference readout. The absolute values obtained for each parameter under identical conditions will display a variability that is inherent in live biological systems and also reflects individual cellular variability as well as the variability inherent between individuals.

Classification rules are constructed from sets of training data (i.e. data matrices) obtained from multiple repeated experiments. Classification rules are selected as correctly identifying repeated reference patterns and successfully distinguishing distinct reference patterns. Classification rule-learning algorithms may include decision tree methods, statistical methods, naive Bayesian algorithms, and the like. A knowledge database will be of sufficient complexity to permit novel test agents to be effectively identified and classified. Several approaches for generating a sufficiently encompassing set of classification patterns and sufficiently powerful mathematical/statistical methods for discriminating between them can accomplish this.

Computer Aspects

A computational system (e.g., a computer) may be used in the methods of the present disclosure to control and/or coordinate stimulus through the one or more controllers, and to analyze data from scanning of the regions of the brain. A computational unit may include any suitable components to analyze the measured images. Thus, the computational unit may include one or more of the following: a processor; a non-transient, computer-readable memory, such as a computer-readable medium; an input device, such as a keyboard, mouse, touchscreen, etc.; an output device, such as a monitor, screen, speaker, etc.; a network interface, such as a wired or wireless network interface; and the like.

The raw data from measurements, such as fMRI, LFP, and the like, can be analyzed and stored on a computer-based system. As used herein, "a computer-based system" refers to the hardware means, software means, and data storage means used to analyze the information of the present invention. The minimum hardware of the computer-based systems of the present invention comprises a central processing unit (CPU), input means, output means, and data storage means. A skilled artisan can readily appreciate that any one of the currently available computer-based system are suitable for use in the present invention. The data storage means may comprise any manufacture comprising a recording of the present information as described above, or a memory access means that can access such a manufacture.

A variety of structural formats for the input and output means can be used to input and output the information in the computer-based systems. Such presentation provides a skilled artisan with a ranking of similarities and identifies the degree of similarity contained in the test data.

The analysis may be implemented in hardware or software, or a combination of both. In one embodiment of the invention, a machine-readable storage medium is provided, the medium comprising a data storage material encoded with machine readable data which, when using a machine programmed with instructions for using said data, is capable of displaying a any of the datasets and data comparisons of this invention. Such data may be used for a variety of purposes, such as drug discovery, analysis of interactions between cellular components, and the like. In some embodiments, the invention is implemented in computer programs executing on programmable computers, comprising a processor, a data storage system (including volatile and non-volatile memory and/or storage elements), at least one input device, and at least one output device. Program code is applied to input data to perform the functions described above and generate output information. The output information is applied to one or more output devices, in known fashion. The computer may be, for example, a personal computer, microcomputer, or workstation of conventional design.

Each program can be implemented in a high level procedural or object oriented programming language to communicate with a computer system. However, the programs can be implemented in assembly or machine language, if desired. In any case, the language may be a compiled or interpreted language. Each such computer program can be stored on a storage media or device (e.g., ROM or magnetic diskette) readable by a general or special purpose programmable computer, for configuring and operating the computer when the storage media or device is read by the computer to perform the procedures described herein. The system may also be considered to be implemented as a computer-readable storage medium, configured with a computer program, where the storage medium so configured causes a computer to operate in a specific and predefined manner to perform the functions described herein. A variety of structural formats for the input and output means can be used to input and output the information in the computer-based systems of the present invention.

Further provided herein is a method of storing and/or transmitting, via computer, sequence, and other, data collected by the methods disclosed herein. Any computer or computer accessory including, but not limited to software and storage devices, can be utilized to practice the present invention. Sequence or other data (e.g., immune repertoire analysis results), can be input into a computer by a user either directly or indirectly. Additionally, any of the devices which can be used to sequence DNA or analyze DNA or analyze immune repertoire data can be linked to a computer, such that the data is transferred to a computer and/or computer-compatible storage device. Data can be stored on a computer or suitable storage device (e.g., CD). Data can also be sent from a computer to another computer or data collection point via methods well known in the art (e.g., the internet, ground mail, air mail). Thus, data collected by the methods described herein can be collected at any point or geographical location and sent to any other geographical location.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric. Standard abbreviations may be used, e.g., bp, base pair(s); kb, kilobase(s); pl, picoliter(s); s or sec, second(s); min, minute(s); h or hr, hour(s); aa, amino acid(s); kb, kilobase(s); bp, base pair(s);

nt, nucleotide(s); i.m., intramuscular(ly); i.p., intraperitoneal(ly); s.c., subcutaneous(ly); and the like.

Example 1

Predicting Successful Generation and Inhibition of Seizure-Like Afterdischarges and Mapping their Seizure Networks Using fMRI To understand the conditions necessary to initiate and terminate seizures, we investigated optogenetically induced hippocampal seizures with local field potential (LFP), fMRI, and optogenetic inhibition. During after discharge induction using optogenetics, LFP recordings show that stimulations with earlier ictal onset times are more likely to result in afterdischarges and are more difficult to curtail with optogenetic inhibition. These results are generalizable across two initiation sites, the dorsal and ventral hippocampus. fMRI shows that afterdischarges initiated from the dorsal or ventral hippocampus exhibit distinct networks. Short-duration seizures initiated in the dorsal and ventral hippocampus are unilateral and bilateral, respectively, while longer-duration afterdischarges recruit broader, bilateral networks. When optogenetic inhibition is ineffective at stopping seizures, the network activity spreads more extensively but largely overlaps with the network activity associated with seizures that could be curtailed. These results provide insights into how seizures can be inhibited, which has implications for targeted seizure interventions.

Using a model of optogenetically induced ADs, we first investigate whether we can use LFP to predict whether trials progressed to AD by taking advantage of the stimulation-artifact-free nature of these recordings. Next, we ask whether it is possible to suppress ADs using spatially localized optogenetic inhibition at the seizure focus and whether it is possible predict the success and failure of optogenetic inhibition aimed at suppressing ADs. Finally, using simultaneous LFP and functional MRI (fMRI), we investigated the seizure network of ADs that could and could not be suppressed using local inhibition in both the dorsal hippocampus (DH) and the ventral hippocampus (VH).

Figure 9:
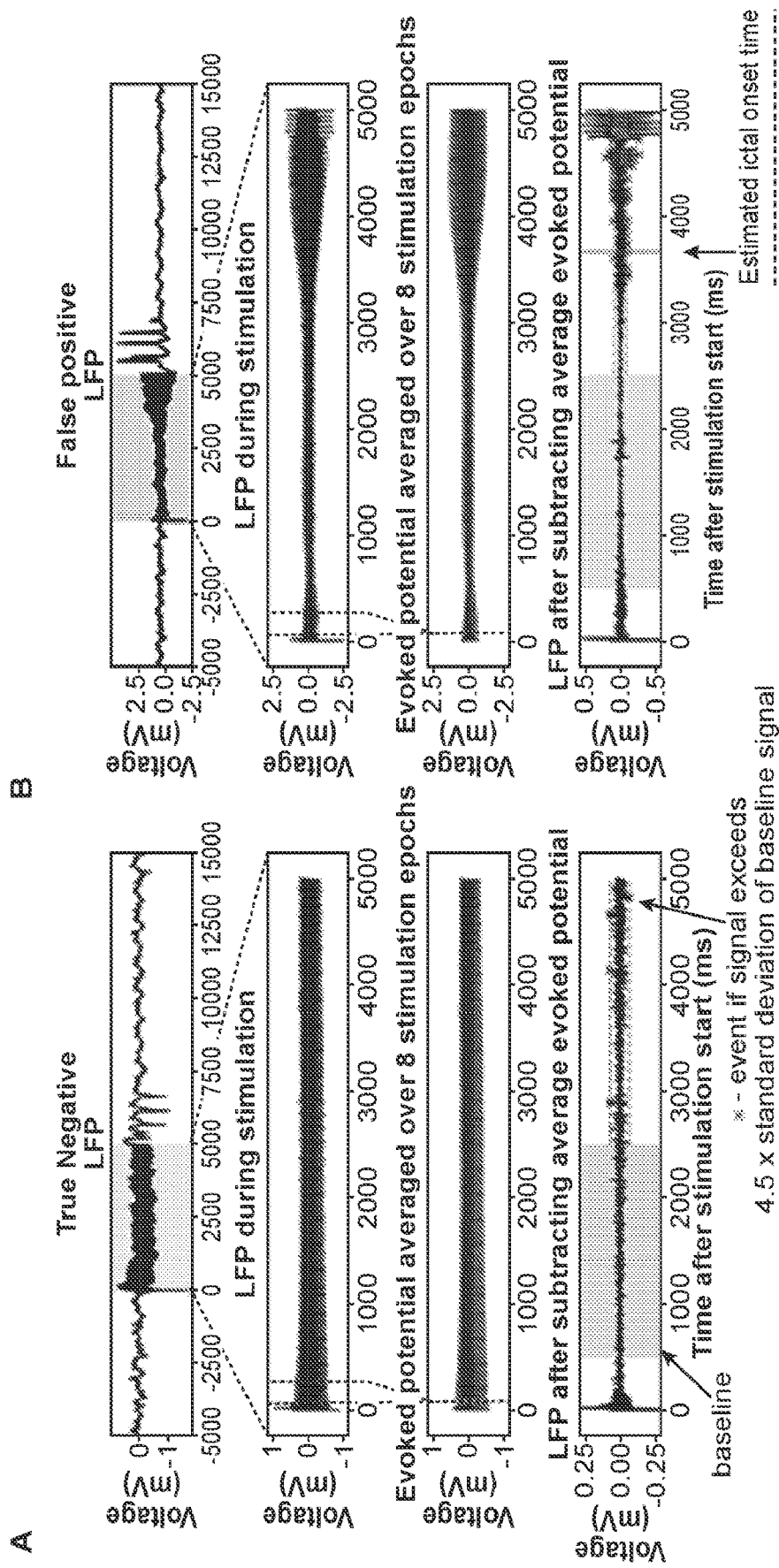
FIG. 9: Examples showing the procedure for estimation of onset time alongside correctly classified, false negative and false positive examples. Related to FIG. 1 and FIG. 3. Each example shows 4 rows which consist of (from top-to-bottom): (i) the raw LFP data, (ii) the LFP during the stimulation period after mean centering each epoch, (iii) the sliding-window mean evoked potential averaged over 8 epochs and (iv) the LFP after subtracting the sliding-window average evoked potential. The final row indicates the threshold for detection of spiking events (dashedline) calculated as 4.5× the standard deviation of the baseline, where the baseline period is indicated by the shaded purple area and defined to be between 500-2500 ms from the stimulation onset. (A)-(D) Indicate examples of trials that were classified as true negative, false positive, false negative and true positive respectively.
Figure 9:
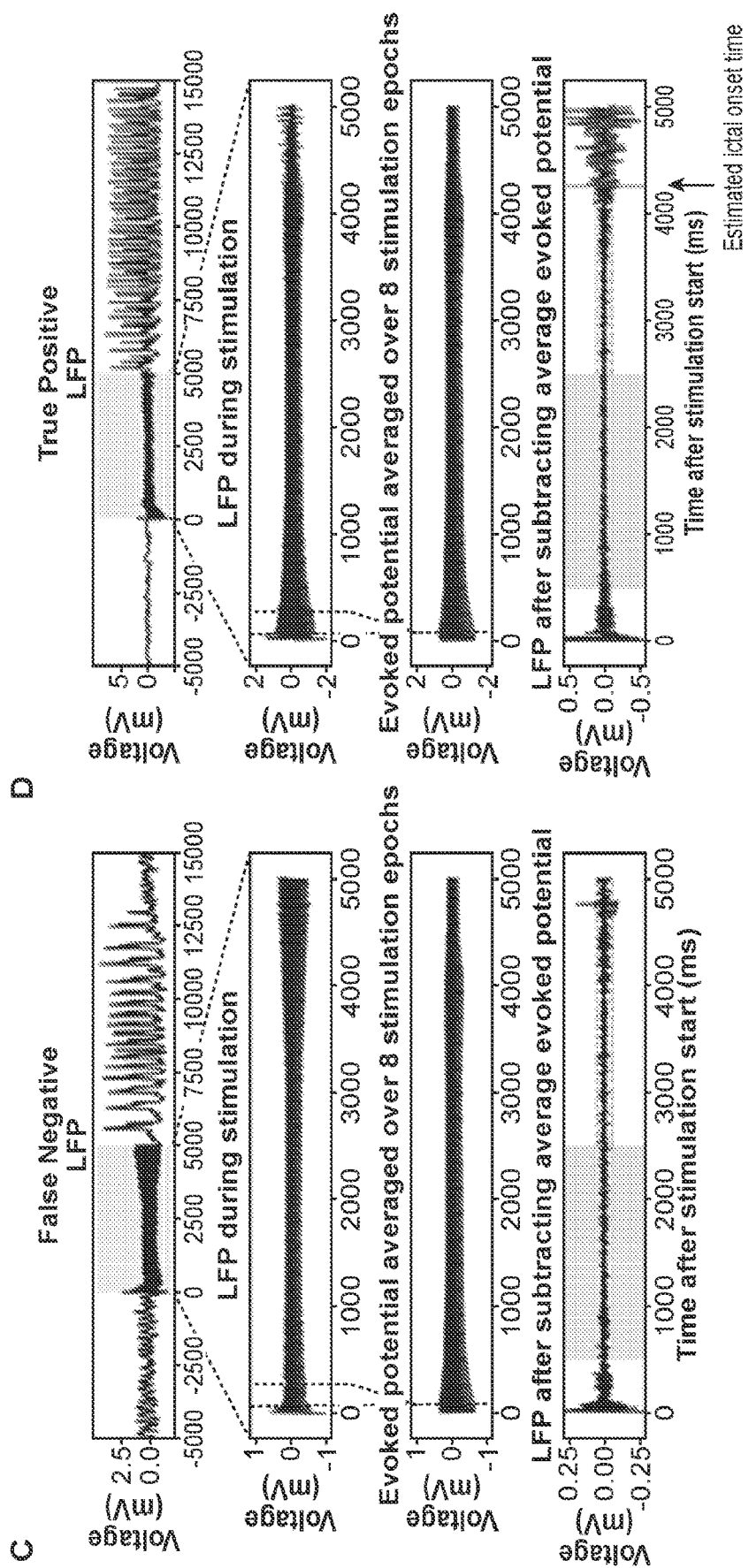

Optogenetic Seizure Initiation in the VH. To induce ADs, CaMKII-positive excitatory neurons in the VH were optogenetically stimulated. Initially, we calibrated the stimulation parameters required to induce an AD in each subject by gradually increasing the light power delivered to the VH until the threshold for AD induction was found (FIGS. 1A and 1B). A mean light power of 5.5±1.1 mW was required for induction of ADs under dexmedetomidine. Optogenetics permits stimulation-artifact-free LFP recordings, which enabled us to estimate the seizure onset time, i.e., the onset of large-amplitude spiking during stimulation. We hypothesized that onset time would be predictive of the probability of generating an AD and therefore developed a method for its estimation. Examples of onset time estimation are shown in FIG. 9. A sliding window of the evoked response was subtracted from the data to reveal epileptiform discharges, which were detected using a thresholding approach.

Figure 10:
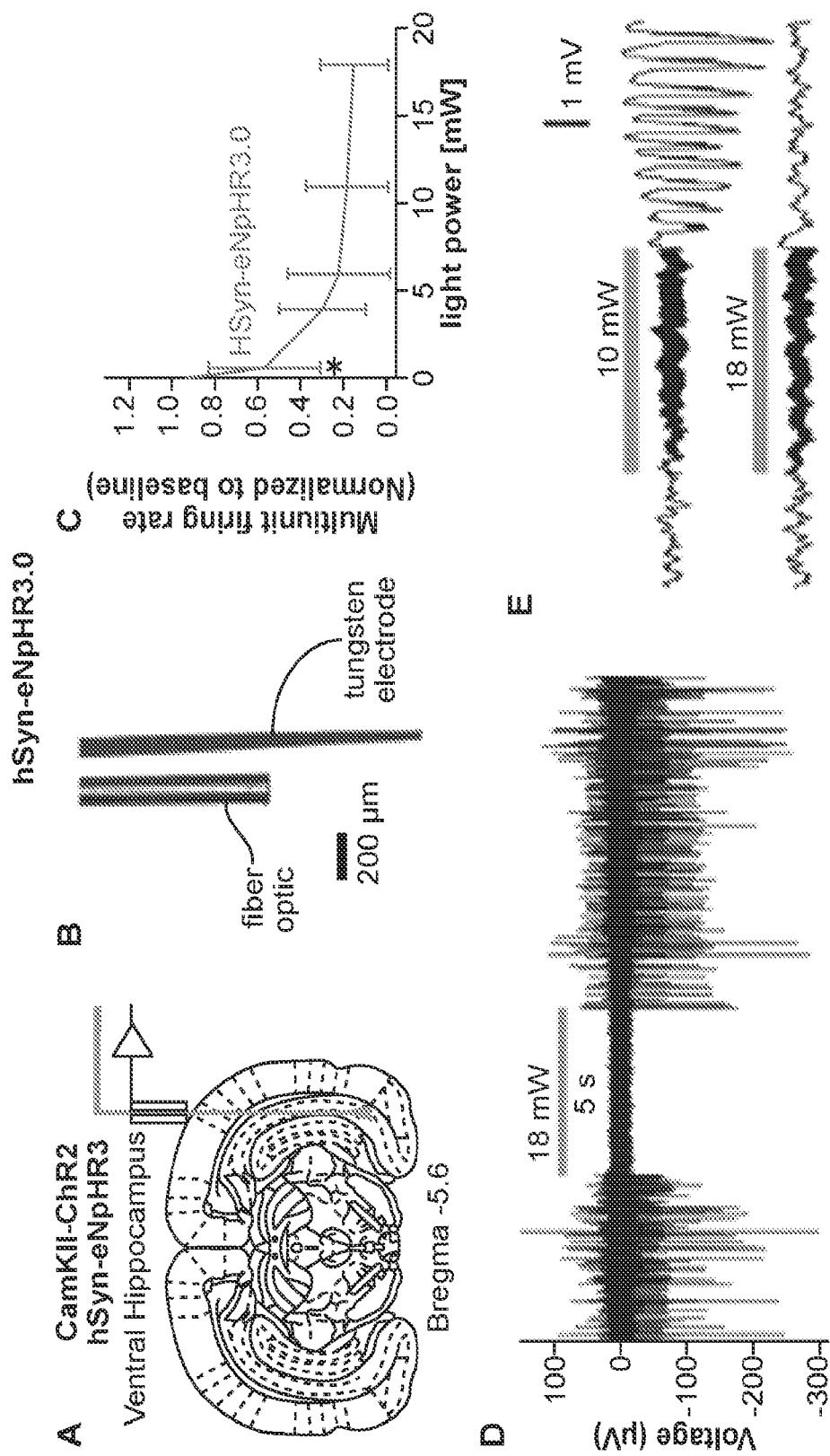
FIG. 10: hSyn-eNpHR3.0 optogenetic inhibition suppresses local spiking activity and prevents afterdischarges if applied simultaneously during optogenetic stimulation. CAMKII-eNpHR3.0 was not effective at inhibiting spontaneous firing and curtailing ADs. Related to FIG. 2 and FIG. 3. (A) Optrodes were implanted into the ventral hippocampus for electrophysiology and optogenetic excitation and inhibition. (B) Photograph taken under a light microscope of the tungsten optrode used for multiunit recordings. The tip of the electrode was measured to be approximately 0.65 mm from the fiber tip to ensure that the multiunit recording took place in the cone of illumination originating from the fiber tip. (C) Multiunit firing rate during the stimulation period as a fraction of the baseline firing rate for hSyn-eNpHR3.0 expressing rats (n=2 animals, 21-30 trials for each light power). Data are plotted as the mean±standard deviation across trials. (D) Example of a single trial multiunit recording trace from a rat expressing eNpHR3.0 under the hSyn promoter at the highest light power (18 mW) used during recordings. (E) Where ChR2 and eNpHR3.0 were stimulated simultaneously, higher light intensities were also more effective at preventing the onset of ADs. where the upper panel show example illustrating that lower light powers e.g. <10 mW may be insufficient to prevent the onset of afterdischarges when neurons were optogenetically excited and inhibited simultaneously. Lower panel indicates that during the same session, if the power is increased e.g. to 18 mW, then optogenetic inhibition prevented the occurrence of ADs. * indicates the mean firing rate is less than the baseline based on a one-sample t-test and a significance level of p <0.05. (F) Example of a single trial multiunit recording trace from a rat expressing eNpHR3.0 under the CAMKII promoter at the highest light power (30 mW). (G) Multiunit firing rate during the stimulation period as a fraction of the baseline firing rate for CAMKII rats (n=2 animals, 15-30 trials for each light power, except for 0.5, 6 and 20 mW which only include data from a single animal). Data are plotted as the mean±SD across trials. (H) Example LFP traces from rats expressing CAMKII-eNpHR3.0 illustrating examples where optogenetic inhibition was considered to have failed to curtail ADs (top panels) and where optogenetic inhibition was considered to have succeeded in curtailing ADs (lower panels). The traces on the left and right panels are from the same recording sessions. The left panels are from stimulations consisting of the control condition (ChR2 only) and the right panels are from where the optogenetic inhibition has been applied immediately following the ChR2 blue light stimulation. (I) Histograms of AD duration for the two different stimulation conditions. (J) Proportion of ADs exceeding 2.5 in duration for the two different conditions. p <0.05 based on paired t-tests for n=7 subjects. (K) Confocal immunofluorescence from rats injected with CaMKIIeNpHR3.0-mCherry showing robust eNpHR3.0 expression.

Predicting Successful Generation of ADs. To determine the relationship between the ictal onset time and the severity of the resulting ADs, we compared this ictal onset time to the probability of successful AD generation, which was defined here as those longer than 2.5 s in duration (measured from the end of the stimulation period). Visually, trials with sustained ADs were associated with an earlier ictal onset time, compared with stimulations that did not persist for longer than the duration threshold (FIG. 1B). To test the reliability of this observation, we first compared the onset times between trials with sustained ADs and subthreshold trials shorter than the 2.5 s threshold (no AD, 206 trials; AD, 192 trials; n=13) (FIG. 10) and found that trials that progressed to AD had significantly earlier ictal onset times compared with those that did not. This relationship was clear in most subjects; however, in some subjects, e.g., subjects 6 and 8, there was frequently no detectable spiking before the end of the stimulation period. Because different subjects are known to have different propensities for ADs, the AD probability was modeled using a hierarchical Bayesian model with ictal onset time as the explanatory variable and the intercepts ($b_0$) allowed to vary across subjects (FIGS. 1C and 1D). FIG. 1C shows the observed data for individual subjects alongside the mean±95% credible intervals of the posterior predictive distribution. The data generated from the model reproduce the pattern of the observed data well, suggesting a good model fit. Earlier onset significantly predicted the occurrence of ADs, indicated by the ictal onset regression coefficient and their 95% highest-posterior density (HPD) uncertainty intervals being greater than zero.

We assessed the sensitivity and specificity of the varying intercept model on held-out data and using a receiver operating characteristic (ROC) analysis. A ROC area under curve (AUC) of 0.87 was obtained using a 10-fold cross-validation (FIG. 1E), while the pooled model yielded an AUC of 0.79, demonstrating the advantage of using a hierarchical model over a model in which the data were pooled across subjects. False-positive classification occurred occasionally, typically when the LFP exhibited early-onset spiking, but ADs did not persist longer than the 2.5 s threshold (FIG. 9B). False negatives were typically associated with increased amplitude in time with the stimulation frequency but without detectable spiking (FIG. 9C). After establishing that it was possible to reliably invoke ADs using optogenetic stimulation and identifying that ictal onset time provided a predictive marker of AD generation, we investigated the possibility of interrupting ADs by silencing local neuronal populations at the site of AD initiation.

Figure 8:
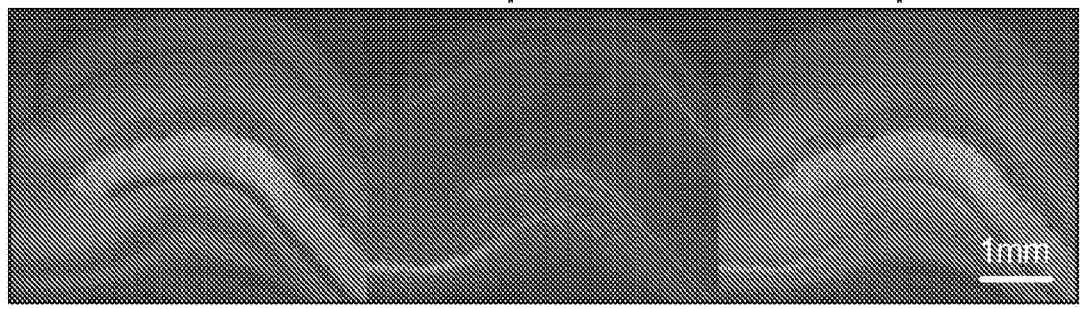
FIG. 8: Expression of CaMKII-ChR2-YFP and eNpHR3.0-mCherry in the dorsal and ventral hippocampus following co-injection of 2 separate viral vectors. Related to FIG. 1 and FIG. 2. (A) and (B) Widefield fluorescence images of the ipsilateral dorsal and ventral hippocampi respectively. (C) Confocal images within the ventral hippocampus show that expression of ChR2-YFP is localized in the soma and dendrites whereas eNPHR3.0 is predominantly localized in the soma. NpHR3.0-mCherry cells co-localize with CaMKII positive cells as well as CaMKII-negative cells. Blue arrows indicate colocalization of ChR2 and NpHR3.0, whereas yellow arrows indicate colocalization of NpHR3.0 with inhibitory GAD67-positive cells. NpHR3.0-positive cells that did not co-localize with ChR2-YFP positive cells tended to co-localize with inhibitory GAD67 positive cells.
Figure 8:
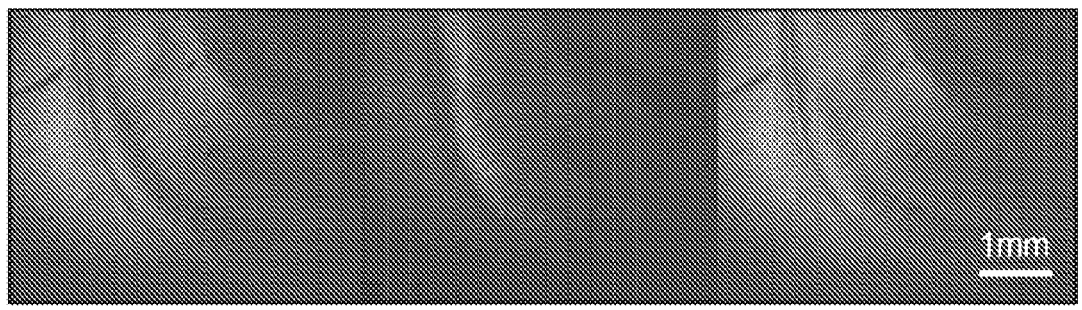
Figure 8:
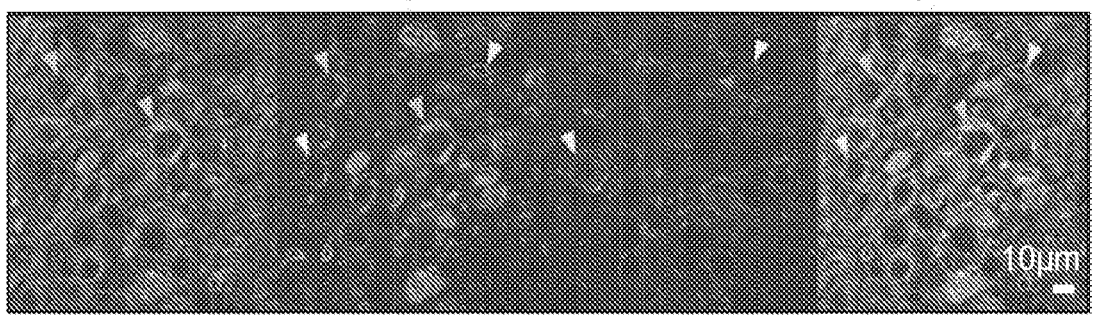

Expression of Both ChR2 and eNpHR3.0 in Overlapping Cell Populations. To determine the effectiveness of inhibiting local neuronal populations in interrupting ADs in the VH, we targeted the hSyn promoter to express eNpHR3.0 in all neuronal subtypes. Coexpression of both inhibitory and excitatory opsins was confirmed from histological sections taken from rats coinjected with both AAV5-ChR2 under the CaMKII promoter and AAV5-eNpHR3.0 under the hSyn promoter. Although we expected that the efficiency of transduction could suffer upon simultaneous administration of the 2 viruses, confocal data suggested that it was possible to (non-stoichiometrically) express both opsins in overlapping cell populations, with ChR2 predominantly expressed in axons and dendrites and eNpHR3.0 more strongly expressed within the soma (FIGS. 8A and 8B). As expected, rats injected with the hSyn-eNpHR3.0 virus expressed the inhibitory opsin in both CaMKII-positive excitatory neurons and GAD67 positive inhibitory neurons (FIG. 8C).

Optimization of the Light Intensity Needed for Optogenetic Inhibition. To determine the approximate light intensity needed for inhibition of local ventral hippocampal neurons using eNpHR3.0, we assessed spiking at the local site with multi-unit activity (MUA) recordings. A combined optrode for light delivery and MUA recordings was constructed such that the tip of the tungsten electrode lay approximately 0.65 mm below the optical fiber tip (FIGS. 10A and 10B). As expected, delivering continuous 589 nm orange light to activate eNpHR3.0 was effective at inhibiting spontaneous neuronal firing in the VH in rats expressing hSyn-eNpHR3.0 (FIGS. 10C and 10D).

We then tested the capacity of eNpHR3.0 inhibition to suppress optogenetic stimulation by activating eNpHR3.0 and ChR2 simultaneously. We found that at lower light intensities, e.g., below 10 mW (1,100 mW/mm$^2$), eNpHR3.0 inhibition did not prevent ADs, despite inhibition (FIG. 10E). Where higher light intensities were used, e.g., above 18 mW (2,079 mW/mm$^2$), this was effective at preventing the occurrence of ADs in rats expressing eNpHR3.0 under the hSyn promoter (9 trials in 3 animals); therefore, a slightly higher intensity—21 mW (2,425 mW/mm$^2$)—was used to maximize the probability of seizure suppression across the rest of the experiments. In addition to testing the effectiveness of inhibition using hSyneNpHR3.0, we tested CaMKII-eNpHR3.0 but found it to be less effective at inhibiting spontaneous firing and ADs (FIGS. 10F-10K), potentially because of the lower virus titer available or selective targeting of excitatory neurons. Therefore, we focused on inhibition of hSyn-positive neurons for seizure suppression.

Figure 2:
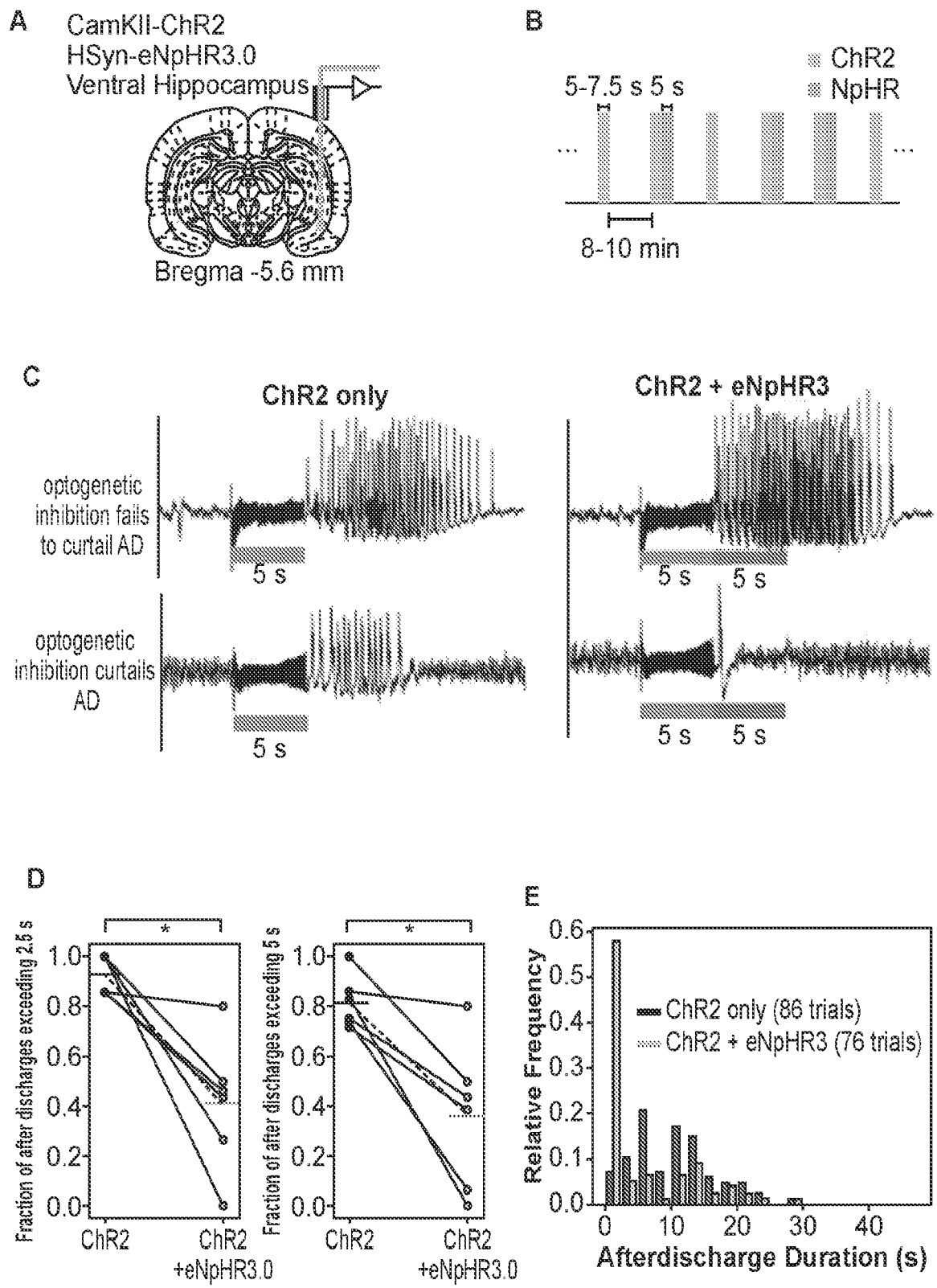
FIG. 2. Local Optogenetic Inhibition Could Curtail Seizure-like ADs. (A) VH was targeted for electrophysiology and optogenetic excitation and inhibition. (B) Experimental design. ChR2 excitation only and ChR2 followed by NpHR3.0 inhibition blocks were randomized and applied with a 10 min inter-stimulus interval. Example LFP traces from rats expressing hSyn-eNpHR3.0 illustrating examples in which optogenetic inhibition was considered to have failed to curtail ADs (top panels) and in which optogenetic inhibition was considered to have succeeded in curtailing ADs (bottom panels). The traces on the left and right panels are from the same recording sessions. The left panels are from stimulations consisting of the control condition (ChR2 only), and the right panels are from cases in which the optogenetic inhibition was applied immediately following the ChR2 blue light stimulation. These examples illustrate that ADs from sessions in which the optogenetic inhibition fails to curtail the AD appeared longer and more severe. (D) Proportion of ADs exceeding 2.5/5 s in duration for the two conditions: the control condition (ChR2 only) versus the optogenetic inhibition condition (ChR2+eNpHR3). (E) Histograms of AD duration for the two stimulation conditions. This metric was included because AD duration can be highly variable across sessions and subjects. *$p < 0.05$ represents based on paired t tests for n=6 subjects.

Interruption of Seizure-like ADs in the VH Using eNpHR3.0. First, we tested the possibility of interrupting ADs in the VH using local inhibition immediately following the seizure-generating stimulation (FIGS. 2A and 2B). As indicated by the examples in FIG. 2C, we found that in certain cases, seizure-like activity could be interrupted within the 5 s period of optogenetic inhibition, but large-amplitude spiking still occurred for a few seconds during the early period of successful inhibition. Therefore, to capture the relative success and failure of inhibition, we binarized the data with AD thresholds at 2.5 and 5 s. At both thresholds, the effect of inhibition was robust and effectively decreased the AD probability (FIG. 2D). The distribution of the AD durations with and without inhibition are shown in FIG. 2E. The median AD duration without inhibition was 10.1±4.2 s, and with inhibition, it was shortened to 0.83±8.6 s. The AD duration was significantly reduced in 4 of 6 animals ($p < 0.05$, paired t test) upon optogenetic inhibition (FIG. 2E).

With the aim of testing whether failure of optogenetic inhibition to curtail ADs was related to onset time (FIGS. 3A and 3B), we used a linear hierarchical Bayesian model to examine the relationship between the success and the failure of inhibition and ictal onset time (FIG. 3C), with intercepts allowed to vary across subjects to account for within-subject correlation and different propensities for ADs of different subjects (FIGS. 3C and 3D).

Results from the model suggested that earlier onset time again predicted ADs and that optogenetic inhibition significantly reduced AD probability (both onset time and stimulation condition were significant predictors, because their 95% HPDs of their regression coefficients did not contain zero). The samples drawn from the posterior distribution fit the observed data well (FIG. 3D) and demonstrate how more progressed (earlier onset) ADs were less likely to be curtailed. In addition, the hierarchical varying intercept model demonstrated excellent capacity to predict ADs on held-out data and yielded an AUC of 0.92 on a 10-fold cross-validation (FIG. 3E), compared with 0.9 for the pooled logistic regression model.

Figure 11:
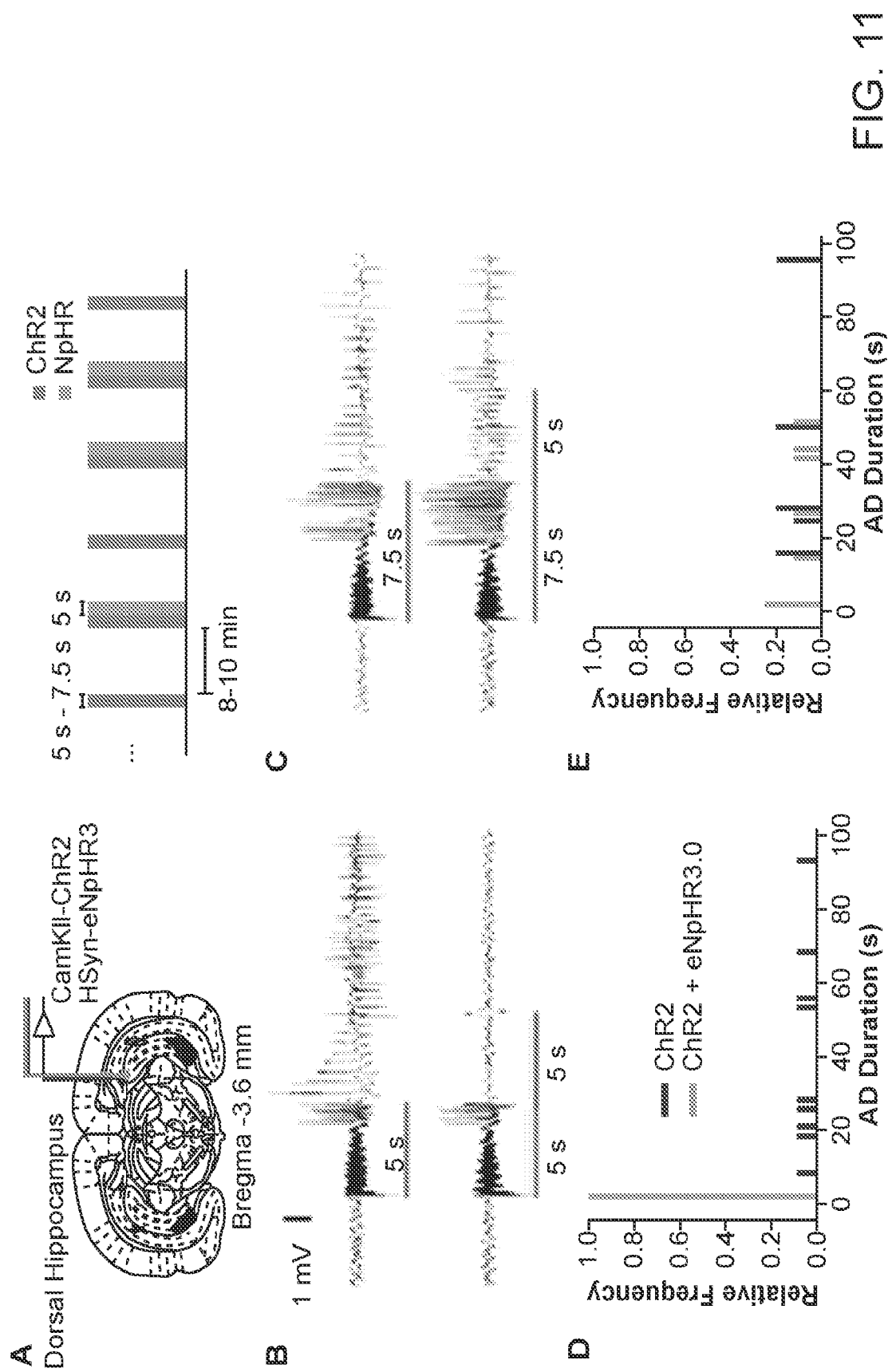
FIG. 11: Local optogenetic inhibition is able to curtail afterdischarges in the dorsal hippocampus for 5 s duration stimuli but not for longer duration stimuli. Related to FIG. 2 and FIG. 3. (A) Optrodes were implanted into the dorsal hippocampus for electrophysiology and optogenetic excitation and inhibition. (B) LFP traces from hSyn-eNpHR3.0 rats illustrating the generation of an AD from 5 sec stimulation without inhibition (upper) and a failed attempt at AD attenuation with optogenetic inhibition (lower). (C) Representative LFP traces from hSyneNpHR3.0 rats illustrating the generation of an AD from 6-7.5 s stimulation without inhibition (upper) and successful AD attenuation with optogenetic inhibition (lower). (D) Histogram of AD duration for 5 seconds of stimulation only (blue) and stimulation with subsequent inhibition (orange). (E) Histogram of AD duration for 6-7.5 seconds of stimulation only (blue) and stimulation with subsequent inhibition (orange). (F) Proportion of ADs exceeding 2.5 s for ChR2 stimulations of 5 s in duration with and without inhibition. (G) Proportion of ADs exceeding 2.5 s for ChR2 stimulations of 6-7.5 s in duration with and without inhibition. (H) Estimated ictal onset time vs. stimulation duration. (I) Estimated ictal onset time vs. whether the AD exceeded 2.5 s.
Figure 11:
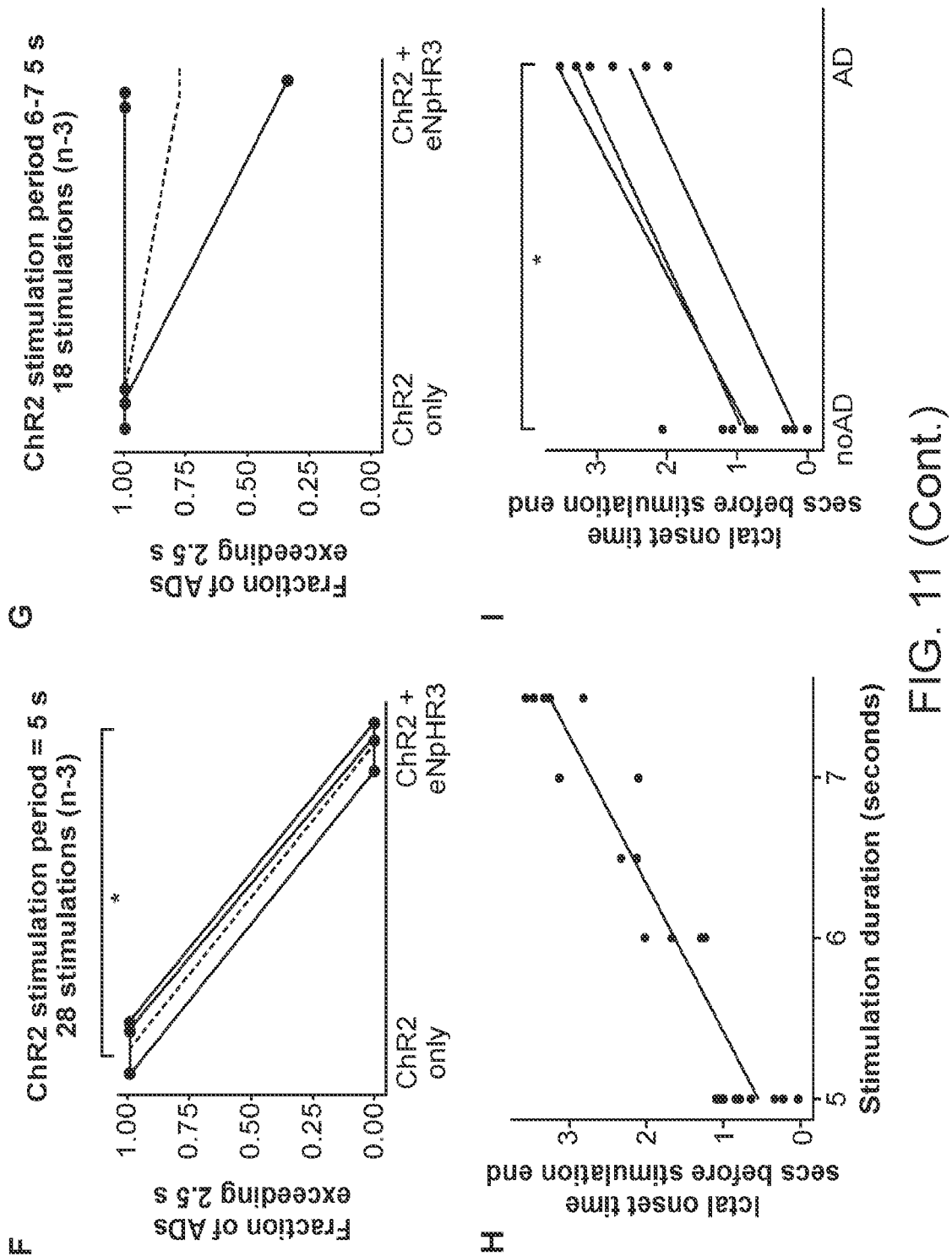

Interruption of Seizure-like ADs in the DH Using eNpHR3.0. To determine whether ictal onset time also provided a predictive marker of AD inhibition in the DH, we applied the same experimental paradigm used in the VH experiments to ADs initiated from the DH (FIG. 11A). Coinjection of the 2 viruses to the DH also led to robust expression of the 2 opsins (FIG. 8A). For the DH, we investigated the impact of ChR2 stimulation duration, because in this case, halorhodopsin appeared to be more effective compared with the VH and it was necessary to increase the ChR2 stimulation duration to generate ADs that would not be effectively curtailed. ADs elicited with shorter-duration (5 s) stimulation periods were interrupted more readily compared with those elicited with longer-duration (6-7.5 s) stimuli; i.e., ChR2 stimulation periods greater than 5 s were not readily curtailed (FIGS. 11A-11E). There was a strong linear relationship (FIG. 11H, $p < 0.05$, t test) between stimulation duration and ictal onset time (which was measured in relation to the end of the stimulation period); therefore, as expected, ictal onset time was significantly earlier in trials that were not curtailed using optogenetic inhibition (FIG. 11I, $p < 0.05$, paired t test), highlighting its utility as a marker of AD inhibition.

Figure 4:
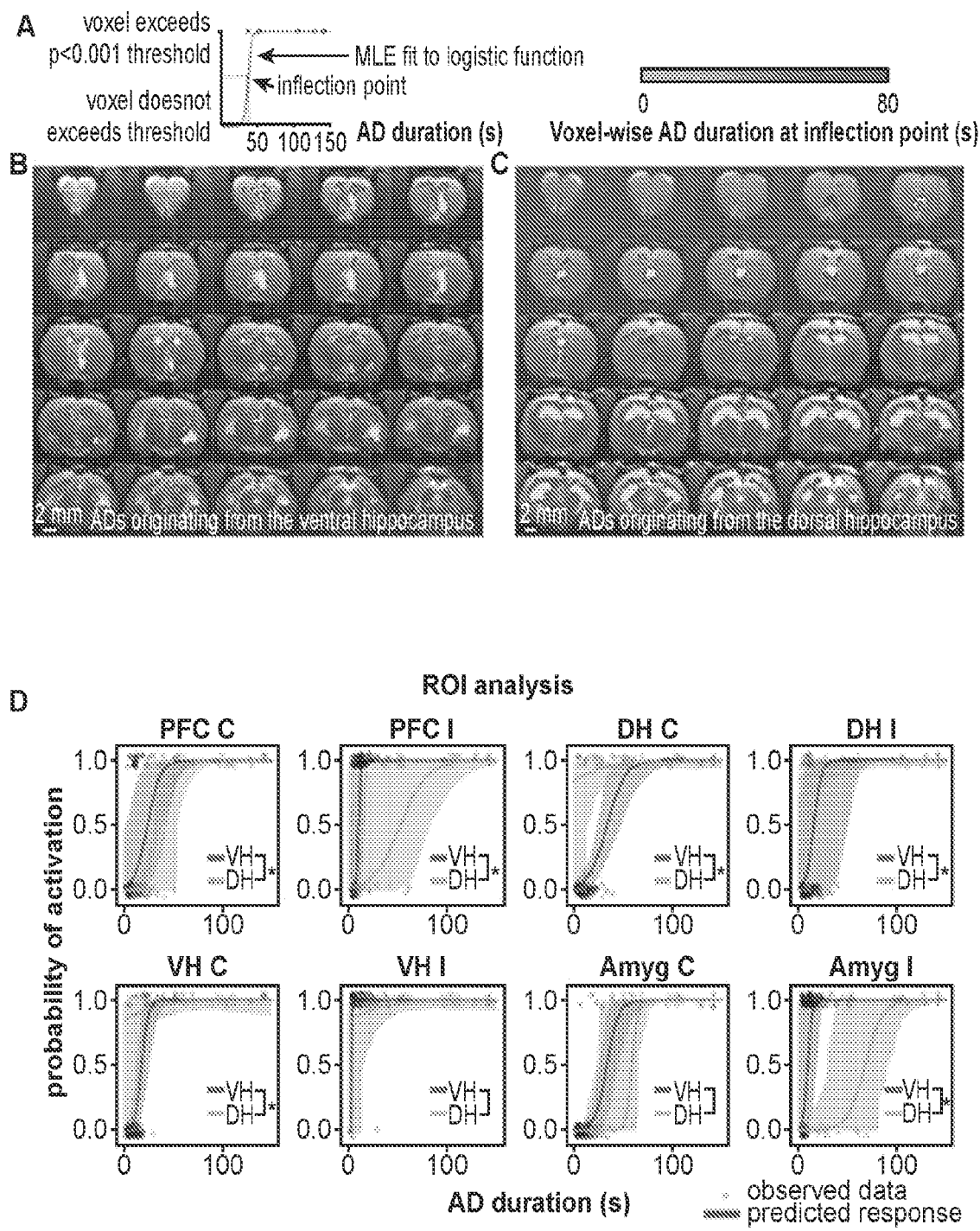
FIG. 4. Voxel-wise Activation Time Maps Comparing the Spread of Seizure Activity between ADs Originating in the DH and VH. (A) A logistic function was fit to each trials (blue dots) that progressed to AD, and the inflection point was used as an estimate of the AD duration at which 50% of trials displayed activation for each voxel. (B and C) Voxel-wise relationship between AD duration and fMRI activation for (B) focal VH ADs and (C) focal DH ADs. Distinct patterns were observed for seizures originating from the VH compared with the DH. Activation is present in the ipsilateral PFC for short-duration ADs, whereas the inflection point is slightly later for the contralateral VH and PFC. However, both the ipsilateral and the contralateral DH are only activated in longer-duration ADs. In seizures originating from the DH, both the ipsilateral and the contralateral DH and VH are activated in short-duration ADs, whereas longer-duration ADs may start to involve cortical regions. (D) ROI-wise analysis. Regions were considered activated if their volume of activation exceeded 10% of the maximum volume within each subject. Observed data are represented as a binary response variable, with 1 representing the region as active and 0 representing not active. The response predicted by the random intercept logistic regression is displayed as the mean±95% bootstrapped confidence intervals. * denotes that the inflection point is significantly different at a level of $p < 0.05$, based on hypothesis testing using parametric bootstrapping (VH, n=6 rats; DH, n=3 rats).rating good predictive performance of the hierarchical model compared with the pooled model. All panels include n=6 rats.
Figure 12:
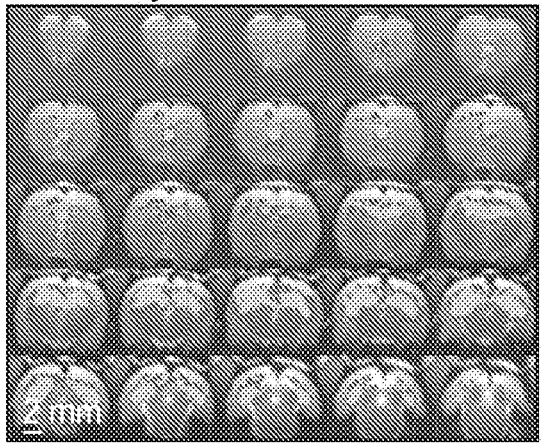
FIG. 12: Voxel-wise activation time maps with and without halorhodopsin inhibition. Related to FIG. 4. There were no obvious differences between the activation time maps with and without optogenetic inhibition from afterdischarges originating from either the dorsal or ventral hippocampi, therefore these data were combined for the analysis in FIG. 4.
Figure 12:
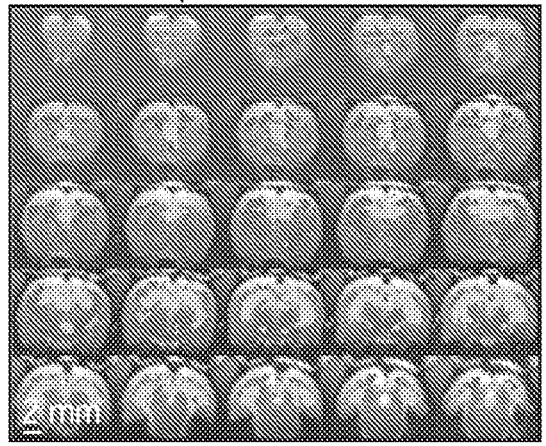
Figure 12:
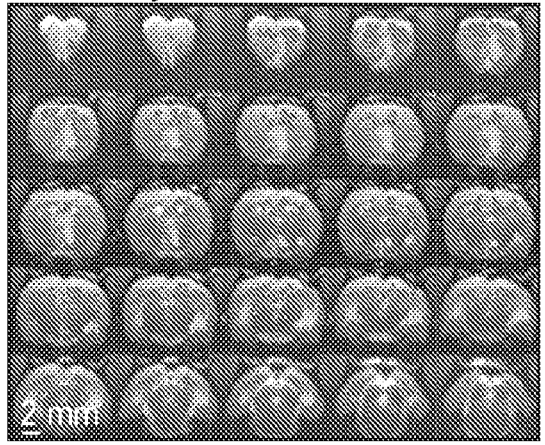
Figure 12:
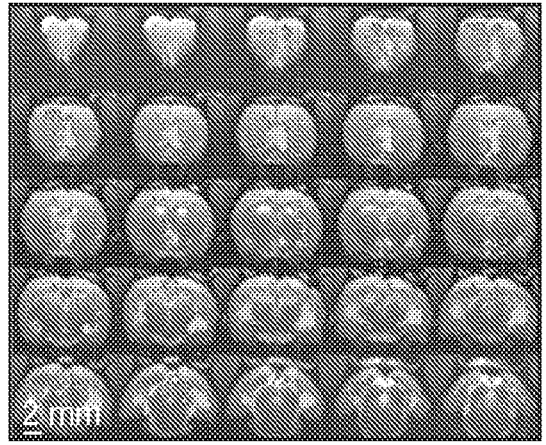
Figure 12:
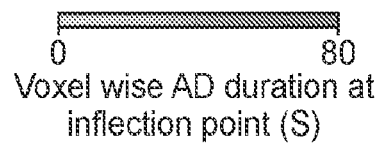

Spread of Activity in ADs Initiated from the DH and VH. It is likely that failure to curtail earlier-onset ADs is related to the spread of seizure activity; therefore, we characterized how activity spreads from both the DH and the VH and examined the extent to which patterns of activity differed between these two initiation sites. Propagation patterns were explored by mapped the relationship between seizure network activity on fMRI and AD duration. A binary variable was used to describe voxels as either active (if they exceeded the $p < 0.001$ statistical threshold) or not active, and a logistic function fit across all subjects and trials as a function of the AD duration, as illustrated in FIG. 4A. The inflection point of this fitted curve provided an estimation of the average activation time at each voxel during an AD and thus was used to visualize the spread of seizure activity over the course of ADs originating in different regions. Among the trials that resulted in ADs, there was no difference between the activation time maps with and those without optogenetic inhibition (FIG. 12); therefore, these data were combined. These maps exhibited distinct patterns in seizures initiated from the DH compared with the VH. ADs originating from the VH displayed early activation in short-duration ADs in the ipsilateral VH, septum, and ipsilateral prefrontal cortex (PFC) (FIG. 4B). The average activation time in the contralateral VH was 17±2 s later than in the ipsilateral hippocampus, while the contralateral PFC was 18±6 s later than the VH. However, the DH was significantly later (27±5 s), demonstrating that the DH was only active during long-duration ADs.

The activation time map generated from ADs originating from the DH (FIG. 4C) indicated that short-duration ADs involve both ipsilateral and contralateral hippocampi, with a significant spread of activation toward the temporal pole. Longer-duration ADs spread to the PFC and other cortical regions. These data support the idea that contrary to ADs elicited from the VH, focal DH seizures quickly spread bilaterally to the entire hippocampus, whereas focal VH ADs did not involve the DH until later and instead spread to the amygdala and PFC. Quantitatively, the inflection points in different regions of interest (ROIs) were compared using a random-intercept model (FIG. 4D). Activation of the ipsilateral amygdala and both the right and the left PFCs were significantly earlier in ADs initiated from the VH compared with the DH (27±5 and 29±9 s, respectively), while activation of the contralateral hippocampus was 26±3 s earlier in the DH. After mapping the network activation for ADs initiated in the DH and VH, we looked to understand the seizure network that could sustain activity in the presence of local inhibition by investigating the differences between two scenarios in which seizure activity sustained despite local inhibition and in which it was curtailed. Furthermore, the analysis was restricted to ADs that were <25 s in duration to understand the networks capable of sustaining seizure activity during the early stages of seizure generation and maintenance.

Figure 5:
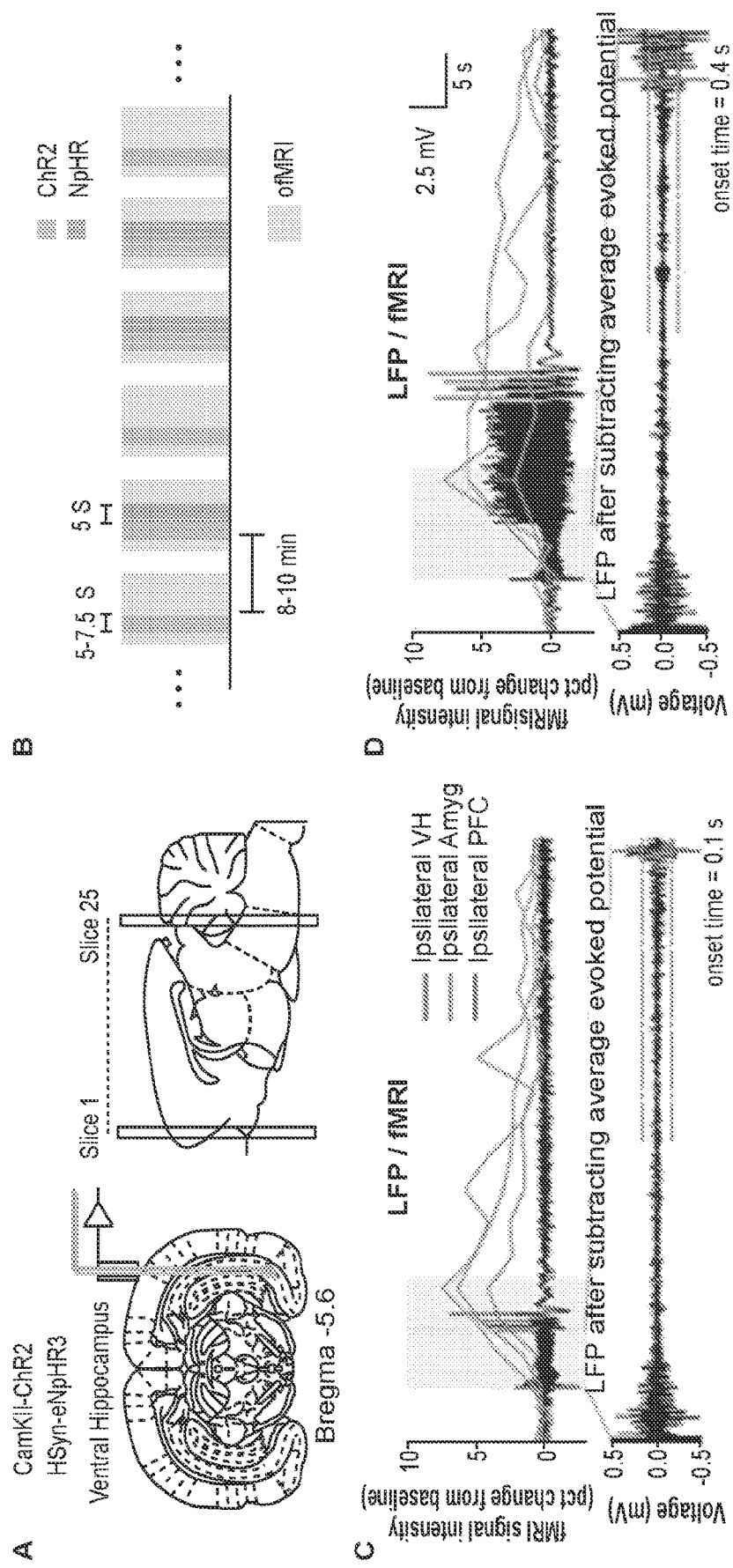
FIG. 5. fMRI Activation Maps for ADs Originating from the VH Indicate that ADs that Did Not Progress Were Limited to the Hypothalamus, Amygdala, and PFC. (A) Optrodes were implanted into the VH for electrophysiology and optogenetic excitation and inhibition. (B) Within-session fMRI stimulation paradigm involved randomly alternating between trials that did and that did not involve eNpHR3.0. (C and D) Examples of simultaneously acquired LFP and fMRI signals from different ROIs. (E and F) Fixed-effects group-level analysis (n=3) for trials that did not (E) and did (F) progress to ADs despite optogenetic inhibition. (G) Fraction of the region activated with and without successful optogenetic inhibition of AD. Single-trial t statistic maps are thresholded at $p < 0.001$, uncorrected, whereas group-level activation maps are shown at a threshold of $p < 0.0001$, uncorrected. Data are represented as mean±SEM. Amyg, amygdala; Cpu, caudate putamen; Ent, entorhinal cortex; RSG, retrosplenial granular cortex; ThalDL, dorsomedial thalamus; ThalMD, mediodorsal thalamus; ThalVM, ventromedial thalamus. * indicates the fixed-effects difference between AD versus no AD at a significance level of 0.05.
Figure 5:
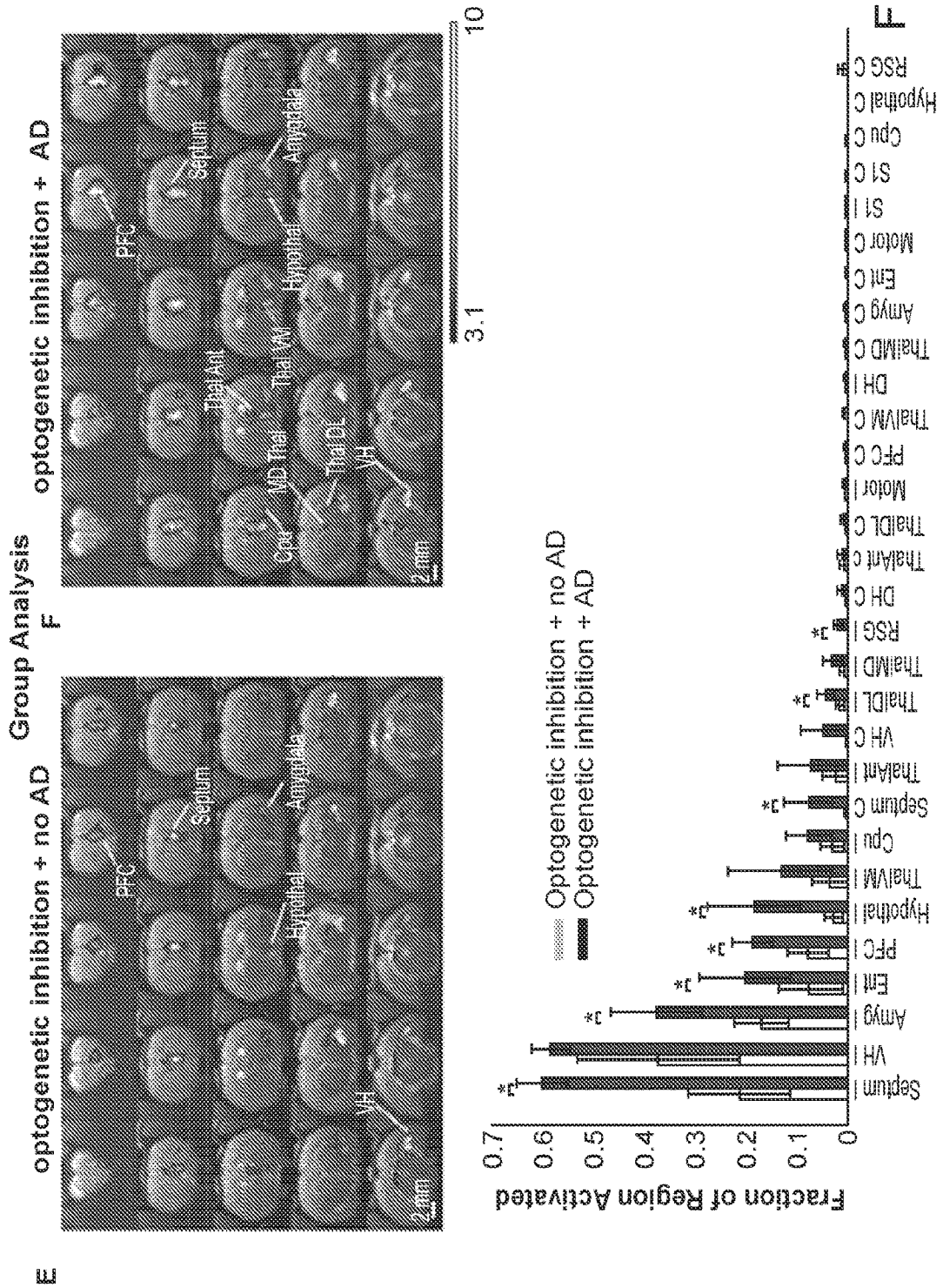
Figure 13:
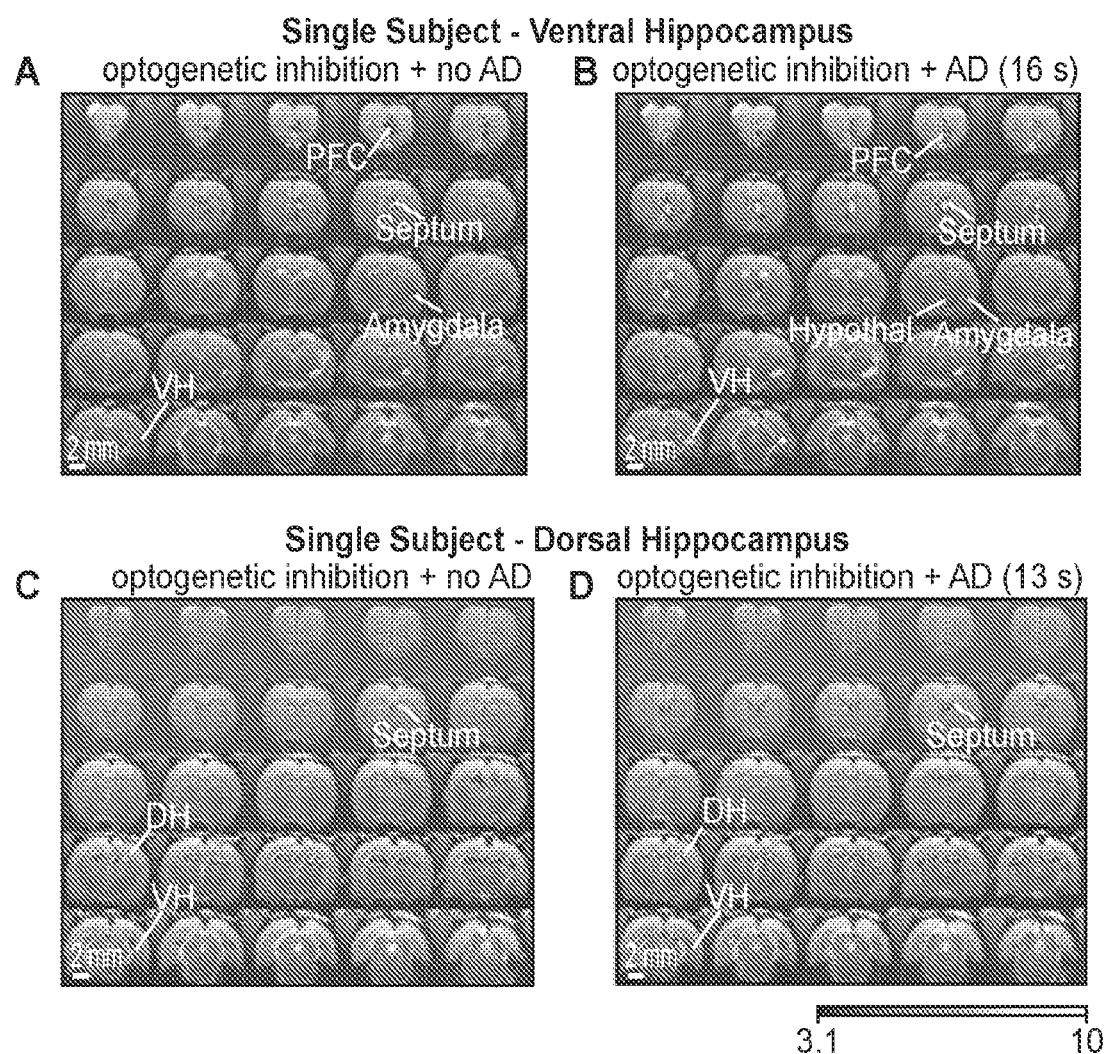
FIG. 13: Examples of optogenetic fMRI activation maps for individual trials in the ventral and dorsal hippocampus. Related to FIG. 5 and FIG. 6. Activation maps correspond to the same trials as the time series in FIG. 4c,d and FIG. 5c,d. Dorsal Hippocampus: (A) single-trial fMRI activation map (t-statistic) of short duration AD that was curtailed by optogenetic inhibition. (B) fMRI activation map of short duration AD that progressed despite optogenetic inhibition. Ventral Hippocampus: (C) fMRI activation map of short duration AD that did not progress to AD in the face of optogenetic inhibition. (D) single-trial fMRI activation map (t-statistic) of a short duration AD that was not curtailed by optogenetic inhibition. T-statistic maps are thresholded at $p < 0.001$, uncorrected.

Simultaneous LFP and fMRI of ADs in the VH. Whole-brain fMRI imaging was used to investigate which regions were involved in ADs that could not be curtailed using local inhibition (FIGS. 5A and 5B). A typical activation map from a trial that was curtailed by optogenetic inhibition displayed only local activation alongside activation of the septum and limited regions within the PFC (FIG. 13A). A single, short-duration (16 s) AD from the same session that sustained despite optogenetic inhibition involved activity across a large volume in the anterior-posterior direction of the VH, as well as the lateral septum, hypothalamus, anterior thalamus, and PFC (FIG. 13B). There appeared to be involvement of the anterior amygdala, although susceptibility artifacts arising from the air-tissue interface surrounding the ear canal limited a more thorough assessment of the posterior amygdala. Within the hippocampus, activity was restricted to the ventral region and did not spread to the DH. Where ADs were not sustained, the LFP (FIG. 4C) displayed high-amplitude spiking following the end of the stimulation period. Where ADs persisted, the fMRI response within the ipsilateral PFC, amygdala, and PFC was also prolonged (FIG. 5D). The fixed-effects group-level activation maps (FIGS. 5E and 5F) were in accordance with the single-trial examples, but in addition, there was activation across the anterior, medial-dorsal, ventral-medial, and dorsal-lateral subregions of the thalamus. These findings were consistent across subjects, as illustrated by the ROI activation volumes (FIGS. 5F and 5G).

Figure 6:
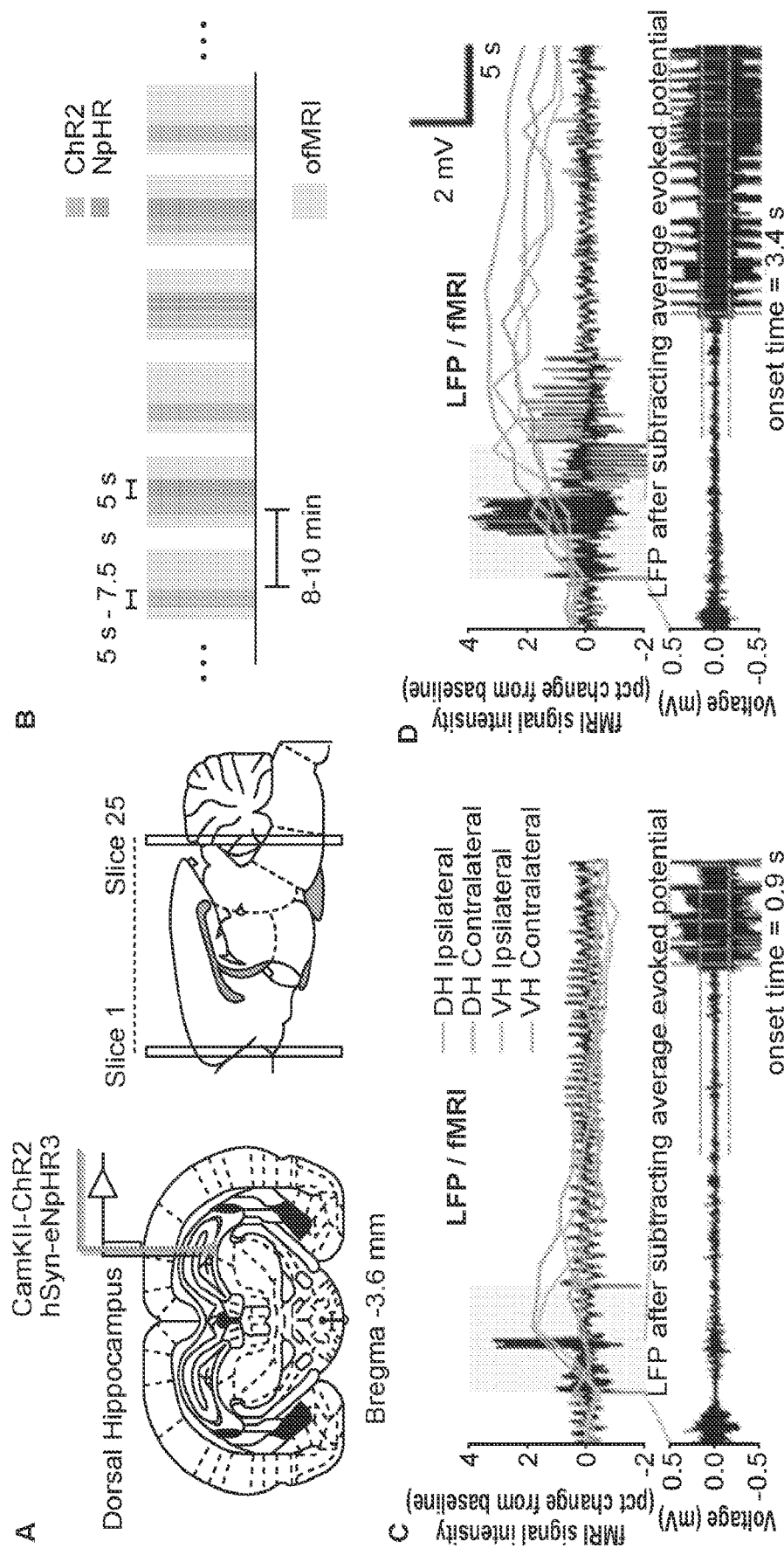
FIG. 6. fMRI Activation Maps with DH Stimulation and Inhibition Show that ADs Did Not Progress and Were Limited to the Anterior DH (A) Optrodes were implanted into the DH for electrophysiology and optogenetic excitation and inhibition. (B) Within-session fMRI stimulation paradigm involved randomly alternating between trials that did and did not involve eNpHR. (C and D) Simultaneously acquired LFP and fMRI signals from different ROIs. (E and F) Fixed-effects group-level (t statistic) analysis (n=3) for trials that did not (E) and did (F) progress to ADs despite optogenetic inhibition. (G) Fraction of region activated with and without successful optogenetic inhibition of ADs. The t statistic maps are thresholded at $p < 0.0001$, uncorrected. Data are represented as mean±SEM. Amyg, amygdala; Cpu, caudate putamen; Ent, entorhinal cortex; RSG, retrosplenial granular cortex; ThalDL, dorsomedial thalamus; ThalMD, mediodorsal thalamus; ThalVM, ventromedial thalamus. * indicates the fixed effects difference between AD versus no AD at a significance level of 0.05.

Simultaneous LFP and fMRI of ADs in the DH. Where ADs originating in the DH were curtailed using optogenetics, single-trial fMRI typically displayed bilateral activation across a large volume in the anterior posterior direction of the DH (FIG. 13C). Where ADs persisted, activation spread bilaterally across the hippocampus and dorsal septum (FIG. 13D) but exhibited a greater spread of activity toward the temporal pole of the hippocampus. For trials that were curtailed, large-amplitude spiking that commenced toward the end of the ChR2 stimulation did not continue for longer than the 2.5 s threshold (FIG. 6C). Where ADs did persist, a prolonged fMRI response was exhibited across the entire hippocampus, with a delayed response in the VH compared with the DH (FIG. 6D). The group-level fixed-effects analysis supported the results from the trial examples. Specifically, where ADs were not sustained (FIG. 6E), activity spread toward the temporal pole of the hippocampus ipsilaterally but remained highly restricted within the DH on the contralateral side. Where ADs persisted, activation typically spread bilaterally throughout the entire hippocampus, as well as the retrosplenial cortex (FIG. 6F). Quantitatively, 51%±15% of the contralateral DH ROI was activated when ADs persisted, compared with 10%±4% when they were curtailed (FIG. 6G).

Effect of Optogenetic Inhibition and High Light Intensity on the fMRI Signal. To rule out fMRI artifacts related to optogenetic inhibition and to demonstrate the effectiveness of optogenetic inhibition at suppressing local activation, we characterized the effect of the inhibition on the fMRI response. A block-design stimulation paradigm was used for detection efficiency (FIGS. 7A and 7B), and rats implanted with optrodes with the DH were used, because in the VH group, the stimulation site was partially obscured by susceptibility artifacts arising from the air-tissue interface of the ear canals.

Figure 7:
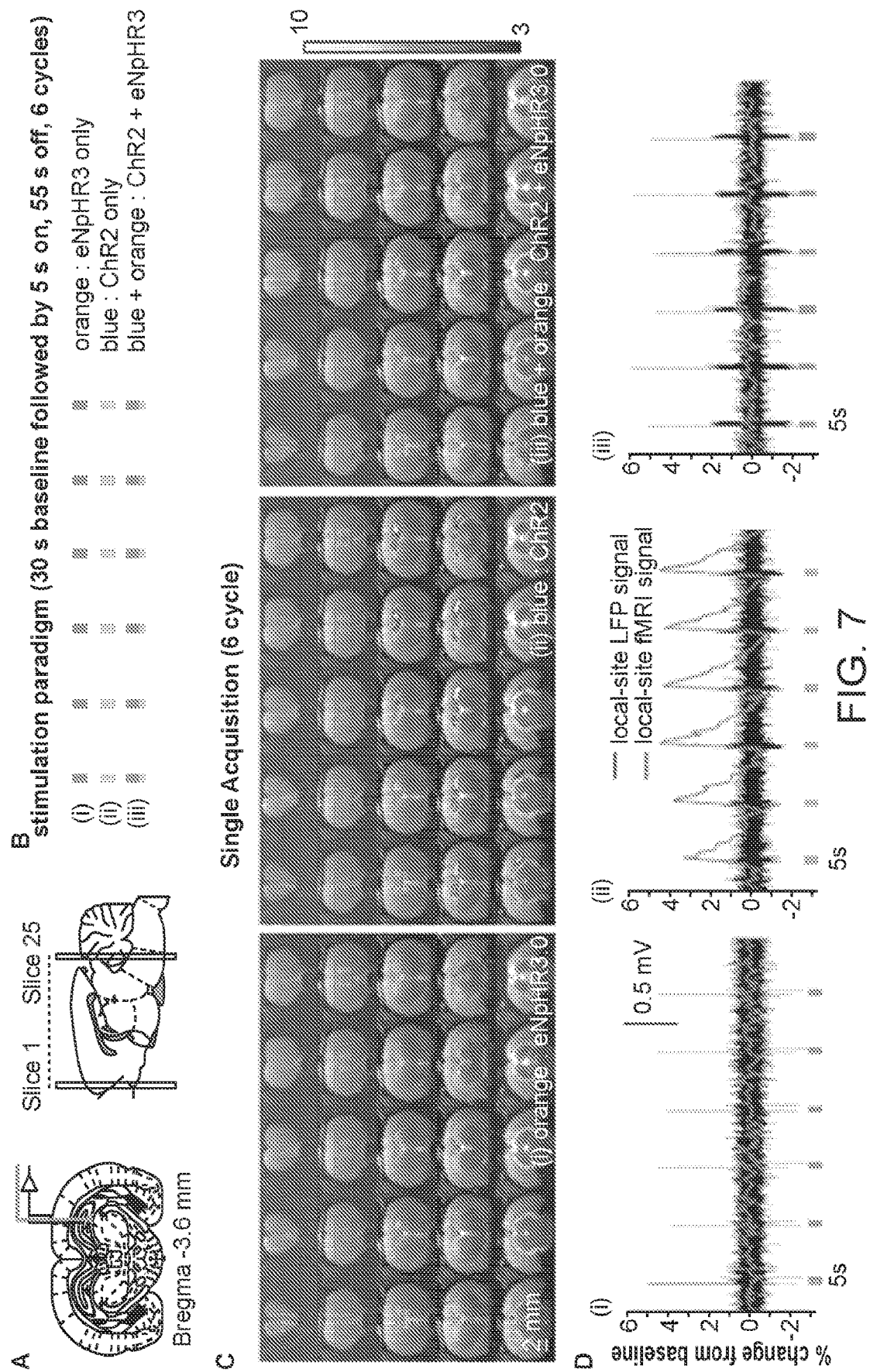
FIG. 7. Optogenetic Inhibition Applied during Optogenetic Stimulation Dramatically Attenuates the fMRI Response, while Applied by Itself, Optogenetic Inhibition Does Not Alter the CBV-Weighted fMRI Signal. (A) Optrodes were implanted into the DH for electrophysiology and optogenetic excitation and inhibition. only). (ii) Optogenetic stimulation of ChR2 using blue light only (ChR2 only). (iii) Optogenetic stimulation and inhibition applied at the same time (ChR2+eNpHR3 together). (C) Typical activation maps from a single trial and single subject for the three conditions listed above. (D) Time courses for fMRI and LFP for the example data shown in (C). Local optogenetic inhibition applied during activation of ChR2 almost eliminated the fMRI response, whereas the LFP response to ChR2 stimulation remained intact. (E) Fixed-effects fMRI analysis activation maps generated from across all trials and all 3 subjects. (F) Activation volumes for the three subjects plotted for the 4 regions that are activated. Only limited activation occurred in one rat when halorhodopsin and ChR2 were activated simultaneously using blue and orange light. DH I, dorsal hippocampus ipsilateral; DH C, dorsal hippocampus contralateral; VH I, ventral hippocampus ipsilateral; VH C, ventral hippocampus contralateral. All activation maps are shown at p <0.001, uncorrected. (E) Change to orange, blue, and then blue+orange.
Figure 7:
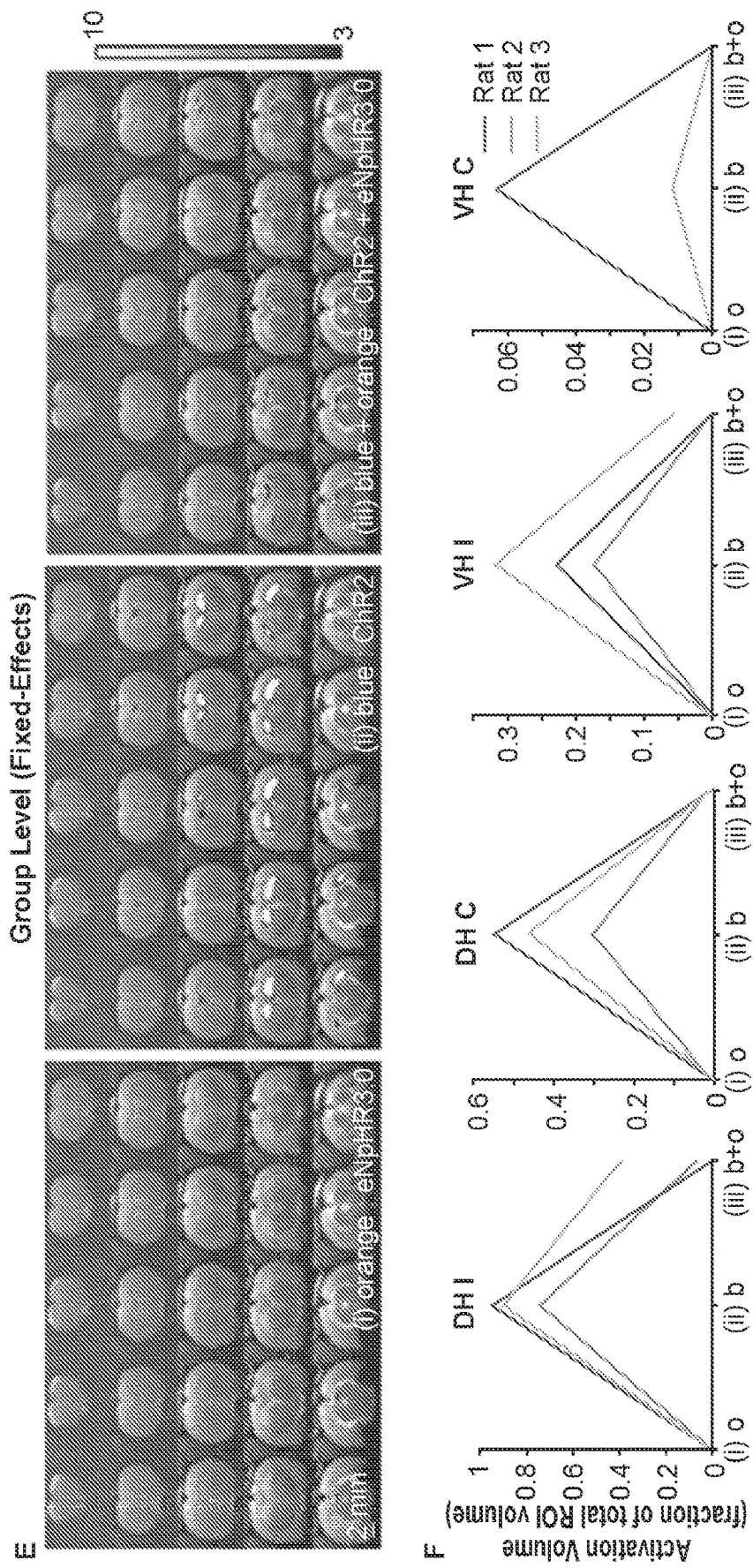

First, to show that we could detect cerebral blood volume (CBV)-weighted fMRI signal changes, we stimulated ChR2-expressing CaMKII-positive neurons in the DH with a low light intensity of 0.7 mW (81 mW/mm$^2$) and observed a strong fMRI response in the ipsilateral and contralateral DH (FIG. 7C, ii). Given that the light intensity we used for the orange laser, at 21 mW (2,420 mW/mm$^2$), was higher than that used for the blue laser, we expected a large volume of optogenetic inhibition to overwhelm the volume of excitation and the CBV-weighted fMRI response to be diminished upon switching the blue and Q10 the orange lasers on at the same time. Our results supported this hypothesis, and as in the example shown in FIG. 7C, iii, the simultaneous optogenetic inhibition almost eliminated the fMRI response to ChR2 stimulation. In addition, as we hypothesized, optogenetic inhibition alone did not evoke an observable change in fMRI signal (FIG. 7D, i), but it did cause some deflection of the LFP at the onset and end of the stimulation pulse. Despite optogenetic inhibition, the effect of ChR2 stimulation was evident on the LFP trace (FIG. 7D, iii), which displayed an evoked response at the stimulation frequency during stimulation periods. The dramatically reduced activation volumes upon simultaneous optogenetic inhibition were consistent in all 3 rats (FIGS. 7E and 7F).

Our results reveal how local inhibition of neuronal populations using optogenetics can reduce the probability of evoked ADs originating in the DH or VH but often fails to curtail ADs. To understand why, we sought to model the extent to which halorhodopsin could suppress ADs using multivariate, hierarchical Bayesian logistic regression with the ictal onset time and the stimulation condition as predictors. Results suggested that onset time predicted both the generation of ADs and the success and failure of optogenetic inhibition to curtail ADs, indicating that more progressed ADs could not be curtailed using local inhibition. Simultaneous LFPfMRI was used to map the seizure networks responsible for sustaining seizure activity in the presence of local inhibition. Distinct networks were identified for ADs originating from the VH compared with those generated from the DH. Interestingly, these networks were largely similar for ADs that could be curtailed compared with those that could not be curtailed, while activity spread more extensively in those that could not be curtailed.

Our statistical model based on the ictal onset time suggests that the effectiveness of local optogenetic inhibition to curtail ADs is related to their progression, with earlier-onset ADs being less sensitive to local inhibition. The hypothesis that earlier-onset ADs were more difficult to curtail was supported in both the VH and the DH and was further supported by the observation that ADs elicited in the DH with shorter-duration (5 s) stimulation periods were interrupted more readily compared with those elicited with longer-duration (6-7.5 s) stimuli, suggesting that local inhibition rapidly became ineffective as seizures spread beyond their focus. LFP-fMRI was used to visualize the spread of seizure activity in which ADs could not be stopped using eNpHR3.0 to those in which they were curtailed locally. Our data suggest that focal seizures elicited from the DH that were interrupted locally reliably involved both hippocampi. Where ADs could not be curtailed, they did not necessarily involve extrahippocampal regions but rather spread farther toward the temporal pole.

ADs elicited from the VH that could be optogenetically disrupted frequently involved limited ipsilateral activation of the septum, amygdala, PFC, and hypothalamus. Short-duration ADs that were not curtailed using local optogenetic inhibition spread extensively throughout these regions, as well as to the thalamus. The network activity involved in ADs that could and could not be curtailed was therefore largely similar but different in extent, while ADs initiated from the DH were dramatically different from those initiated from the VH.

By observing the relationship between fMRI activation and AD duration, we identified highly distinct patterns of activity in focal DH ADs compared with focal VH ADs. ADs elicited from the DH involved the contralateral DH from the start and rapidly spread toward the VH, whereas focal VH ADs typically remained unilateral but gradually spread to the contralateral VH and then to the septal pole. The DH and VH are considered functionally and genetically disparate while exhibiting distinct connectivity to other regions. The VH is most prominently connected to the hypothalamus, amygdala, and PFC, while the DH has dominant projections to the retrosplenial cortex. This connectivity is largely reflected in our data, in which we found seizures initiated from the VH exhibited early activation of the hypothalamus, septum, PFC, and amygdala, while the retrosplenial cortex was the primary extrahippocampal region involved in focal DH ADs. It is surprising that shorter-duration (<25 s) ADs from the VH were predominantly unilateral and that for seizures longer than this, activation in the contralateral hemisphere was evident first in the VH and septum, suggesting that seizure activity might spread to the contralateral hemisphere via the ventral hippocampal commissure. ADs initiated from the DH activated the contralateral DH from the start in all trials. These data are consistent with other fMRI studies, which show that direct electrical stimulation of the DH leads to bilateral activation of the hippocampus, except in the case of significant short-term plasticity, which leads to extrahippocampal spread.

Our results are also consistent with our previous optogenetic fMRI study showing that stimulation of the DH leads to activation patterns limited to the hippocampal formation and retrosplenial cortex, whereas stimulation of the intermediate hippocampus causes more widespread activation of the PFC. In line our data, Motelow and colleagues found that electrically induced focal DH seizures in naive rats lead to fMRI activation limited to both hippocampi, the septal nuclei, and the anterior hypothalamus. Contrary to their work, however, we did not observe the widespread negative fMRI signal throughout the thalamus and cortex. Differences could be explained by different methods of AD induction, including cell-type-specific stimulation, different fMRI contrast mechanisms, and anesthetic regimens. The work by Toyoda and colleagues indicates that spontaneous seizures in the pilocarpine model rapidly spread from the VH to the contralateral VH or to the ipsilateral DH. However, our results indicate that in the non-epileptic brain, ADs initiated from the VH remain unilateral except in the case of longer and more severe ADs, which spread to and possibly are then sustained by the contralateral VH. The current study also provides evidence that in the non-epileptic brain, shorter-duration ADs initiated in the VH did not spread to the DH. It would be interesting to compare these results by using LFP-fMRI in a model of chronic epilepsy to determine whether seizure activity spreads more rapidly across these circuits.

In our study, after the AD threshold was found, we achieved an approximately 80% success rate for inducing ADs, which is in line with that reported by Khoshkhoo et al. (2017). One limitation of the current study is an inability to induce ADs with a 100% success rate. This is particularly relevant because of the necessity of inducing ADs at a level that was just above the threshold for seizure induction but has also been found to be a problem in other studies, which needed to vary the light power and frequency to achieve consistent seizure induction using optogenetics. Excluding the trials that were clearly below the seizure threshold ensured that most included trials would have progressed to ADs in the absence of optogenetic interference. However, a more reproducible method of inducing ADs could not be used, because using a stimulus significantly above the threshold for AD induction would also result in severe ADs that cannot be curtailed using local inhibition. Another limitation relates to the difficulty in separating the fMRI response from the stimulation period to that of the post-stimulus seizure activity. Separating the two responses could enable us to more precisely localize the regions involved during the early phases of seizure maintenance. However, the fMRI response is known to exhibit non-linearity, particularly during spiking activity, which prevented us from taking this approach.

Using CBV-weighted fMRI proved to be highly advantageous compared with blood-oxygen-level-dependent (BOLD) fMRI in that activation was readily detected in single trials without the need for averaging. Furthermore, using CBV-weighted fMRI typically improves detection sensitivity and the contrast-to-noise ratio by at least a factor of 2 over BOLD fMRI and confers more confidence that the activation maps are representative of the true extent of ictal activity. Another advantage of our protocol was the use of short-duration (5 s) optogenetic stimulation to drive relatively short-duration ADs (median=10.1 s), which were therefore typically shorter than ADs or spontaneous seizures in SE models, which last around Q11 a minute. There were two reasons this was advantageous. First, shorter ADs are likely to induce less of a kindling effect. Evidence for this pertains to the fact that we did not observe motor seizures even after a single animal had experienced multiple ADs, and this made it possible to study ADs repeatedly and reproducibly in the same animal, even when ADs originated from the VH, which is known to be kindled relatively rapidly. Second, using relatively mild, short-duration ADs resulted in seizure activity that was limited to a few regions beyond the initiation site, making it possible to map the regions involved early in the course of ictal activity using fMRI, which otherwise lacks the time resolution necessary for investigating the rapid spread of seizure activity.

Finally, previous studies found evidence of heating artifacts on fMRI or evidence of light-evoked vessel dilation. Notably, despite the highly intense (2,420 mW/mm² for a 5 s period) continuous Q12 light at 589 nm, we found no evidence of such artifacts. Unlike the aforementioned studies, our experiments were carried out several weeks after the initial surgery using chronically implanted fibers. This means that blood from the surgical procedure, which absorbs light strongly, may have had time to be cleared. Despite this, we have previously shown it is possible to drive heating related artifacts on fMRI using chronically implanted fibers and a 20 s period of blue light at 2,560 mW/mm². However, it was with a longer stimulation duration than we used in the current study, and blue light will have a significantly higher degree of absorption in brain tissue compared with orange light, leading to enhanced local heating.

In conclusion, we showed that it was possible to curtail optogenetically induced ADs using local optogenetic inhibition and that failure to curtail ADs was explained well by ictal onset time. ADs that could be suppressed locally exhibited similar but less widespread seizure networks compared with those that could not be inhibited. Our results provide important insights for future investigations into targeted epilepsy therapies and further our understanding of the spread of seizure activity from the DH and VH.

Methods

Surgical procedure for virus injection and implantation of optrodes. The surgical procedure was designed to drive expression of both eNpHR3.0 and ChR2 in the ventral hippocampus in overlapping neuronal populations by administering via co-injection of 2 viruses of the same serotype. For AD induction, CAMKII neurons were targeted for ChR2 expression. For the inhibitory opsin, eNpHR3.0, we tested both the human synapsin (hSyn) promoter and also the CAMKII promoter for their capacities to interrupt ADs. Adult male Sprague-Dawley rats (n=18 in total) were obtained from Charles River Laboratories and initially 13 rats were used with eNpHR3.0 expression driven by the hSyn promoter in n=6 rats and the CAMKII promoter in n=5 rats. Under our experimental conditions, hSyn-eNpHR3.0 was more effective at curtailing ADs than CAMKII-eNpHR3.0, therefore only the hSyn group data was analyzed, except for in FIG. 1, where both groups were included as only ChR2 stimulations (without optogenetic inhibition) were examined. Both groups also received viruses encoding for ChR2 under the CAMKII promoter. 1.5 ml AAV-5 eYFP-CAMKII (titer=8.5×1012 vg/ml) and 1.5 ml AAV-5-eNpHR3.0-mCherry viruses were obtained from the University of North Carolina (UNC) vector core at the highest titers that were available at the time (titer=6.7×10$^{12}$ vg/ml for hSyn targeting and 4.7×10$^{12}$ vg/ml for CAMKII targeting).

Rats were anesthetized using 5% isoflurane in pure oxygen and then maintained on 2%-3% throughout the duration of the surgical procedure. Viruses encoding the eNpHR3.0 and ChR2 genes were mixed in a 1:1 ratio (v/v) and injected into the right hippocampus (VH coordinates=AP:−5.6 mm, LR: 5.7 mm, DV:6 mm from dura) using a 33 gauge needle attached to a Hamilton syringe. A syringe pump (Micro 4, World Precision Instruments, FL) was used to ensure a constant rate (150 nl/min) of administration. MRI compatible carbon fiber optrodes, constructed with 0.22 numerical aperture, 105 mm diameter step-index multimodal optical fiber (ThorLabs, Newton, NJ) as described previously (Duffy et al., 2015), were inserted so that the tip of the electrode and fiber resided just above the injection site. Before implantation, the optrodes were checked to ensure that the percentage of light transmission was greater than 70% and light transmission to the brain was estimated to be 70% of the input intensity. Two brass screws were inserted above the cerebellum to anchor the dental cement and to serve as ground and reference electrodes. Finally, the electrode wires were soldered to a DF13 connector (Hirose, Japan) and all components were secured to the skull using light-curable dental cement. Additional subjects (n=2 for the hSyn-eNpHR3.0 group and n=2 for the CAMKII-eNpHR3.0 group) in were used for multi-unit recording and therefore optrodes were not implanted. Sustained release buprenorphine (1 mg/kg, s.c.) was given pre-operatively to alleviate pain and discomfort due to the procedure. Local administration of lidocaine (4%) and bupivacaine (0.25%) was also administered pre- and post-operatively. To allow time for viral-induced protein expression, experiments were performed at least 6 weeks following the surgical procedure.

Following initial experiments that indicated that eNpHR3.0 expression under the hSyn promoter was more effective at curtailing ADs compared to experiments targeting CAMKII, an additional group of (n=3) rats where the hSyn-eNpHR3.0 and hSyn-ChR2 viruses were coinjected into the dorsal hippocampus (DH coordinates=AP:−3.6 mm, LR:3.2 mm, DV:2.2 mm from dura) were included for comparison with the VH targeting experiments.

Electrophysiology recordings. LFP recordings outside of the MRI environment were performed using a differential amplifier (DP304, Warner Instruments) and a data acquisition system (USB 6259, National Instruments). Multiunit recordings were performed using the OpenEphys system and a sharpened tungsten electrode (0.5 kOhm impedance, 120 mm diameter, AM systems) attached to a 105 mm diameter optical fiber.

Anesthesia regimen for induction of seizure-like afterdischarges. Rats were sedated using a bolus (0.05 mg/kg), followed by a continuous intravenous (i.v.) infusion (0.1 mg/kg/h) of dexmedetomidine via a 24-gauge catheter inserted into one of the lateral tail veins. Using this anesthetic regimen, we have previously shown that it is possible to reproducibly induce ADs (Duffy et al., 2015). At the end of each session, atipamezole (0.5 mg/kg, s.c.) was given to partially reverse the effects of dexmedetomidine.

Induction of seizure-like afterdischarges. For selectively stimulating ChR2 expressing cells to induce ADs, we used a 473 nm (blue light) diode-pumped solid-state laser (Laserglow Technologies, Toronto, Canada). A train of 200 pulses (7.5 ms in duration) with a frequency of 40 Hz was generated using a Master-9 (AMPI, Israel) pulse stimulator. The duration of the pulse train was 5 s. To find appropriate parameter thresholds for AD induction, light intensity was gradually increased by stimulating every 2 minutes with an increased intensity in steps of 0.35 mW (40 mW/mm$^2$ per pulse at the fiber tip) starting at 0.7 mW (80 mW/mm$^2$). If no ADs were induced at the level of 1200 mW/mm$^2$, then during MRI imaging sessions the duration of the pulse train was increased up to 7.5 in steps of 0.5 s. After the threshold was found, an 8 to 10-minute interstimulus interval between consecutive stimulations was used to abate any post-ictal refractory effects. For selectively hyperpolarizing eNpHR3.0 expressing cells, a 589 nm (orange light) diode-pumped solid-state laser (Laserglow Technologies, Toronto, Canada) was used. The orange light was delivered continuously for 5 s to the same location as the blue light (through the same optical fiber). The light was switched on and off using a mechanical shutter (Uniblitz, Vincent Associates, NY) triggered with the Master-9 to enable stable light intensity and precise timing. The orange light was applied immediately after the blue light was switched off. This condition was compared to a control condition in which no orange light was applied. For each individual session, a random permutation of the set containing 5 orange light stimulations and 5 control conditions was used to generate equal numbers of each condition within sessions. If no ADs were elicited during a control stimulation, then the light intensity was increased by 40 mW/mm$^2$ until ADs could be induced.

fMRI data acquisition. All data acquisition was performed using the 7T horizontal-bore system (Bruker BioSpec 70/30) at the Stanford Center for Innovation in In-Vivo Imaging (SCi3). An 86 mm diameter 2-channel volume coil was used for RF excitation with a 20 mm single-loop surface coil as the RF receiver. Similar to the recording sessions outside of the scanner, during MRI acquisitions, rats were sedated using a bolus (0.05 mg/kg, s.c.) of dexmedetomidine followed by a continuous infusion (0.1 mg/kg, i.v.) via a cannula inserted into a lateral tail vein. A single bolus of Feraheme (15 mg/kg, i.v.) was used for cerebral blood volume (CBV) weighted imaging for the enhanced contrast to noise ratio (Mandeville et al., 1998) and microvascular sensitivity (Zhao et al., 2006) that this technique offers in comparison to BOLD fMRI. fMRI acquisition was carried out approximately 15 min post contrast agent injection using a 4-shot segmented spiral readout with the following acquisition parameters: TR=0.75 ms, TE=9 ms, flip angle=30, field-of-view=32×32 mm, matrix=70 3 70, slice thickness=0.6 mm, number of repetitions=130, number of dummy scans=4.

Simultaneous LFP recordings and processing. LFP recordings concurrent with the fMRI data acquisition were carried out using a 16 channel BrainAmp ExG MR amplifier (Brain Products, Germany) with a low pass filter of 1000 Hz and a sampling rate of 5000 Hz. Gradient artifacts were removed using Niazy et al. (2005)'s implementation of average artifact subtraction (AAS) (Allen et al., 2000) modified for segmented MRI sequences and adapted so that template estimation excluded the highly periodic stimulation periods or episodes of high-amplitude spiking. Additionally, a low pass filter cutoff of 70 Hz was employed as the final stage of the procedure to diminish the effects of any remaining artifacts.

Histology. Rats were perfuse-fixed using phosphate-buffered saline (PBS) followed by 4% paraformaldehyde (PFA). Tissue was left in 4% PFA overnight before being cryoprotected in 20% sucrose solution. Sections were cut at 50 mm and mounted on glass slides for imaging under a confocal microscope (Zeiss LSM 880).

Quantification and Statistical Analysis

Inclusion criteria for optogenetic inhibition experiments. For experiments investigating the effects of optogenetic inhibition, it is important to only include trials where the stimulation is sufficient for AD induction. For this reason, a strict quality control criterion was used for optogenetic inhibition experiments. Where there was no evidence of AD following blue light stimulation only trials (trials without optogenetic inhibition) i.e., where the duration was less than 1 s, these trials were excluded along with all preceding trials up until a blue light stimulation only trial that results in an AD of greater than 1 s. This criterion ensured that only trials that were above the threshold for seizure induction were included.

Estimation of ictal onset time. Ictal onset time was estimated during the ChR2 stimulation period by subtracting the averaged evoked potential to produce an estimate of the underlying stimulation independent LFP (FIG. 9). First, each 25 ms stimulation epoch was zero centered and an average evoked potential at each epoch was generated using the sliding-window mean evoked potential averaged over 8 consecutive epochs. This average evoked potential was subtracted from the initial mean centered data and this was used to detect underlying ictal activity using a simple thresholding approach. Events were defined every time the LFP after subtracting the evoked potential exceeded an empirical threshold (4.5×the standard deviation of the baseline signal, where the baseline was defined as the period between 500-2500 ms as no obvious ictal activity occurred during this period). Finally, the ictal onset time was defined as time at which 5 events occurred within a 500 ms period.

fMRI data analysis and statistics. fMRI data was analyzed using SPM12. The data were first smoothed using a Gaussian kernel of 0.5 mm at full-width at half-maximum. This was followed by motion correction using a 6-parameter rigid registration. The images first underwent manual brain masking and then were aligned to a common space using a 12-parameter affine registration as implemented in the NiftyReg software package. This common template was segmented into regions of interest by registration to an atlas followed by manual correction. A general linear model (GLM) was used to generate activation maps. This entailed searching for optimal parameters for a custom gamma distribution function. We used a single gamma distribution, as there is no evidence of an undershoot using CBVw fMRI (Mandeville, 2012) and estimated the shape and scale parameters using Levenberg-Marquardt non-linear least-squares combined with grid search to ensure the absence of local minima (FIGS. 14A-14F). The fMRI data used for estimating gamma parameters was collected from the same animals from the block-design trials. This custom gamma distribution was convolved with the stimulation period together with the afterdischarge period to model the activation across both periods as a single rectangle function. The high-pass cut-off value was set to 400 s, while serial correlations were modeled using an autoregressive AR(1) model and estimation was performed using the restricted maximum likelihood method.

Figure 14:
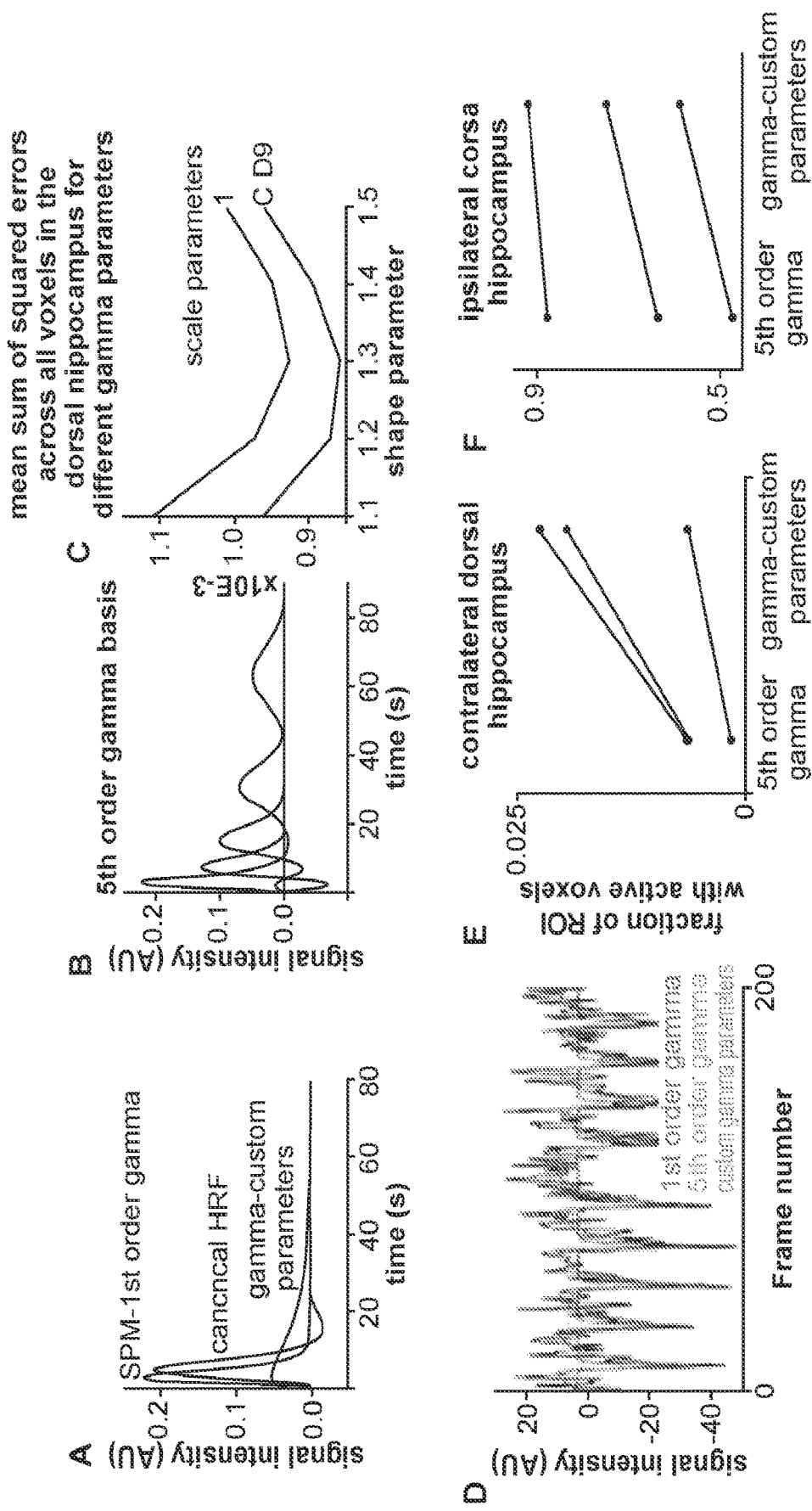
FIG. 14: CBV-weighted fMRI response to optogenetic stimulation in the dorsal hippocampus may be more appropriately described using a gamma distribution function with custom parameters compared to the canonical HRF or a more flexible 5th order gamma basis set as it has a faster onset and slower decay. Related to FIG. 4-7. (A) Example of gamma function with the best fitting parameters in comparison to the canonical HRF and SPM 1st order gamma. (B) 5th order gamma basis set. The higher order functions are able to account for significantly slower responses compared to the functions shown in (A). (C) Mean sum of squared errors in the fit across all voxels in the ipsilateral dorsal hippocampus for different gamma shape and scale parameters, indicating the estimated optimal fit results from using shape and scale parameters of 1.3 and 0.09 respectively. (D) Example of fitted HRFs to block-design stimulation data. Here the measured and fitted responses are shown for 9 periods, where each period consisted of a 5 s stimulation block at 40 Hz and 55 s rest block. The data were collected from least 3 six cycle acquisitions per subject in 3 subjects. Activation volumes expressed as a fraction of the total ROI volume in the contralateral (E) and ipsilateral (F) dorsal hippocampus respectively. Activation volumes are greater for the gamma-custom parameter model compared to the 5th order gamma model as the single custom gamma function uses fewer parameters and is therefore more parsimonious. (G) Example segmentation used for the region-wise analysis of MRI data. All structural and functional images were aligned to a common subject space which was first segmented by registration to an atlas (Valdés-Hernández et al., 2011) and then manually corrected. Abbreviations: Amyg—Amygdala, Cpu—Caudate Putamen, DH—Dorsal Hippocampus, Ent—Entorhinal Cortex, Hypothal—Hypothalamus, PFC—Prefrontal Cortex, RSG—Retrosplenial Cortex, S1—Primary Somatosensory Cortex, Thal Ant—Anterior thalamus. Thal DL—Thalamus Dorsal Lateral, Thal MD—Thalamus Medial Dorsal, Thal VM—Thalamus Ventral Medial, VH—Ventral Hippocampus.
Figure 14:
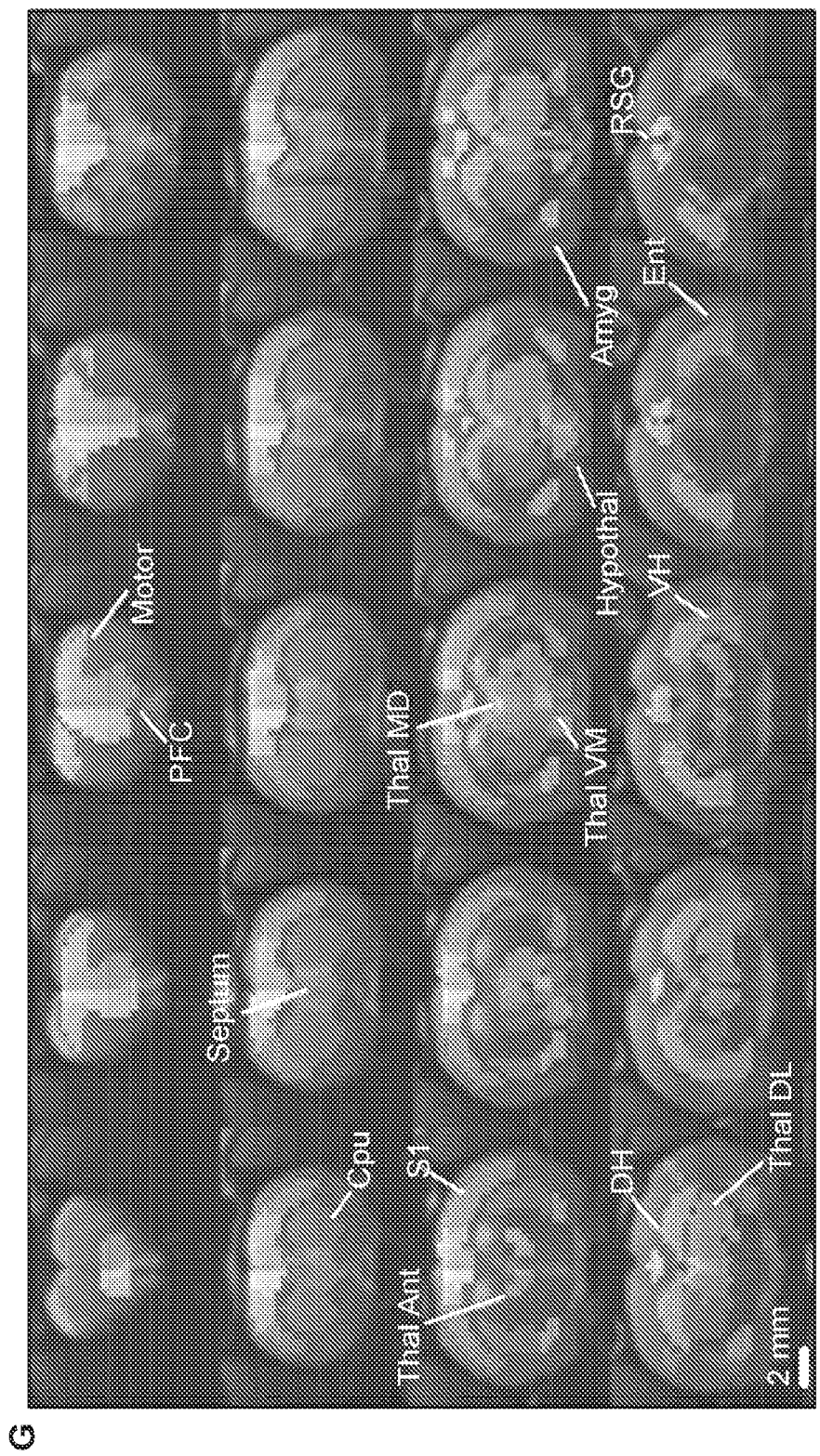

Single subject, single trial t-statistic activation maps were thresholded at a level of $p < 0.001$, uncorrected for multiple comparisons. For the fixed-effects group level analysis, a stricter threshold of $p < 0.0001$ (uncorrected for multiple comparisons) was applied. For the ROI-wise analysis, AD versus no-AD were compared using a 2-sample t test across trials. For the comparison between the dorsal and ventral hippocampus, a voxel-wise inflection point map was generated as a measure of the average onset time by using a (pooled) fixed-effects model and maximum-likelihood estimation. There was no difference between the activation time maps with and without optogenetic inhibition (FIG. 12), therefore these data were combined for the results displayed in FIG. 4. For the ROI analysis in FIG. 4, a region was considered to be active if the volume of activation was greater than 10% of the maximum activation volume in each subject. A random-intercept model with subjects as random effects was fitted using lme4 in R. The inflection point in the VH was compared to the DH in each region using parametric bootstrapping (Bates et al., 2015) and a significance level of 0.05. For region-wise analyses, the parcellation used for segmentation is shown in FIG. 14G. Activation times were reported as the median ±standard deviation but displayed in FIG. 4 as the median ±5th and 95th percentiles.

Statistical analysis of afterdischarges. Unless otherwise stated, hypothesis testing between groups was carried out using paired t tests at a significance level of 0.05. Afterdischarges were considered to be sustained if their duration exceeded 2.5 s. This threshold was chosen to allow time for optogenetic inhibition to take effect and because conditioning on ADs that exceeded the 5 s period of optogenetic inhibition, the AD duration was not significantly shorter for trials that included optogenetic inhibition, suggesting that inhibition had little effect if ADs were severe or progressed enough to exceed the period of optogenetic inhibition. The median AD duration without inhibition was 11 s, more than 4 3 greater than the duration threshold.

Figure 3:
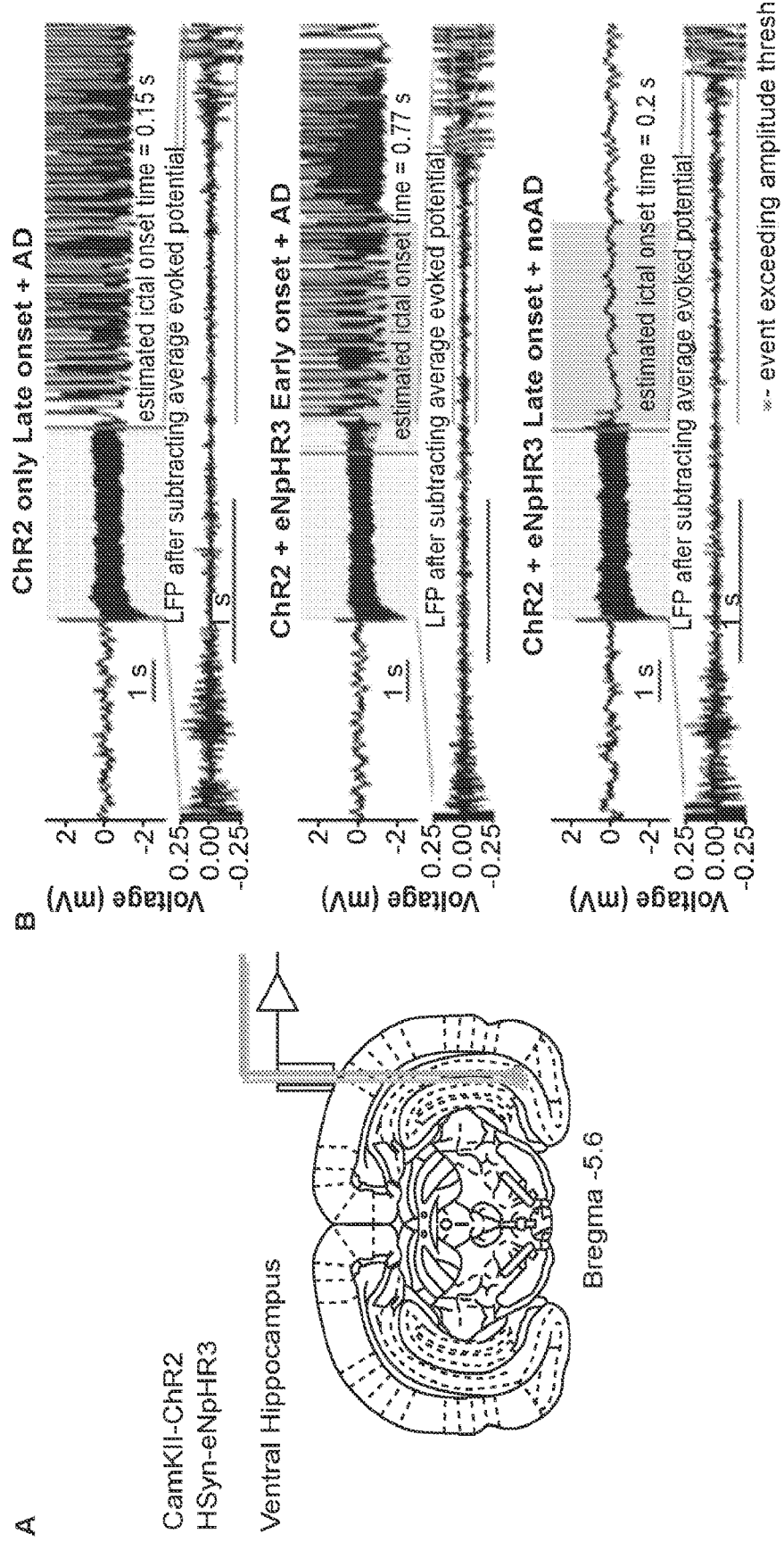
FIG. 3. More Progressed ADs Cannot Be Interrupted Using Optogenetic Inhibition. Given the relationship between ictal onset time and AD probability, the onset time was used as a covariate in a subsequent regression analysis. (A) VH was targeted for electrophysiology and optogenetic excitation and inhibition. (B) Examples LFP traces indicating stimulation condition and ictal onset time from a single session. Top panel: ChR2-only and late-onset ictal activity with a sustained AD. Middle panel: ChR2+eNpHR3.0 and early-onset ictal activity with a sustained AD. Bottom panel: ChR2+eNpHR3.0 and late-onset ictal activity without AD. (C) Modeling using a Bayesian hierarchical (random intercept) logistic regression; i.e., the log odds of the AD probability logit(p) was explained by a linear combination of the stimulation condition and ictal onset time, along with a subject-specific intercept term. The solid line and shaded region indicate the mean±95% quantile credible intervals of the posterior predictive distribution, and the individual points show the observed data. (D) Left panel: forest plot of estimated parameter distributions showing the interquartile range and 5th and 95th percentiles for 2 independently run Monte Carlo chains. Ictal onset time and stimulation condition (ChR2 versus ChR2+eNpHR3.0) were both determined to be significant predictors of ADs, because their 95% HPD parameter distributions did not contain zero. Right panel: Gelman-Rubin convergence statistic (r-hat) indicating convergence of Monte Carlo chains. Values here were less than 1.1, indicating good convergence. (E) 10-fold cross-validation demonstrating good predictive performance of the hierarchical model compared with the pooled model. All panels include n=6 rats.
Figure 3:
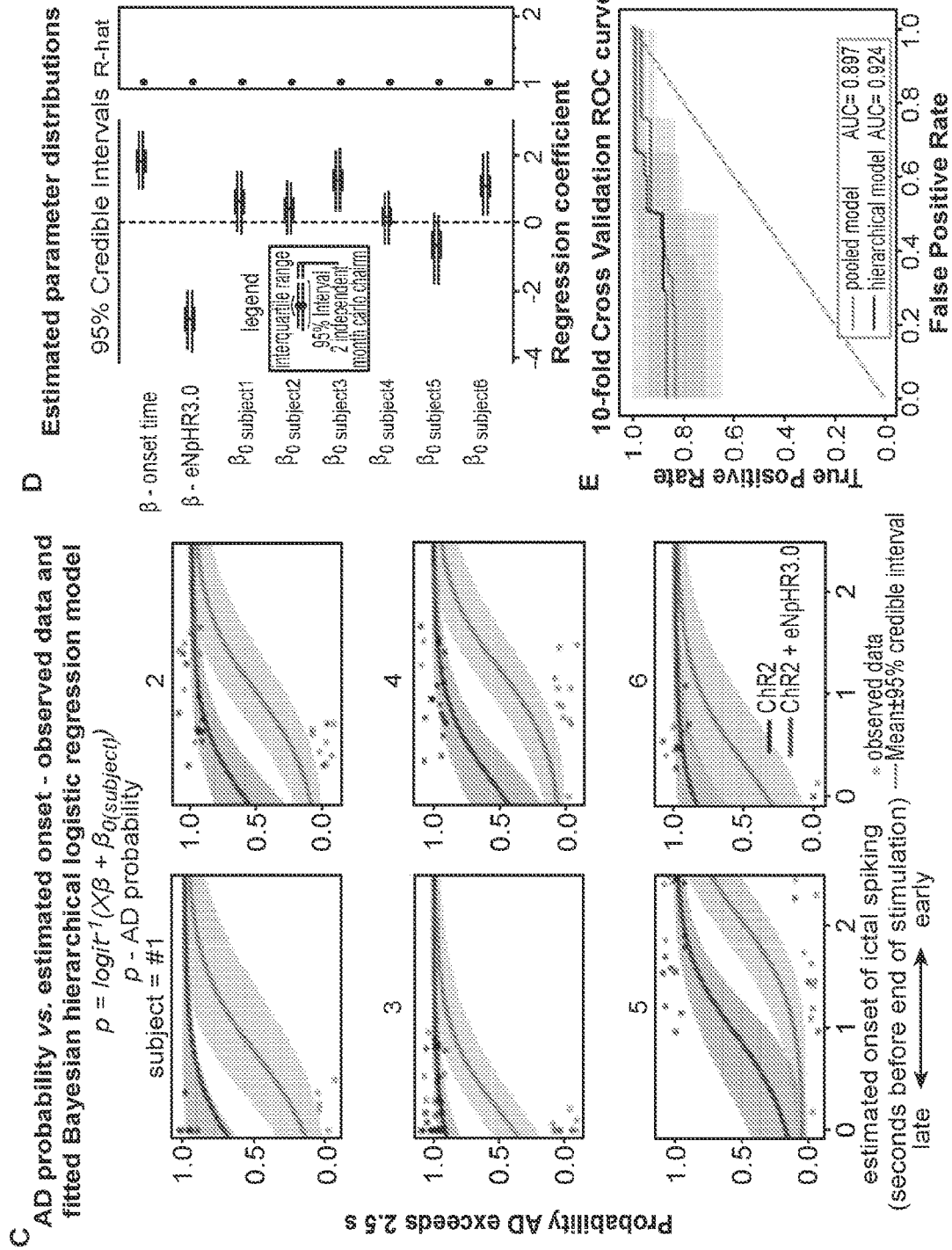

Afterdischarge probability (FIGS. 1 and 3) was modeled using hierarchical Bayesian logistic regression with intercepts allowed to vary across subjects. Hierarchical models are useful where the observations are grouped e.g., by subject. Instead of pooling the data and fitting a single regression model, or fitting a separate regression model to each subject, using a hierarchical model allows information to be shared across subjects i.e., estimations for each subject are partially based on data from other subjects, while subjects with a lower number of samples are more influenced by the population average. In the hierarchical model, AD probability (p) was modeled as:
$p = \text{logit}^{-1}(X\beta + \beta_{0subject})$ where the intercept for each subject was assumed to arise from a common distribution: $\beta_{0subject} \sim N(\mu_{\beta_0}, \sigma^2_{\beta_0})$. In FIG. 1, which displays data from ChR2 stimulation only, the input matrix (X) included ictal onset time as the only explanatory variable. FIG. 3 also included trials with optogenetic inhibition, therefore X was expanded to include activation of eNpHR3.0 as a binary variable. Weakly informative priors were used (Gelman et al., 2008) as these are typically preferred over noninformative priors which can lead to improper posterior distributions Normal distributions centered on zero and with a variance of 1 were used as priors for the mean parameters and half-Cauchy distributions with a scalefactor equal to 5 were used for the variance parameters. PyMC3 and the No-U-Turn sampler were used for sampling from the posterior, as it is known to be more efficient than traditional Markov Chain Monte Carlo methods. The Gelman-Rubin convergence statistic (R-hat) was less than 1.1 for all parameters indicating the sampling procedure converged well (FIGS. 1D and 3D). Finally, the 95% highest posterior density was used to test the significance of the corresponding b parameter value for each input variable.

Allen, P. J., Josephs, O., and Turner, R. (2000). A method for removing imaging artifact from continuous EEG recorded during functional MRI. Neuroimage 12, 230-239.

Bates, D., Mächier, M., Bolker, B., and Walker, S. (2015). Fitting linear mixed effects models using lme4. J. Stat. Statistical Software 67, 1-48.

Bohannon, A. S., and Hablitz, J. J. (2018). Optogenetic dissection of roles of specific cortical interneuron subtypes in GABAergic network synchronization. J. Physiol. 596, 901-919.

Choy, M., Duffy, B A., and Lee, J. H. (2017). Optogenetic study of networks in epilepsy. J. Neurosci. Res. 95, 2325-2335.

Christie, I. N., Wells, J. A., Southern, P., Marina, N., Kasparov, S., Gourine, A. V., and Lythgoe, M. F. (2013). fMRI response to blue light delivery in the naïve brain: implications for combined optogenetic fMRI studies. Neuroimage 66, 634-641.

Desai, M., Kahn, I., Knoblich, U., Bernstein, J., Atallah, H., Yang, A., Kopell, N., Buckner, R. L., Graybiel, A. M., Moore, C. I., and Boyden, E. S. (2011). Mapping brain networks in awake mice using combined optical neural control and fMRI. J. Neurophysiol. 105, 1393-1405.

Duffy, B. A., Choy, M., Chuapoco, M. R., Madsen, M., and Lee, J. H. (2015). MRI compatible optrodes for simultaneous LFP and optogenetic fMRI investigation of seizure-like afterdischarges. Neuroimage 123, 173-184.

Ellender, T. J., Raimondo, J. V., Irkle, A., Lamsa, K. P., and Akerman, C. J. (2014). Excitatory effects of parvalbumin-expressing interneurons maintain hippocampal epileptiform activity via synchronous afterdischarges. J. Neurosci. 34, 15208-15222.

Ewell, L. A., Liang, L., Armstrong, C., Solte'sz, I., Leutgeb, S., and Leutgeb, J. K. (2015). Brain State Is a Major Factor in Preseizure Hippocampal Network Activity and Influences Success of Seizure Intervention. J. Neurosci. 35, 15635-15648.

Fanselow, M. S., and Dong, H. W. (2010). Are the dorsal and ventral hippocampus functionally distinct structures? Neuron 65, 7-19.

Fisher, R., Salanova, V., Witt, T., Worth, R., Henry, T., Gross, R., Oommen, K., Osorio, I., Nazzaro, J., Labar, D., et al.; SANTE Study Group (2010). Electrical stimulation of the anterior nucleus of thalamus for treatment of refractory epilepsy. Epilepsia 51, 899-908.

Gelman, A. (2006). Prior distributions for variance parameters in hierarchical models (comment on article by Browne and Draper). Bayesian Anal. 1, 515-534.

Gelman, A., Jakulin, A., Pittau, M. G., and Su, Y.-S. (2008). A weakly informative default prior distribution for logistic and other regression models. Ann. Appl. Stat. 2, 1360-1383.

Hoffman, M. D., and Gelman, A. (2014). The No-U-Turn Sampler: Adaptively Setting Path Lengths in Hamiltonian Monte Carlo. J. Mach. Learn. Res 15, 1593-1623.

Jay, T. M., and Witter, M. P. (1991). Distribution of hippocampal CA1 and subicular efferents in the prefrontal cortex of the rat studied by means of anterograde transport of Phaseolus vulgaris-leucoagglutinin. J. Comp. Neurol. 313, 574-586.

Karnani, M. M., Jackson, J., Ayzenshtat, I., Hamzehei Sichani, A., Manoocheri, K., Kim, S., and Yuste, R. (2016). Opening Holes in the Blanket of Inhibition: Localized Lateral Disinhibition by VIP Interneurons. J. Neurosci. 36, 3471-3480.

Khoshkhoo, S., Vogt, D., and Sohal, V. S. (2017). Dynamic, Cell-Type-Specific Roles for GABAergic Interneurons in a Mouse Model of Optogenetically Inducible Seizures. Neuron 93, 291-298.

Kim, J. Y., Ash, R. T., Ceballos-Diaz, C., Levites, Y., Golde, T. E., Smirnakis, S. M., and Jankowsky, J. L. (2013). Viral transduction of the neonatal brain delivers controllable genetic mosaicism for visualising and manipulating neuronal circuits in vivo. Eur. J. Neurosci. 37, 1203-1220.

Krook-Magnuson, E., Armstrong, C., Oijala, M., and Soltesz, I. (2013). On-demand optogenetic control of spontaneous seizures in temporal lobe epilepsy. Nat. Commun. 4, 1376.

Krook-Magnuson, E., Szabo, G. G., Armstrong, C., Oijala, M., and Soltesz, I. (2014). Cerebellar Directed Optogenetic Intervention Inhibits Spontaneous Hippocampal Seizures in a Mouse Model of Temporal Lobe Epilepsy. eNeuro 1, e.2014.

Krook-Magnuson, E., Armstrong, C., Bui, A., Lew, S., Oijala, M., and Soltesz, I. (2015). In vivo evaluation of the dentate gate theory in epilepsy. J. Physiol. 593, 2379-2388.

Lee, J. H., Durand, R., Gradinaru, V., Zhang, F., Goshen, I., Kim, D. S., Fenno, L. E., Ramakrishnan, C., and Deisseroth, K. (2010). Global and local fMRI signals driven by neurons defined optogenetically by type and wiring. Nature 465, 788-792.

Liu, J., Duffy, B. A., Bernal-Casas, D., Fang, Z., and Lee, J. H. (2017). Comparison of fMRI analysis methods for heterogeneous BOLD responses in block design studies. Neuroimage 147, 390-408.

Lu, Y., Zhong, C., Wang, L., Wei, P., He, W., Huang, K., Zhang, Y., Zhan, Y., Feng, G., and Wang, L. (2016). Optogenetic dissection of ictal propagation in the hippocampal-entorhinal cortex structures. Nat. Commun. 7, 10962.

Mandeville, J. B. (2012). IRON fMRI measurements of CBV and implications for BOLD signal. Neuroimage 62, 1000-1008.

Mandeville, J. B., Marota, J. J., Kosofsky, B. E., Keltner, J. R., Weissleder, R., Rosen, B. R., and Weisskoff, R. M.

(1998). Dynamic functional imaging of relative cerebral blood volume during rat forepaw stimulation. Magn. Reson. Med. 39, 615-624.

Mandeville, J. B., Jenkins, B. G., Chen, Y. C., Choi, J. K., Kim, Y. R., Belen, D., Liu, C., Kosofsky, B. E., and Marota, J. J. (2004). Exogenous contrast agent improves sensitivity of gradient-echo functional magnetic resonance imaging at 9.4 T. Magn. Reson. Med. 52, 1272-1281.

Meibach, R. C., and Siegel, A. (1977). Efferent connections of the hippocampal formation in the rat. Brain Res. 124, 197-224.

Modat, M., Cash, D. M., Daga, P., Winston, G. P., Duncan, J. S., and Ourselin, S. (2014). Global image registration using a symmetric block-matching approach. J. Med. Imaging (Bellingham) 1, 024003.

Moreno, A., Morris, R. G. M., and Canals, S. (2016). Frequency-Dependent Gating of Hippocampal-Neocortical Interactions. Cereb. Cortex 26, 2105-2114.

Motelow, J. E., Li, W., Zhan, Q., Mishra, A. M., Sachdev, R. N., Liu, G., Gummadavelli, A., Zayyad, Z., Lee, H. S., Chu, V., et al. (2015). Decreased subcortical cholinergic arousal in focal seizures. Neuron 85, 561-572.

Niazy, R. K., Beckmann, C. F., Iannetti, G. D., Brady, J. M., and Smith, S. M. (2005). Removal of FMRI environment artifacts from EEG data using optimal basis sets. Neuroimage 28, 720-737.

Osawa, S., Iwasaki, M., Hosaka, R., Matsuzaka, Y., Tomita, H., Ishizuka, T., Sugano, E., Okumura, E., Yawo, H., Nakasato, N., et al. (2013). Optogenetically induced seizure and the longitudinal hippocampal network dynamics. PLoS ONE 8, e60928.

Ourselin, S., Roche, A., Subsol, G., Pennec, X., and Ayache, N. (2001). Reconstructing a 3D structure from serial histological sections. Image Vis. Comput. 19, 25-31.

Paz, J. T., Davidson, T. J., Frechette, E. S., Delord, B., Parada, I., Peng, K., Deisseroth, K., and Huguenard, J. R. (2013). Closed-loop optogenetic control of thalamus as a tool for interrupting seizures after cortical injury. Nat. Neurosci. 16, 64-70.

Pitka¨nen, A., Pikkarainen, M., Nurminen, N., and Ylinen, A. (2000). Reciprocal connections between the amygdala and the hippocampal formation, perirhinal cortex, and postrhinal cortex in rat. A review. Ann. N Y Acad. Sci. 911, 369-391.

Pouliot, P., Tremblay, J., Robert, M., Vannasing, P., Lepore, F., Lassonde, M., Sawan, M., Nguyen, D. K., and Lesage, F. (2012). Nonlinear hemodynamic responses in human epilepsy: a multimodal analysis with fNIRS-EEG and fMRIEEG. J. Neurosci. Methods 204, 326-340.

Rungta, R. L., Osmanski, B.-F., Boido, D., Tanter, M., and Charpak, S. (2017). Light controls cerebral blood flow in naive animals. Nat. Commun. 8, 14191.

Salvatier, J., Wiecki, T. V., and Fonnesbeck, C. (2016). Probabilistic Programming in Python using PyMC. PeerJ Comput. Sci 2, e55.

Schmid, F., Wachsmuth, L., Albers, F., Schwalm, M., Stroh, A., and Faber, C. (2017). True and apparent optogenetic BOLD fMRI signals. Magn. Reson. Med. 77, 126-136.

Sessolo, M., Marcon, I., Bovetti, S., Losi, G., Cammarota, M., Ratto, G. M., Fellin, T., and Carmignoto, G. (2015). Parvalbumin-Positive Inhibitory Interneurons Oppose Propagation But Favor Generation of Focal Epileptiform Activity. J. Neurosci. 35, 9544-9557.

Shiri, Z., Manseau, F., Le'vesque, M., Williams, S., and Avoli, M. (2016). Activation of specific neuronal networks leads to different seizure onset types. Ann. Neurol. 79, 354-365.

Stujenske, J. M., Spellman, T., and Gordon, J. A. (2015). Modeling the Spatiotemporal Dynamics of Light and Heat Propagation for In Vivo Optogenetics. Cell Rep. 12, 525-534.

Toyoda, I., Bower, M. R., Leyva, F., and Buckmaster, P. S. (2013). Early activation of ventral hippocampus and subiculum during spontaneous seizures in a rat model of temporal lobe epilepsy. J. Neurosci. 33, 11100-11115.

Tung, J. K., Shiu, F. H., Ding, K., and Gross, R. E. (2018). Chemically activated luminopsins allow optogenetic inhibition of distributed nodes in an epileptic network for non-invasive and multi-site suppression of seizure activity. Neurobiol. Dis. 109 (Pt A), 1-10.

Valde's-Herna'ndez, P. A., Sumiyoshi, A., Nonaka, H., Haga, R., Aubert-Va'squez, E., Ogawa, T., Iturria-Medina, Y., Riera, J. J., and Kawashima, R. (2011). An in vivo MRI template set for morphometry, tissue segmentation, and fMRI localization in rats. Front. Neuroinform. 5, 26.

Weitz, A. J., Fang, Z., Lee, H. J., Fisher, R. S., Smith, W. C., Choy, M., Liu, J., Lin, P., Rosenberg, M., and Lee, J. H. (2015). Optogenetic fMRI reveals distinct, frequency-dependent networks recruited by dorsal and intermediate hippocampus stimulations. Neuroimage 107, 229-241.

Wykes, R. C., Heeroma, J. H., Mantoan, L., Zheng, K., MacDonald, D. C., Deisseroth, K., Hashemi, K. S., Walker, M. C., Schorge, S., and Kullmann, D. M. (2012). Optogenetic and potassium channel gene therapy in a rodent model of focal neocortical epilepsy. Sci. Transl. Med. 4, 161ra152.

Wykes, R. C., Kullmann, D. M., Pavlov, I., and Magloire, V. (2016). Optogenetic approaches to treat epilepsy. J. Neurosci. Methods 260, 215-220.

Yekhlef, L., Breschi, G. L., Lagostena, L., Russo, G., and Taverna, S. (2015). Selective activation of parvalbumin- or somatostatin-expressing interneurons triggers epileptic seizurelike activity in mouse medial entorhinal cortex. J. Neurophysiol. 113, 1616-1630.

Zhao, F., Wang, P., Hendrich, K., Ugurbil, K., and Kim, S. G. (2006). Cortical layer-dependent BOLD and CBV responses measured by spin-echo and gradient-echo fMRI: insights into hemodynamic regulation. Neuroimage 30, 1149-1160.

| REAGENT or RESOURCE | SOURCE | IDENTIFIER |
| --- | --- | --- |
| Bacterial and Virus Strains | | |
| rAAV5-CaMKII-hChR2(H134R)-EYFP | University of North Carolina vector core | N/A |
| rAAV5-hSyn-eNpHR3.0-mCherry-WPRE | University of North Carolina vector core | N/A |
| rAAV5-CaMKII-eNp HR3.0-mCherry-WPRE | University of North Carolina vector core | N/A |

-continued

| REAGENT or RESOURCE | SOURCE | IDENTIFIER |
| --- | --- | --- |
| Chemicals, Peptides, and Recombinant Proteins | | |
| Feraheme | AMAG Pharmaceuticals | NDC Code 59338-775-01, 59338-775-10 |
| Dexmedetomidine (Dexdomitor) | Zoets | NADA 141-267 |
| Atipamazole hydrochloride (Artisedan) | Zoets | NADA 141-033 |
| Experimental Models: Organisms/Strains | | |
| Adult Male Sprague Dawley Rats | Charles River Laboratories | Strain code 001; RRID: RGD_734476 |
| Software and Algorithms | | |
| SPM12 | http://www.fil.ion.ucl.ac.uk/spm | SRRID: SCR_007037 |
| Nifty Reg | Modat et al., 2014 | N/A |
| MATLAB | MathWorks | RRID: SCR_001622 |
| Python 3 | https://www.python.org | N/A |
| PyMC3 | https://github.com/pymc-devs/pymc3 | N/A |
| lme4 | Bates et al., 2015 | N/A |
| Other | | |
| Clearfil AP-X dental cement | Kuraray Noritake Dental Inc. | Part No. 1721-KA |
| Optical fiber for optrodes | Thorlabs Inc | Part No. FG105LCA |
| Ferrules for optrodes | Thorlabs Inc | Part No. CFLC128 |
| Tungsten electrodes | World Percision Instruments | Part No. TM33A05 |
| Carbon fiber optrodes | Duffy et al., 2015 | N/A |
| Diode pumped solid state laser 473 nm | Laserglow Tecnologies | N/A |
| Diode pumped solid state laser 589 nm | Laserglow Tecnologies | N/A |
| 7T preclinical MRI scanner | Bituker | BioSpec series; Stanford Center for Innovation in In-Vivo Imaging |
| Differential amplifier | Warner Instruments | DP304 |
| Data acquisition system | National Instruments | USB 6259 |
| MRI compatible EEG system | Brain Products | BrainAmp ExG MR amplifier |
| Programmable pulse stimulator | A.M.P.I | Master-9 |

What is claimed is:

1. A method of analyzing a seizure network, the method comprising:
   a) delivering a first polynucleotide that encodes a depolarizing light-reactive protein to a target neuron, to express the light-reactive protein in the target neuron;
   b) administering to the subject an effective amount of light that specifically activates the light-reactive protein thereby leading to optogenetic stimulation;
   c) performing functional magnetic resonance imaging (fMRI) before, during, after, or a combination thereof delivery of the first polynucleotide and administration of the effective amount of light;
   d) receiving fMRI data from the performing of the fMRI; and
   e) generating an activation map with the fMRI data, wherein the activation map comprises voxel-wise activation time maps that compare the spread of seizure activity between afterdischarges (ADs), and shows where ADs can be suppressed locally for therapeutic intervention.

2. The method of claim 1 further comprising:
   i) delivering a second polynucleotide that encodes a hyper-polarizing light-reactive protein to the target neuron; and
   ii) administering to the subject an effective amount of light that specifically activates the second light-reactive protein following step b) of claim 1 thereby inhibiting the afterdischarge generated by the first light-reactive protein.

3. The method of claim 2, wherein the second polynucleotide is operably linked to a calmodulin-dependent kinase II (CAMKII) or a human synapsin (hSyn) promoter.

4. The method of claim 2, wherein the promoter operably linked to the first polynucleotide is different from the second polynucleotide.

5. The method of claim 2, wherein optogenetic inhibition is applied during optogenetic stimulation.

6. The method of claim 2, wherein the second polynucleotide is an eNpHR3.0 protein.

7. The method of claim 2, wherein the light used for optogenetic inhibition is from about 2000 mW/mm$^2$ to about 3000 mW/mm$^2$.

8. The method of claim 1 wherein, the fMRI used is cerebral blood volume (CBV)-weighted fMRI.

9. The method of claim 1, wherein the first polynucleotide is operably linked to a calmodulin-dependent kinase II (CAMKII) or a human synapsin (hSyn) promoter.

10. The method of claim 1, wherein the fMRI is combined with LFP recording.

11. The method of claim 1, wherein the spread of seizure activity is between ADs originating in the dorsal and ventral hippocampus.

12. The method of claim 1, wherein early spiking is demonstrated to be predictive of successful inhibition of seizures.

13. The method of claim 1, wherein the first polynucleotide encodes a ChR2 protein.

14. The method of claim 1, wherein the light-reactive proteins are expressed in the ventral hippocampus.

15. The method of claim 1, wherein the light-reactive proteins are expressed in the dorsal hippocampus.

16. The method of claim 1, wherein generating the activation map with the fMRI data comprises:
   applying a general linear model to the fMRI data; and
   convolving a gamma distribution function with a stimulation period of the fMRI data.

17. The method of claim 16, wherein generating the activation map with the fMRI data further comprises estimating shape and scale parameters using Levenberg-Marquardt non-linear least-squares and a grid search on the fMRI data.

18. The method of claim 17, wherein generating the activation map with the fMRI data further comprises:
   applying a high-pass cut-off value to the fMRI data; and
   modeling serial correlations using an autoregressive model; and
   estimating using a restricted maximum likelihood method.

\* \* \* \* \*